US011347943B2

(12) United States Patent
Garcia, III et al.

(10) Patent No.: US 11,347,943 B2
(45) Date of Patent: May 31, 2022

(54) MAIL APPLICATION FEATURES

(71) Applicant: Apple Inc., Cupertino, CA (US)

(72) Inventors: Robert Garcia, III, San Francisco, CA (US); Marcel Van Os, San Francisco, CA (US); Marcos Weskamp, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/373,272

(22) Filed: Jul. 12, 2021

(65) Prior Publication Data

US 2021/0342535 A1  Nov. 4, 2021

Related U.S. Application Data

(63) Continuation of application No. 16/736,711, filed on Jan. 7, 2020, now Pat. No. 11,074,408.

(60) Provisional application No. 62/856,043, filed on Jun. 1, 2019.

(51) Int. Cl.
*G06F 40/274* (2020.01)
*G06F 40/166* (2020.01)
*G06F 3/0482* (2013.01)
*G06F 3/0488* (2022.01)

(52) U.S. Cl.
CPC .......... *G06F 40/274* (2020.01); *G06F 3/0482* (2013.01); *G06F 3/0488* (2013.01); *G06F 40/166* (2020.01)

(58) Field of Classification Search
None
See application file for complete search history.

(56) References Cited

U.S. PATENT DOCUMENTS

| | | |
|---|---|---|
| 5,159,159 A | 10/1992 | Asher |
| 5,564,112 A | 10/1996 | Hayes et al. |
| 5,564,122 A | 10/1996 | Wagner et al. |
| 5,784,061 A | 7/1998 | Moran et al. |
| 5,861,886 A | 1/1999 | Moran et al. |
| 5,880,743 A | 3/1999 | Moran et al. |
| 6,185,574 B1 | 2/2001 | Howard et al. |
| 6,341,280 B1 | 1/2002 | Glass et al. |
| 6,525,749 B1 | 2/2003 | Moran et al. |
| 6,629,793 B1 | 10/2003 | Miller |
| 6,772,173 B1 | 8/2004 | Mcgee et al. |
| 6,987,991 B2 | 1/2006 | Nelson |
| 6,990,452 B1 | 1/2006 | Ostermann et al. |
| 7,167,731 B2 | 1/2007 | Nelson |

(Continued)

FOREIGN PATENT DOCUMENTS

| | | |
|---|---|---|
| AU | 2015100705 A4 | 6/2015 |
| CN | 104471521 A | 3/2015 |

(Continued)

OTHER PUBLICATIONS

Applicant-Initiated Interview Summary received for U.S. Appl. No. 16/145,033, dated Oct. 7, 2021, 4 pages.

(Continued)

*Primary Examiner* — Toan H Vu
(74) *Attorney, Agent, or Firm* — Dentons US LLP

(57) ABSTRACT

The present disclosure generally relates to mail application features. In some embodiments, a contact identifier is selected. In some embodiments, an adaptive toolbar is provided. In some embodiments, document functions are accessed.

21 Claims, 61 Drawing Sheets

(56) References Cited

U.S. PATENT DOCUMENTS

| | | |
|---|---|---|
| 7,242,413 B2 | 7/2007 | Chu et al. |
| 7,419,469 B2 | 9/2008 | Vacca et al. |
| 7,669,135 B2 | 2/2010 | Cunningham et al. |
| 7,925,682 B2 | 4/2011 | Moore et al. |
| 8,074,172 B2 | 12/2011 | Kocienda et al. |
| 8,232,973 B2 | 7/2012 | Kocienda et al. |
| 8,255,810 B2 | 8/2012 | Moore et al. |
| 8,290,478 B2 | 10/2012 | Shim et al. |
| 8,543,927 B1 | 9/2013 | Mckinley et al. |
| 8,566,403 B2 | 10/2013 | Pascal et al. |
| 8,893,023 B2 | 11/2014 | Perry et al. |
| 8,996,639 B1 | 3/2015 | Faaborg et al. |
| 9,143,907 B1 | 9/2015 | Caldwell et al. |
| 9,213,754 B1 | 12/2015 | Zhang et al. |
| 9,317,870 B2 | 4/2016 | Tew et al. |
| 9,338,242 B1 | 5/2016 | Suchland et al. |
| 9,740,399 B2 | 8/2017 | Paek et al. |
| 9,904,906 B2 | 2/2018 | Kim et al. |
| 9,906,928 B2 | 2/2018 | Kim et al. |
| 9,998,888 B1 | 6/2018 | Chang et al. |
| 10,003,938 B2 | 6/2018 | Chang et al. |
| 10,013,601 B2 | 7/2018 | Ebersman et al. |
| 10,019,136 B1 | 7/2018 | Ozog |
| 10,051,103 B1 | 8/2018 | Gordon et al. |
| 10,083,213 B1 | 9/2018 | Podgorny et al. |
| 10,341,826 B2 | 7/2019 | Chang et al. |
| 10,445,425 B2 | 10/2019 | Jon et al. |
| 2002/0029247 A1 | 3/2002 | Kawamoto et al. |
| 2002/0080187 A1 | 6/2002 | Lawton |
| 2002/0097278 A1 | 7/2002 | Mandler et al. |
| 2003/0177067 A1 | 9/2003 | Cowell et al. |
| 2003/0218641 A1 | 11/2003 | Longobardi |
| 2004/0078752 A1* | 4/2004 | Johnson, Jr. ......... G06Q 10/107 715/205 |
| 2004/0177319 A1 | 9/2004 | Horn |
| 2005/0081150 A1 | 4/2005 | Beardow et al. |
| 2005/0156873 A1 | 7/2005 | Walter et al. |
| 2005/0160079 A1 | 7/2005 | Turski et al. |
| 2005/0256712 A1 | 11/2005 | Yamada et al. |
| 2005/0289113 A1 | 12/2005 | Bookstaff et al. |
| 2005/0289133 A1 | 12/2005 | Arrouye et al. |
| 2005/0289173 A1 | 12/2005 | Vacca et al. |
| 2006/0053386 A1 | 3/2006 | Kuhl et al. |
| 2006/0080386 A1 | 4/2006 | Roykkee et al. |
| 2006/0123360 A1 | 6/2006 | Anwar et al. |
| 2006/0242164 A1 | 10/2006 | Evans et al. |
| 2007/0002077 A1 | 1/2007 | Gopalakrishnan et al. |
| 2007/0168875 A1 | 7/2007 | Kowitz et al. |
| 2007/0271340 A1 | 11/2007 | Goodman et al. |
| 2008/0057926 A1 | 3/2008 | Forstall et al. |
| 2008/0133479 A1 | 6/2008 | Zelevinsky et al. |
| 2008/0165147 A1 | 7/2008 | Christie et al. |
| 2008/0168144 A1 | 7/2008 | Lee |
| 2009/0005011 A1 | 1/2009 | Christie et al. |
| 2009/0085881 A1 | 4/2009 | Keam |
| 2009/0106695 A1 | 4/2009 | Perry et al. |
| 2009/0113315 A1 | 4/2009 | Fisher et al. |
| 2009/0177981 A1 | 7/2009 | Christie et al. |
| 2009/0254840 A1 | 10/2009 | Churchill et al. |
| 2009/0284471 A1 | 11/2009 | Longe et al. |
| 2009/0306969 A1 | 12/2009 | Goud et al. |
| 2010/0088616 A1 | 4/2010 | Park et al. |
| 2010/0123724 A1 | 5/2010 | Moore et al. |
| 2010/0125785 A1 | 5/2010 | Moore et al. |
| 2010/0179991 A1 | 7/2010 | Lorch et al. |
| 2010/0299601 A1 | 11/2010 | Kaplan et al. |
| 2010/0306185 A1* | 12/2010 | Smith ............... G06F 16/24578 707/738 |
| 2010/0325194 A1 | 12/2010 | Williamson et al. |
| 2011/0009109 A1 | 1/2011 | Hyon |
| 2011/0012919 A1 | 1/2011 | Tai et al. |
| 2011/0087747 A1 | 4/2011 | Hirst et al. |
| 2011/0145737 A1 | 6/2011 | Laugwitz et al. |
| 2011/0201387 A1 | 8/2011 | Paek et al. |
| 2011/0279323 A1 | 11/2011 | Hung et al. |
| 2011/0294525 A1 | 12/2011 | Jonsson |
| 2012/0008526 A1 | 1/2012 | Borghei et al. |
| 2012/0060089 A1* | 3/2012 | Heo .................... G06F 3/04883 715/702 |
| 2012/0110499 A1 | 5/2012 | Hance et al. |
| 2012/0136855 A1 | 5/2012 | Ni et al. |
| 2012/0299933 A1 | 11/2012 | Lau et al. |
| 2012/0302256 A1 | 11/2012 | Pai et al. |
| 2012/0311032 A1 | 12/2012 | Murphy et al. |
| 2013/0054634 A1 | 2/2013 | Chakraborty et al. |
| 2013/0159919 A1 | 6/2013 | Leydon |
| 2013/0204897 A1 | 8/2013 | Mcdougall |
| 2013/0205210 A1 | 8/2013 | Jeon et al. |
| 2013/0246329 A1 | 9/2013 | Pasquero et al. |
| 2013/0275923 A1 | 10/2013 | Griffin et al. |
| 2013/0275924 A1 | 10/2013 | Weinberg et al. |
| 2013/0300645 A1 | 11/2013 | Fedorov |
| 2013/0325970 A1 | 12/2013 | Roberts et al. |
| 2014/0025737 A1 | 1/2014 | Kruglick |
| 2014/0066105 A1 | 3/2014 | Bridge et al. |
| 2014/0101609 A1 | 4/2014 | Bamford et al. |
| 2014/0156262 A1 | 6/2014 | Yuen et al. |
| 2014/0163954 A1 | 6/2014 | Joshi et al. |
| 2014/0181205 A1 | 6/2014 | Sherrets et al. |
| 2014/0250371 A1 | 9/2014 | Wabyick et al. |
| 2014/0282211 A1 | 9/2014 | Ady et al. |
| 2014/0294167 A1* | 10/2014 | Kim .................... H04M 1/724 379/142.17 |
| 2014/0337438 A1 | 11/2014 | Govande et al. |
| 2014/0365944 A1 | 12/2014 | Moore et al. |
| 2015/0046828 A1 | 2/2015 | Desai et al. |
| 2015/0058720 A1 | 2/2015 | Smadja et al. |
| 2015/0089660 A1 | 3/2015 | Song et al. |
| 2015/0100537 A1 | 4/2015 | Grieves et al. |
| 2015/0113435 A1 | 4/2015 | Phillips |
| 2015/0172393 A1 | 6/2015 | Oplinger et al. |
| 2015/0180980 A1 | 6/2015 | Welinder et al. |
| 2015/0185995 A1 | 7/2015 | Shoemaker et al. |
| 2015/0186012 A1 | 7/2015 | Coleman et al. |
| 2015/0188861 A1 | 7/2015 | Esplin et al. |
| 2015/0201062 A1 | 7/2015 | Shih et al. |
| 2015/0220774 A1 | 8/2015 | Ebersman et al. |
| 2015/0222586 A1 | 8/2015 | Ebersman et al. |
| 2015/0242114 A1 | 8/2015 | Hirabayashi et al. |
| 2015/0256491 A1 | 9/2015 | Eatough et al. |
| 2015/0269432 A1 | 9/2015 | Motoi |
| 2015/0347985 A1 | 12/2015 | Gross et al. |
| 2016/0026730 A1 | 1/2016 | Hasan |
| 2016/0044269 A1 | 2/2016 | Kang |
| 2016/0062584 A1 | 3/2016 | Cohen et al. |
| 2016/0065505 A1 | 3/2016 | Iskander |
| 2016/0073223 A1 | 3/2016 | Woolsey et al. |
| 2016/0088335 A1 | 3/2016 | Zucchetta |
| 2016/0092431 A1 | 3/2016 | Motoi |
| 2016/0098186 A1 | 4/2016 | Sugiura |
| 2016/0132232 A1 | 5/2016 | Baba et al. |
| 2016/0165032 A1 | 6/2016 | Chang |
| 2016/0182410 A1 | 6/2016 | Janakiraman et al. |
| 2016/0202889 A1 | 7/2016 | Shin et al. |
| 2016/0224540 A1 | 8/2016 | Stewart et al. |
| 2016/0239724 A1 | 8/2016 | Arfvidsson et al. |
| 2016/0274756 A1 | 9/2016 | Sakaguchi |
| 2016/0294958 A1 | 10/2016 | Zhang et al. |
| 2016/0295384 A1 | 10/2016 | Shan et al. |
| 2016/0337301 A1 | 11/2016 | Rollins et al. |
| 2016/0359771 A1 | 12/2016 | Sridhar |
| 2017/0026430 A1 | 1/2017 | Beckhardt et al. |
| 2017/0041549 A1 | 2/2017 | Kim et al. |
| 2017/0048686 A1 | 2/2017 | Chang |
| 2017/0063753 A1 | 3/2017 | Probasco et al. |
| 2017/0075878 A1 | 3/2017 | Jon et al. |
| 2017/0093780 A1 | 3/2017 | Lieb et al. |
| 2017/0322694 A1 | 11/2017 | Cohen et al. |
| 2017/0344257 A1 | 11/2017 | Gnedin et al. |
| 2018/0034765 A1 | 2/2018 | Keszler et al. |
| 2018/0039406 A1 | 2/2018 | Kong et al. |
| 2018/0047189 A1 | 2/2018 | Diverdi et al. |
| 2018/0063324 A1 | 3/2018 | Van Meter, II |
| 2018/0121074 A1 | 5/2018 | Peron et al. |

(56) References Cited

U.S. PATENT DOCUMENTS

| | | | |
|---|---|---|---|
| 2018/0143761 | A1 | 5/2018 | Choi et al. |
| 2018/0146349 | A1 | 5/2018 | Chang et al. |
| 2018/0239520 | A1 | 8/2018 | Hinckley et al. |
| 2018/0270627 | A1 | 9/2018 | Chang et al. |
| 2018/0309801 | A1* | 10/2018 | Rathod ............... H04L 65/1069 |
| 2018/0329622 | A1 | 11/2018 | Missig et al. |
| 2018/0349020 | A1 | 12/2018 | Jon et al. |
| 2019/0303423 | A1 | 10/2019 | Thimbleby |
| 2019/0320301 | A1 | 10/2019 | Chang et al. |
| 2019/0339822 | A1 | 11/2019 | Devine et al. |
| 2020/0089374 | A1 | 3/2020 | Hill et al. |
| 2020/0110798 | A1 | 4/2020 | Jon et al. |
| 2020/0118325 | A1 | 4/2020 | Sasikumar et al. |
| 2020/0211250 | A1 | 7/2020 | Sasikumar et al. |
| 2020/0379638 | A1 | 12/2020 | Zhu et al. |
| 2020/0380208 | A1 | 12/2020 | Garcia, III et al. |
| 2021/0034860 | A1 | 2/2021 | Bednarowicz et al. |
| 2021/0149549 | A1 | 5/2021 | Ubillos et al. |
| 2021/0150121 | A1 | 5/2021 | Thimbleby |

FOREIGN PATENT DOCUMENTS

| | | |
|---|---|---|
| CN | 104487927 A | 4/2015 |
| CN | 104487928 A | 4/2015 |
| CN | 104685470 A | 6/2015 |
| CN | 105874447 A | 8/2016 |
| CN | 106843711 A | 6/2017 |
| CN | 107710197 A | 2/2018 |
| EP | 1231535 A2 | 8/2002 |
| EP | 1557774 A2 | 7/2005 |
| EP | 2172833 A1 | 4/2010 |
| GB | 2470585 A | 12/2010 |
| GB | 2550639 A | 11/2017 |
| WO | 2013/169854 A2 | 11/2013 |
| WO | 2013/169870 A1 | 11/2013 |
| WO | 2013/169877 A2 | 11/2013 |
| WO | 2014/197340 A1 | 12/2014 |
| WO | 2015/087084 A1 | 6/2015 |
| WO | 2017/027632 A1 | 2/2017 |

OTHER PUBLICATIONS

Brief Communication Regarding Oral Proceedings received for European Patent Application No. 19724963.4, mailed on Jun. 22, 2021, 2 pages.

Final Office Action received for U.S. Appl. No. 16/145,033, dated Jul. 6, 2021, 113 pages.

Notice of Allowance received for Chinese Patent Application No. 201811136445.7, dated Aug. 11, 2021, 2 pages (1 page of English Translation and 1 page of Official Copy).

Notice of Allowance received for U.S. Appl. No. 16/814,770, dated Jun. 1, 2021, 9 pages.

Office Action received for Australian Patent Application No. 2019266054, dated Jun. 29, 2021, 3 pages.

Result of Consultation received for European Patent Application No. 19724963.4, mailed on Jul. 8, 2021, 3 pages.

Result of Consultation received for European Patent Application No. 19724963.4, mailed on May 31, 2021, 3 pages.

Advisory Action received for U.S. Appl. No. 14/846,574, dated Jul. 31, 2020, 8 pages.

Advisory Action received for U.S. Appl. No. 16/454,884, dated Jan. 1, 2021, 6 pages.

Applicant Initiated Interview Summary received for U.S. Appl. No. 15/660,759, dated Jan. 29, 2020, 4 pages.

Applicant-Initiated Interview Summary received for U.S. Appl. No. 14/846,574, dated Feb. 3, 2020, 6 pages.

Applicant-Initiated Interview Summary received for U.S. Appl. No. 14/846,574, dated Jan. 14, 2021, 5 pages.

Applicant-Initiated Interview Summary received for U.S. Appl. No. 14/846,574, dated Jul. 21, 2020, 7 pages.

Applicant-Initiated Interview Summary received for U.S. Appl. No. 16/145,033, dated Apr. 30, 2021, 4 pages.

Applicant-Initiated Interview Summary received for U.S. Appl. No. 16/145,033, dated Jun. 29, 2020, 5 pages.

Applicant-Initiated Interview Summary received for U.S. Appl. No. 16/145,033, dated Nov. 24, 2020, 4 pages.

Applicant-Initiated Interview Summary received for U.S. Appl. No. 16/454,884, dated Dec. 4, 2020, 4 pages.

Applicant-Initiated Interview Summary received for U.S. Appl. No. 16/454,884, dated Jun. 2, 2020, 3 pages.

Applicant-Initiated Interview Summary received for U.S. Appl. No. 16/601,064, dated Dec. 14, 2020, 5 pages.

Applicant-Initiated Interview Summary received for U.S. Appl. No. 16/736,711, dated Oct. 16, 2020, 3 pages.

Certificate of Examination received for Australian Patent Application No. 2019100490, dated Oct. 16, 2019, 2 pages.

Corrected Notice of Allowance received for U.S. Appl. No. 16/736,711, dated Jun. 17, 2021, 6 pages.

Corrected Notice of Allowance received for U.S. Appl. No. 16/736,711, dated May 17, 2021, 6 pages.

Cross-Browser.com: Fixed Table Headers, downloaded from http://web.archive.org/web/20061205082655/http://cross-browser.com/x/examples/fixed_table_headers.html, retrieved on Aug. 22, 2011, 4 pages.

Decision to Grant received for Danish Patent Application No. PA201870385, dated Mar. 26, 2020, 2 pages.

Decision to Grant received for European Patent Application No. 16844879.3, dated Sep. 24, 2020, 2 pages.

Extended European Search Report received for European Patent Application No. 16844879.3, dated Mar. 1, 2019, 6 pages.

Extended European Search Report received for European Patent Application No. 20197945.7, dated Feb. 9, 2021, 8 pages.

Extended European Search Report received for European Patent Application No. 16807953.1, dated Dec. 4, 2018, 7 pages.

Filipowicz Luke, "How to use the QuickType keyboard in iOS 8", available online at: https://www.imore.com/comment/568232, Oct. 11, 2014, pp. 1-17.

Final Office Action received for U.S. Appl. No. 11/961,760 dated Nov. 26, 2012, Nov. 26, 2012, 17 pages.

Final Office Action received for U.S. Appl. No. 11/961,760 dated Sep. 14, 2011, 23 pages.

Final Office Action received for U.S. Appl. No. 14/846,574, dated Jun. 4, 2020, 25 pages.

Final Office Action received for U.S. Appl. No. 14/846,574, dated May 10, 2019, 36 pages.

Final Office Action received for U.S. Appl. No. 15/188,081, dated Dec. 13, 2018, 10 pages.

Final Office Action received for U.S. Appl. No. 15/660,759, dated Nov. 1, 2019, 29 pages.

Final Office Action received for U.S. Appl. No. 16/145,033, dated Sep. 22, 2020, 49 pages.

Final Office Action received for U.S. Appl. No. 16/454,884, dated Sep. 11, 2020, 28 pages.

Final Office Action received for U.S. Appl. No. 16/601,064, dated Mar. 8, 2021, 8 pages.

Final Office Action received for U.S. Appl. No. 16/736,711, dated Dec. 10, 2020, 11 pages.

Fingerworks, Inc., "Quick Reference Guide for TouchStream ST/LP", available online at: http://www.fingerworks.com, 2001-2003, 4 pages.

Hazra et al., "Sentiment Learning Using Twitter Ideograms", 8th Annual Industrial Automation and Electromechanical Engineering Conference, 2017, pp. 115-120.

HP Compaq Tablet PC tc1100, available online at: http://replay.waybackmachine.org/20050129053938/http://h18000.www1.hp.com/products/tabletpc/ on, Jan. 29, 2005, 2 pages.

Ikeda Masaru, "be Global Seoul 2015 Startup Battle: Talkey", YouTube Publisher, Online Available at: https://www.youtube.com/watch?v=4Wkp7sAAIdg, May 14, 2015, 1 page.

Inews and Tech, "How to Use the QuickType Keyboard in IOS 8", Available online at: http://www.inewsandtech.com/how-to-use-the-quicktype-keyboard-in-ios-8/, Sep. 17, 2014, 6 pages.

Intention to Grant received for Danish Patent Application No. PA201870385, dated Jan. 24, 2020, 2 pages.

US 11,347,943 B2
Page 4

(56) References Cited

OTHER PUBLICATIONS

Intention to Grant received for European Patent Application No. 16844879.3, dated May 11, 2020, 8 pages.
International Preliminary Report on Patentability received for PCT Patent Application No. PCT/US2007/088889 dated Jul. 7, 2009, 9 pages.
International Preliminary Report on Patentability received for PCT Patent Application No. PCT/US2016/025418, dated Dec. 21, 2017, 16 pages.
International Preliminary Report on Patentability received for PCT Patent Application No. PCT/US2016/046828, dated Mar. 1, 2018, 19 pages.
International Preliminary Report on Patentability received for PCT Patent Application No. PCT/US2016/048044, dated Mar. 22, 2018, 8 pages.
International Preliminary Report on Patentability received for PCT Patent Application No. PCT/US2019/024790, dated Nov. 19, 2020, 11 pages.
International Search Report and Written Opinion received for PCT Patent Application No. PCT/US2007/088889, dated Jun. 30, 2008, 11 pages.
International Search Report and Written Opinion received for PCT Patent Application No. PCT/US2016/025418, dated Jul. 1, 2016, 20 pages.
International Search Report and Written Opinion received for PCT Patent Application No. PCT/US2016/046828, dated Dec. 15, 2016, 22 pages.
International Search Report and Written Opinion received for PCT Patent Application No. PCT/US2016/048044, dated Oct. 31, 2016, 9 pages.
International Search Report and Written Opinion received for PCT Patent Application No. PCT/US2019/024790, dated Sep. 11, 2019, 18 pages.
International Search Report and written Opinion received for PCT Patent Application No. PCT/US2020/028215, dated Aug. 10, 2020, 18 pages.
Invitation to Pay Additional Fee received for PCT Patent Application No. PCT/US2019/024790, dated Jul. 18, 2019, 10 pages.
Invitation to Pay Additional Fees received for PCT Patent Application No. PCT/US2016/046828, dated Sep. 23, 2016, 2 pages.
Invitation to Pay Additional Fees received for PCT Patent Application No. PCT/US2020/028215, dated Jun. 19, 2020, 11 pages.
Komninos et al., "Text Input on a Smart Watch", IEEE, 2014, pp. 50-58.
Non-Office Action received for U.S. Appl. No. 11/961,760, dated Aug. 9, 2013, 16 pages.
Non-Final Office Action received for U.S. Appl. No. 11/961,760, dated Mar. 15, 2012, 20 pages.
Non-Final Office Action received for U.S. Appl. No. 11/961,760, dated Mar. 21, 2011, 15 pages.
Non-Final Office Action received for U.S. Appl. No. 14/502,975, dated Sep. 16, 2016, 19 pages.
Non-Final Office Action received for U.S. Appl. No. 14/846,574, dated Nov. 29, 2017, 27 pages.
Non-Final Office Action received for U.S. Appl. No. 14/846,574, dated Sep. 24, 2020, 29 pages.
Non-Final Office Action received for U.S. Appl. No. 14/846,574, dated Sep. 30, 2019, 29 pages.
Non-Final Office Action received for U.S. Appl. No. 15/142,661, dated Jan. 25, 2017, 29 pages.
Non-Final Office Action received for U.S. Appl. No. 15/188,081, dated Jun. 8, 2017, 17 pages.
Non-Final Office Action received for U.S. Appl. No. 15/188,081, dated Mar. 30, 2018, 21 pages.
Non-Final Office Action received for U.S. Appl. No. 15/660,759, dated Apr. 25, 2019, 27 pages.
Non-Final Office Action received for U.S. Appl. No. 15/985,570, dated Aug. 16, 2018, 23 pages.
Non-Final Office Action received for U.S. Appl. No. 16/145,033, dated Feb. 9, 2021, 55 pages.
Non-Final Office Action received for U.S. Appl. No. 16/145,033, dated Mar. 4, 2020, 50 pages.
Non-Final Office Action received for U.S. Appl. No. 16/454,884, dated Jan. 14, 2020, 41 pages.
Non-Final Office Action received for U.S. Appl. No. 16/601,064, dated Oct. 7, 2020, 13 pages.
Non-Final Office Action received for U.S. Appl. No. 16/736,711, dated Jun. 11, 2020, 10 pages.
Non-Final Office Action received for U.S. Appl. No. 14/503,041, dated Sep. 29, 2016, 22 pages.
Non-Final Office Action received for U.S. Appl. No. 14/846,574, dated Jun. 22, 2017, 21 pages.
Non-Final Office Action received for U.S. Appl. No. 14/846,574, dated Sep. 20, 2018, 61 pages.
Notice of Allowance received for Chinese Patent Application No. 201680031609.2, dated Mar. 18, 2021, 2 pages.
Notice of Allowance received for Chinese Patent Application No. 201680049868.8, dated Feb. 9, 2021, 4 pages.
Notice of Allowance received for U.S. Appl. No. 11/961,760, dated Jul. 10, 2017, 9 pages.
Notice of Allowance received for U.S. Appl. No. 14/502,975, dated Mar. 30, 2017, 10 pages.
Notice of Allowance received for U.S. Appl. No. 14/502,975, dated Sep. 15, 2017, 10 pages.
Notice of Allowance received for U.S. Appl. No. 14/503,041, dated Apr. 12, 2017, 9 pages.
Notice of Allowance received for U.S. Appl. No. 14/503,041, dated Sep. 15, 2017, 7 pages.
Notice of Allowance received for U.S. Appl. No. 14/846,574, dated Feb. 9, 2021, 12 pages.
Notice of Allowance received for U.S. Appl. No. 15/142,661, dated Feb. 15, 2018, 9 pages.
Notice of Allowance received for U.S. Appl. No. 15/142,661, dated Oct. 4, 2017, 22 pages.
Notice of Allowance received for U.S. Appl. No. 15/188,081, dated Jun. 26, 2019, 8 pages.
Notice of Allowance received for U.S. Appl. No. 15/188,081, dated Mar. 20, 2019, 6 pages.
Notice of Allowance received for U.S. Appl. No. 15/660,759, dated Jun. 30, 2020, 7 pages.
Notice of Allowance received for U.S. Appl. No. 15/660,759, dated Mar. 25, 2020, 9 pages.
Notice of Allowance received for U.S. Appl. No. 15/876,673, dated May 4, 2018, 27 pages.
Notice of Allowance received for U.S. Appl. No. 15/985,570, dated Mar. 13, 2019, 22 pages.
Notice of Allowance received for U.S. Appl. No. 16/601,064, dated May 17, 2021, 9 pages.
Notice of Allowance received for U.S. Appl. No. 16/736,711, dated Apr. 21, 2021, 8 pages.
Notice of Allowance received for U.S. Appl. No. 16/736,711, dated Jun. 8, 2021, 8 pages.
Office Action received for Australian Patent Application No. 2019100490, dated Jul. 26, 2019, 4 pages.
Office Action received for Chinese Patent Application No. 201680031609.2, dated Aug. 20, 2020, 6 pages.
Office Action received for Chinese Patent Application No. 201680031609.2, dated Jan. 15, 2020, 20 pages.
Office Action received for Chinese Patent Application No. 201680049868.8, dated May 25, 2020, 30 pages.
Office Action received for Chinese Patent Application No. 201680049868.8, dated Oct. 20, 2020, 8 pages.
Office Action received for Chinese Patent Application No. 201811136445.7, dated Apr. 14, 2021, 7 pages.
Office Action received for Chinese Patent Application No. 201811136445.7, dated Oct. 28, 2020, 17 pages.
Office Action received for Danish Patent Application No. PA201870385, dated Aug. 23, 2019, 3 pages.
Office Action received for European Patent Application No. 16807953.1, dated Apr. 7, 2021, 4 pages.
Office Action received for European Patent Application No. 16807953.1, dated Sep. 10, 2020, 4 pages.

(56) References Cited

OTHER PUBLICATIONS

Office Action received for European Patent Application No. 19724963.4, dated Jul. 28, 2020, 6 pages.
Quick Type Keyboard on iOS 8 Makes Typing Easier, Online available at: https://www.youtube.com/watch?v=0CIdLR4fhVU, Jun. 3, 2014, 3 pages.
Result of Consultation received for European Patent Application No. 16807953.1, mailed on Sep. 24, 2020, 3 pages.
Ritchie Rene, "QuickType keyboard in iOS 8: Explained", retrieved via URL: https://www.imore.com/quicktype-keyboards-ios-8-explained, Jun. 21, 2014, pp. 1-19.
Search Report and Opinion received for Danish Patent Application No. PA201870385, dated Nov. 16, 2018, 10 pages.
SitePoint.com—Scrollable headers, download from http://web.archive.org/web/20061211090631 /http://www.sitepoint.com/forums/showthread.php?t=442068 on Aug. 22, 2011, 14 pages.
Summons to Attend Oral Proceedings received for European Patent Application No. 19724963.4, mailed on Dec. 23, 2020, 8 pages.
Supplemental Notice of Allowance received for U.S. Appl. No. 14/846,574, dated Apr. 15, 2021, 3 pages.
Supplemental Notice of Allowance received for U.S. Appl. No. 14/846,574, dated Apr. 30, 2021, 3 pages.
Tomic et al., "Emoticons", FIP—Journal of Finance and Law, vol. 1, No. 1, 2013, pp. 35-42.
Ye et al., "Dynamic Folder Creation to Ease Navigation", ip.com Journal, May 25, 2004, 4 pages.
Advisory Action received for U.S. Appl. No. 16/145,033, dated Nov. 2, 2021, 5 pages.
Examiner's Answer to Appeal Brief received for U.S. Appl. No. 16/454,884, mailed on Sep. 17, 2021, 33 pages.
Intention to Grant received for European Patent Application No. 19724963.4, dated Sep. 20, 2021, 7 pages.
Minutes of the Oral Proceedings received for European Patent Application No. 19724963.4, mailed on Sep. 3, 2021, 6 pages.
Notice of Allowance received for U.S. Appl. No. 16/814,770, dated Sep. 17, 2021, 9 pages.
Office Action received for Australian Patent Application No. 2019266054, dated Aug. 23, 2021, 4 pages.
Notice of Acceptance received for Australian Patent Application No. 2019266054, dated Nov. 25, 2021, 3 pages.
International Preliminary Report on Patentability received for PCT Patent Application No. PCT/US2020/028215, dated Dec. 16, 2021, 13 pages.

* cited by examiner

900

902
Concurrently display, via the display device:

904
A text input field

906
An adaptive toolbar, wherein the adaptive toolbar is configured to transition between a suggestion mode to provide a suggested input term and a function mode to provide a function other than a suggested input term.

908
While displaying the text input field and the adaptive toolbar in the suggestion mode including display of a first suggested input term, receive input of one or more characters.

1102
Concurrently displaying, on the display device, a first portion of a first content and a first footer at a first location on the display device, wherein the first footer corresponds to the first content.

1104
Detect a scroll input.

1106
In response to detecting the scroll input:

1108
In accordance with a determination that a set of footer-maintaining criteria is satisfied for the first content, wherein the set of footer-maintaining criteria include a first criterion that is satisfied when a bottom of the first content is not scrolled to above a first threshold location on the display device:

1110
Scroll the first content based on a magnitude of the scroll input.

1112
Maintain, at the first location on the display device, the first footer.

1116
In accordance with a determination that the set of footer-maintaining criteria is not satisfied for the first content:

1118
Scroll the first content based on the magnitude of the scroll input.

1120
Ceasing to display, at the first location on the display device, the first footer.

*FIG. 11*

\# MAIL APPLICATION FEATURES

CROSS-REFERENCE TO RELATED APPLICATIONS

This application is a continuation of U.S. patent application Ser. No. 16/736,711, entitled "Mail Application Features," and filed on Jan. 7, 2020, which claims priority to U.S. Patent Application No. 62/856,043, entitled "Mail Application Features," and filed on Jun. 1, 2019, the contents of which are hereby incorporated by reference in their entirety.

FIELD

The present disclosure relates generally to computer user interfaces, and more specifically to techniques for providing mail application features.

BACKGROUND

Users use email programs to manage email tasks, including drafting new emails, responding to received emails, deleting emails, and flagging important emails. Electronic devices provide mail application features to facilitate these tasks.

BRIEF SUMMARY

However, some techniques for providing mail application features using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for providing mail application features. Such methods and interfaces optionally complement or replace other methods for providing mail application features. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with a display device: receiving input of one or more characters; and in response to receiving the input of one or more characters: identifying, based on the one or more characters, one or more entities, wherein the one or more entities correspond to respective entries of an address book of the electronic device, wherein a first entity of the one or more entities corresponds to a first entry of the address book, the first entry including a name for the first entity and a plurality of contact identifiers for contacting the first entity using a first contact modality, and wherein the plurality of contact identifiers of the first entry include a first contact identifier for contacting the first entity using the first contact modality and a second contact identifier different from the first contact identifier for contacting the first entity using the first contact modality; and displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity.

Example non-transitory computer-readable storage media are described herein. An example non-transitory computer-readable storage medium stores one or more programs configured to be executed by one or more processors of an electronic device with a display device, the one or more programs including instructions for: receiving input of one or more characters; and in response to receiving the input of one or more characters: identifying, based on the one or more characters, one or more entities, wherein the one or more entities correspond to respective entries of an address book of the electronic device, wherein a first entity of the one or more entities corresponds to a first entry of the address book, the first entry including a name for the first entity and a plurality of contact identifiers for contacting the first entity using a first contact modality, and wherein the plurality of contact identifiers of the first entry include a first contact identifier for contacting the first entity using the first contact modality and a second contact identifier different from the first contact identifier for contacting the first entity using the first contact modality; and displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity.

Example transitory computer-readable storage media are described herein. An example transitory computer-readable storage medium stores one or more programs configured to be executed by one or more processors of an electronic device with a display device, the one or more programs including instructions for: receiving input of one or more characters; and in response to receiving the input of one or more characters: identifying, based on the one or more characters, one or more entities, wherein the one or more entities correspond to respective entries of an address book of the electronic device, wherein a first entity of the one or more entities corresponds to a first entry of the address book, the first entry including a name for the first entity and a plurality of contact identifiers for contacting the first entity using a first contact modality, and wherein the plurality of contact identifiers of the first entry include a first contact identifier for contacting the first entity using the first contact modality and a second contact identifier different from the first contact identifier for contacting the first entity using the first contact modality; and displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity.

Example electronic devices are described herein. An example electronic device includes a display device; one or more processors; and memory storing one or more programs configured to be executed by the one or more processors, the one or more programs including instructions for: receiving input of one or more characters; and in response to receiving the input of one or more characters: identifying, based on the one or more characters, one or more entities, wherein the one or more entities correspond to respective entries of an address book of the electronic device, wherein a first entity of the one or more entities corresponds to a first entry of the address book, the first entry including a name for the first entity and a plurality of contact identifiers for contacting the first entity using a first contact modality, and wherein the plurality of contact identifiers of the first entry include a first contact identifier for contacting the first entity using the first contact modality and a second contact identifier different from the first contact identifier for contacting the first entity using the first contact modality; and displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity.

An example electronic device includes a display device; means for receiving input of one or more characters; and means for, in response to receiving the input of one or more characters: identifying, based on the one or more characters, one or more entities, wherein the one or more entities correspond to respective entries of an address book of the electronic device, wherein a first entity of the one or more entities corresponds to a first entry of the address book, the first entry including a name for the first entity and a plurality of contact identifiers for contacting the first entity using a first contact modality, and wherein the plurality of contact identifiers of the first entry include a first contact identifier for contacting the first entity using the first contact modality and a second contact identifier different from the first contact identifier for contacting the first entity using the first contact modality; and displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity.

An example method includes, at an electronic device with a display device: concurrently displaying, via the display device: a text input field; and an adaptive toolbar, wherein the adaptive toolbar is configured to transition between a suggestion mode to provide a suggested input term and a function mode to provide a function other than a suggested input term; while displaying the text input field and the adaptive toolbar in the suggestion mode including display of a first suggested input term, receiving input of one or more characters; and in response to receiving the input of one or more characters: entering the one or more characters in the text input field; in accordance with a determination, based on the one or more characters, that a set of one or more suggestion criteria is satisfied: updating the adaptive toolbar to replace display of the first suggested input term with a second suggested input term, wherein the second suggested input term is based on the one or more characters, and wherein the second suggested input term is different from the first suggested input term; and in accordance with a determination, based on the one or more characters entered into the text input field, that a set of one or more function criteria is satisfied: updating the adaptive toolbar to replace display of the first suggested input term with display of a set of functions An example non-transitory computer-readable storage medium stores one or more programs configured to be executed by one or more processors of an electronic device with a display device, the one or more programs including instructions for: concurrently displaying, via the display device: a text input field; and an adaptive toolbar, wherein the adaptive toolbar is configured to transition between a suggestion mode to provide a suggested input term and a function mode to provide a function other than a suggested input term; while displaying the text input field and the adaptive toolbar in the suggestion mode including display of a first suggested input term, receiving input of one or more characters; and in response to receiving the input of one or more characters: entering the one or more characters in the text input field; in accordance with a determination, based on the one or more characters, that a set of one or more suggestion criteria is satisfied: updating the adaptive toolbar to replace display of the first suggested input term with a second suggested input term, wherein the second suggested input term is based on the one or more characters, and wherein the second suggested input term is different from the first suggested input term; and in accordance with a determination, based on the one or more characters entered into the text input field, that a set of one or more function criteria is satisfied: updating the adaptive toolbar to replace display of the first suggested input term with display of a set of functions.

An example transitory computer-readable storage medium stores one or more programs configured to be executed by one or more processors of an electronic device with a display device, the one or more programs including instructions for: concurrently displaying, via the display device: a text input field; and an adaptive toolbar, wherein the adaptive toolbar is configured to transition between a suggestion mode to provide a suggested input term and a function mode to provide a function other than a suggested input term; while displaying the text input field and the adaptive toolbar in the suggestion mode including display of a first suggested input term, receiving input of one or more characters; and in response to receiving the input of one or more characters: entering the one or more characters in the text input field; in accordance with a determination, based on the one or more characters, that a set of one or more suggestion criteria is satisfied: updating the adaptive toolbar to replace display of the first suggested input term with a second suggested input term, wherein the second suggested input term is based on the one or more characters, and wherein the second suggested input term is different from the first suggested input term; and in accordance with a determination, based on the one or more characters entered into the text input field, that a set of one or more function criteria is satisfied: updating the adaptive toolbar to replace display of the first suggested input term with display of a set of functions An example device includes a display device; one or more processors; and memory storing one or more programs configured to be executed by the one or more processors, the one or more programs including instructions for: concurrently displaying, via the display device: a text input field; and an adaptive toolbar, wherein the adaptive toolbar is configured to transition between a suggestion mode to provide a suggested input term and a function mode to provide a function other than a suggested input term; while displaying the text input field and the adaptive toolbar in the suggestion mode including display of a first suggested input term, receiving input of one or more characters; and in response to receiving the input of one or more characters: entering the one or more characters in the text input field; in accordance with a determination, based on the one or more characters, that a set of one or more suggestion criteria is satisfied: updating the adaptive toolbar to replace display of the first suggested input term with a second suggested input term, wherein the second suggested input term is based on the one or more characters, and wherein the second suggested input term is different from the first suggested input term; and in accordance with a determination, based on the one or more characters entered into the text input field, that a set of one or more function criteria is satisfied: updating the adaptive toolbar to replace display of the first suggested input term with display of a set of functions.

An example device includes a display device; means for, concurrently displaying, via the display device: a text input field; and an adaptive toolbar, wherein the adaptive toolbar is configured to transition between a suggestion mode to provide a suggested input term and a function mode to provide a function other than a suggested input term; means for, while displaying the text input field and the adaptive toolbar in the suggestion mode including display of a first suggested input term, receiving input of one or more characters; and means for, in response to receiving the input of one or more characters: entering the one or more characters in the text input field; in accordance with a determination, based on the one or more characters, that a set of one or more suggestion criteria is satisfied: updating the adaptive toolbar to replace display of the first suggested input term with a second suggested input term, wherein the second suggested input term is based on the one or more characters, and wherein the second suggested input term is different from the first suggested input term; and in accordance with a determination, based on the one or more characters entered into the text input field, that a set of one or more function criteria is satisfied: updating the adaptive toolbar to replace display of the first suggested input term with display of a set of functions.

An example method includes, at an electronic device with a display device: concurrently displaying, on the display device: a first portion of a first content, and a first footer at a first location on the display device, wherein the first footer corresponds to the first content; detecting a scroll input; in response to detecting the scroll input: in accordance with a determination that a set of footer-maintaining criteria is satisfied for the first content, wherein the set of footer-maintaining criteria include a first criterion that is satisfied when a bottom of the first content is not scrolled to above a first threshold location on the display device: scrolling, on the display device, the first content based on a magnitude of the scroll input; and maintaining, at the first location on the display device, the first footer; and in accordance with a determination that the set of footer-maintaining criteria is not satisfied for the first content: scrolling, on the display device, the first content based on the magnitude of the scroll input; and ceasing to display, at the first location on the display device, the first footer.

An example non-transitory computer-readable storage medium stores one or more programs configured to be executed by one or more processors of an electronic device with a display device, the one or more programs including instructions for: concurrently displaying, on the display device: a first portion of a first content, and a first footer at a first location on the display device, wherein the first footer corresponds to the first content; detecting a scroll input; in response to detecting the scroll input: in accordance with a determination that a set of footer-maintaining criteria is satisfied for the first content, wherein the set of footer-maintaining criteria include a first criterion that is satisfied when a bottom of the first content is not scrolled to above a first threshold location on the display device: scrolling, on the display device, the first content based on a magnitude of the scroll input; and maintaining, at the first location on the display device, the first footer; and in accordance with a determination that the set of footer-maintaining criteria is not satisfied for the first content: scrolling, on the display device, the first content based on the magnitude of the scroll input; and ceasing to display, at the first location on the display device, the first footer.

An example transitory computer-readable storage medium stores one or more programs configured to be executed by one or more processors of an electronic device with a display device, the one or more programs including instructions for: concurrently displaying, on the display device: a first portion of a first content, and a first footer at a first location on the display device, wherein the first footer corresponds to the first content; detecting a scroll input; in response to detecting the scroll input: in accordance with a determination that a set of footer-maintaining criteria is satisfied for the first content, wherein the set of footer-maintaining criteria include a first criterion that is satisfied when a bottom of the first content is not scrolled to above a first threshold location on the display device: scrolling, on the display device, the first content based on a magnitude of the scroll input; and maintaining, at the first location on the display device, the first footer; and in accordance with a determination that the set of footer-maintaining criteria is not satisfied for the first content: scrolling, on the display device, the first content based on the magnitude of the scroll input; and ceasing to display, at the first location on the display device, the first footer.

An example device includes a display device; one or more processors; and memory storing one or more programs configured to be executed by the one or more processors, the one or more programs including instructions for: concurrently displaying, on the display device: a first portion of a first content, and a first footer at a first location on the display device, wherein the first footer corresponds to the first content; detecting a scroll input; in response to detecting the scroll input: in accordance with a determination that a set of footer-maintaining criteria is satisfied for the first content, wherein the set of footer-maintaining criteria include a first criterion that is satisfied when a bottom of the first content is not scrolled to above a first threshold location on the display device: scrolling, on the display device, the first content based on a magnitude of the scroll input; and maintaining, at the first location on the display device, the first footer; and in accordance with a determination that the set of footer-maintaining criteria is not satisfied for the first content: scrolling, on the display device, the first content based on the magnitude of the scroll input; and ceasing to display, at the first location on the display device, the first footer.

An example device includes: a display device; means for, concurrently displaying, on the display device: a first portion of a first content, and a first footer at a first location on the display device, wherein the first footer corresponds to the first content; means for detecting a scroll input; means for, in response to detecting the scroll input: in accordance with a determination that a set of footer-maintaining criteria is satisfied for the first content, wherein the set of footer-maintaining criteria include a first criterion that is satisfied when a bottom of the first content is not scrolled to above a first threshold location on the display device: scrolling, on the display device, the first content based on a magnitude of the scroll input; and maintaining, at the first location on the display device, the first footer; and in accordance with a determination that the set of footer-maintaining criteria is not satisfied for the first content: scrolling, on the display device, the first content based on the magnitude of the scroll input; and ceasing to display, at the first location on the display device, the first footer.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing mail application features, thereby increasing the effectiveness, efficiency, and user satisfaction with such devices. Such methods and interfaces may complement or replace other methods for providing mail application features.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9B is a flow diagram illustrating a process for providing an adaptive toolbar, in accordance with some embodiments.

FIG. 11 is a flow diagram illustrating a process for accessing document functions, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing mail application features. Such techniques can reduce the cognitive burden on a user who accesses such features, thereby enhancing productivity. Further, such techniques can reduce processor and battery power otherwise wasted on redundant user inputs.

Figure 7:
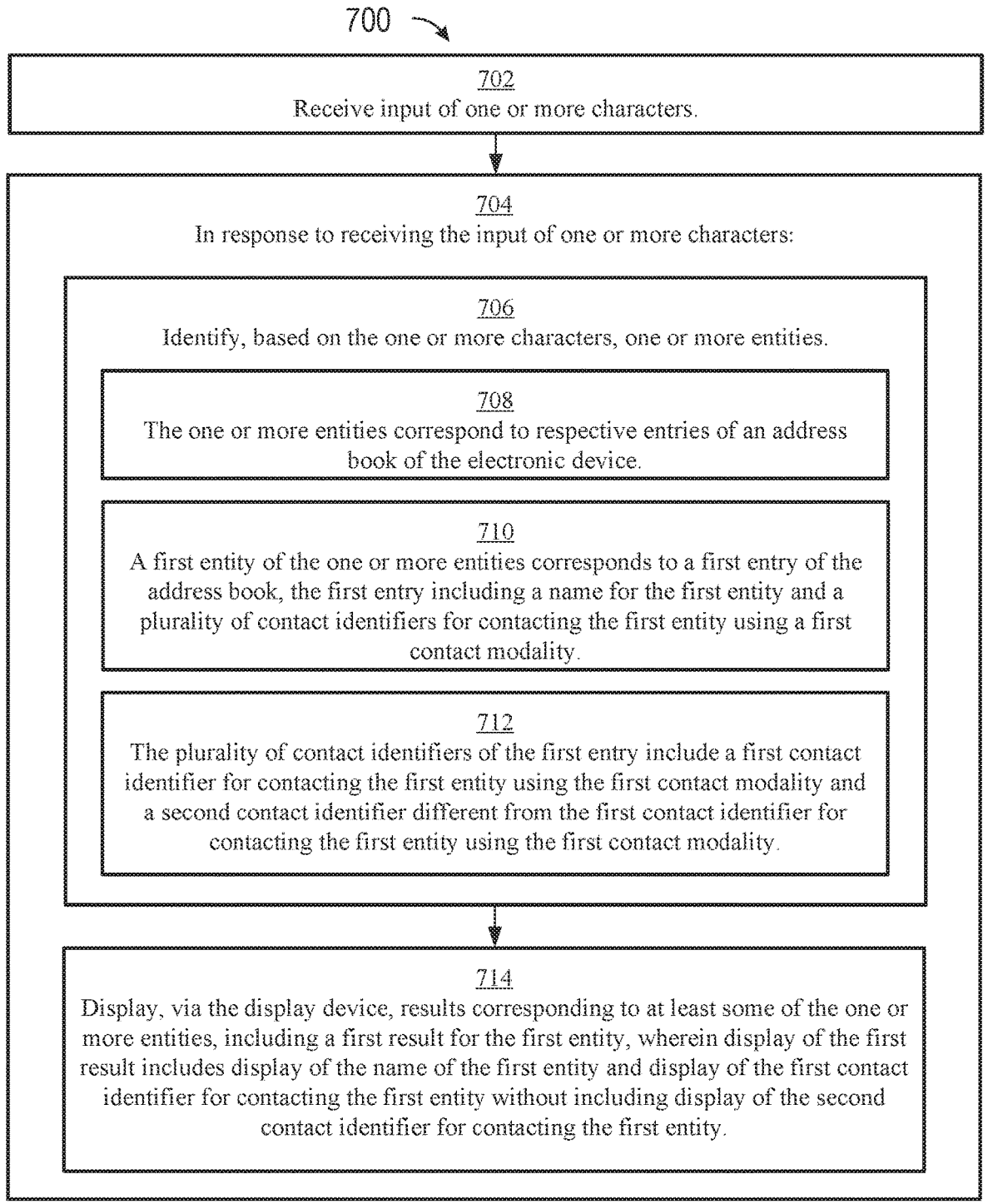
FIG. 7 is a flow diagram illustrating a process for selecting a contact identifier, in accordance with some embodiments.
Figure 8A:
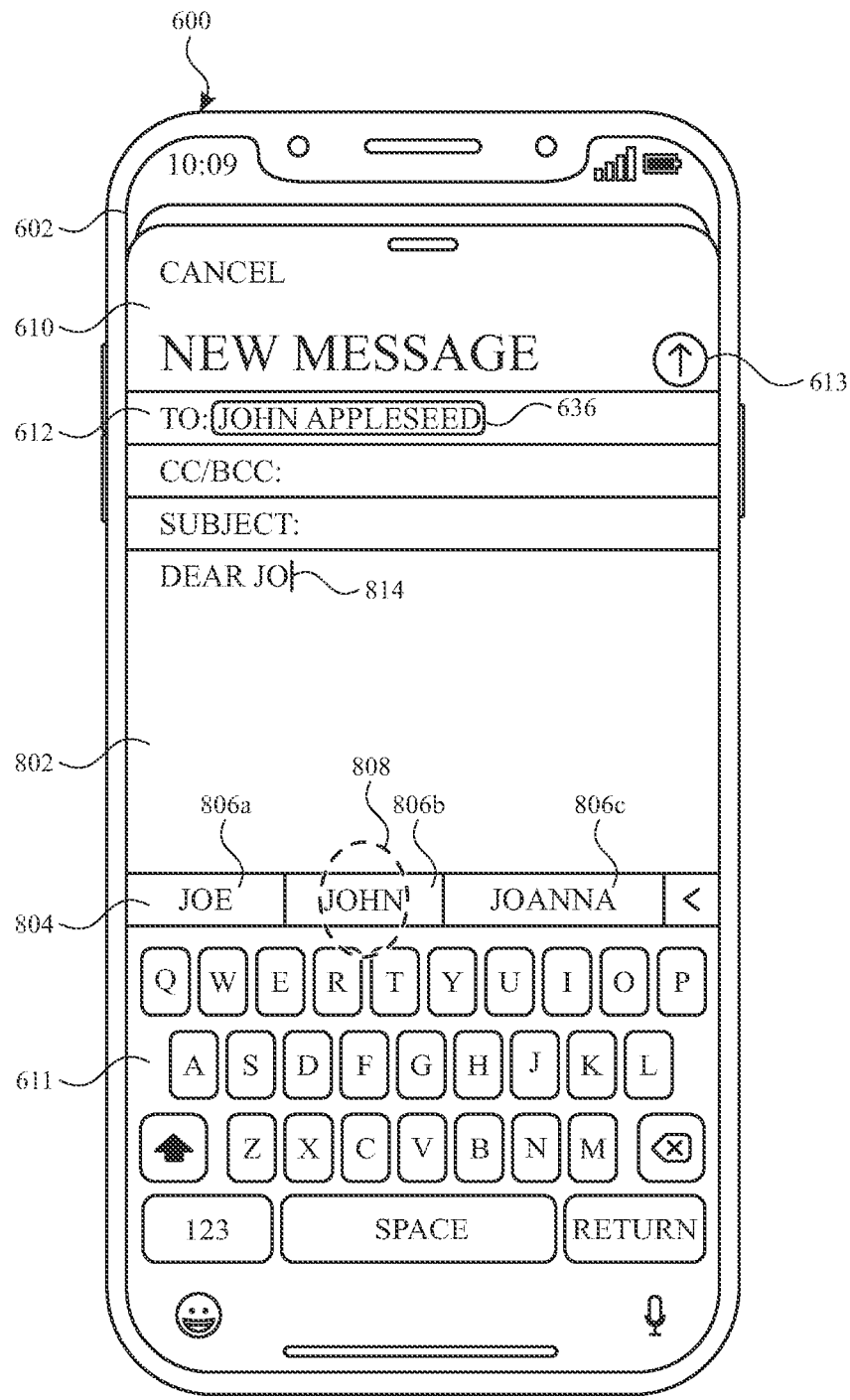
FIGS. 8A-8P illustrate exemplary user interfaces for providing an adaptive toolbar, in accordance with some embodiments.
Figure 8P:
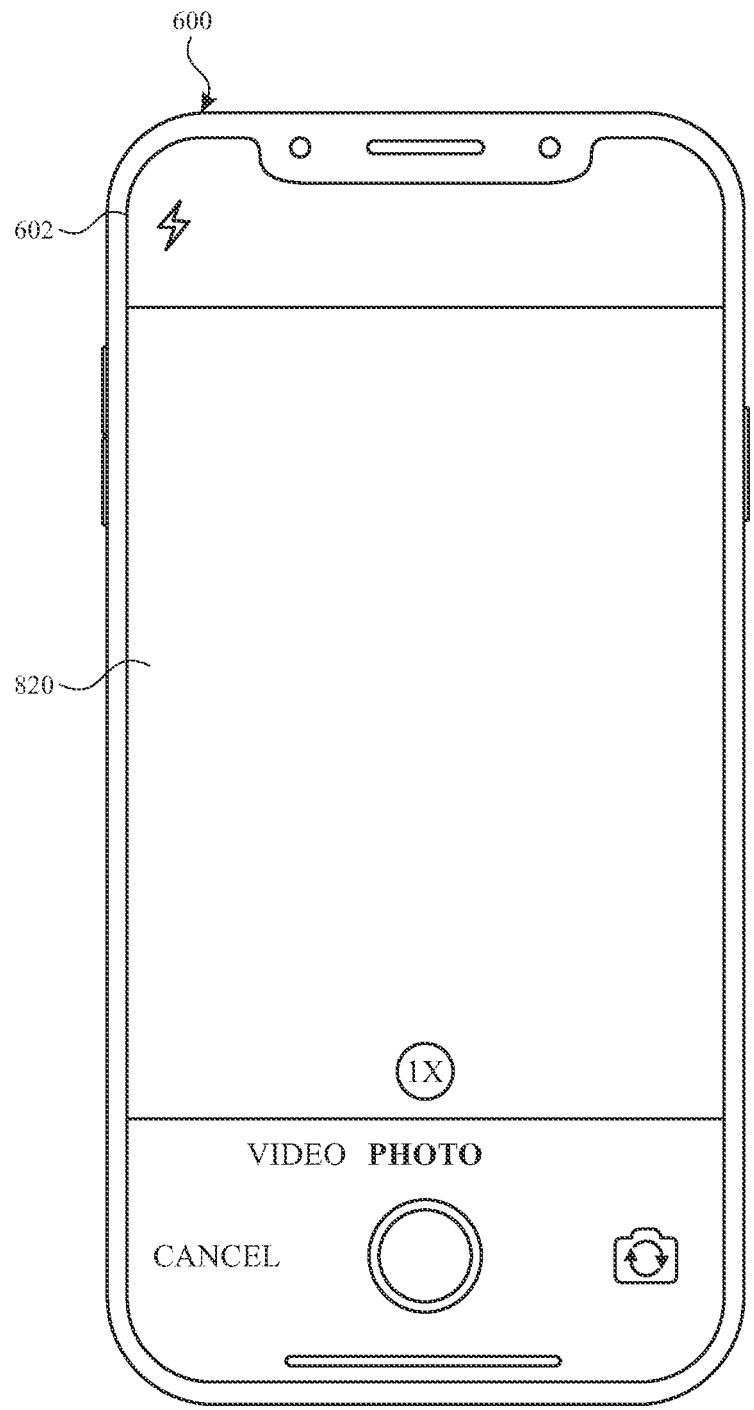
Figure 9B:
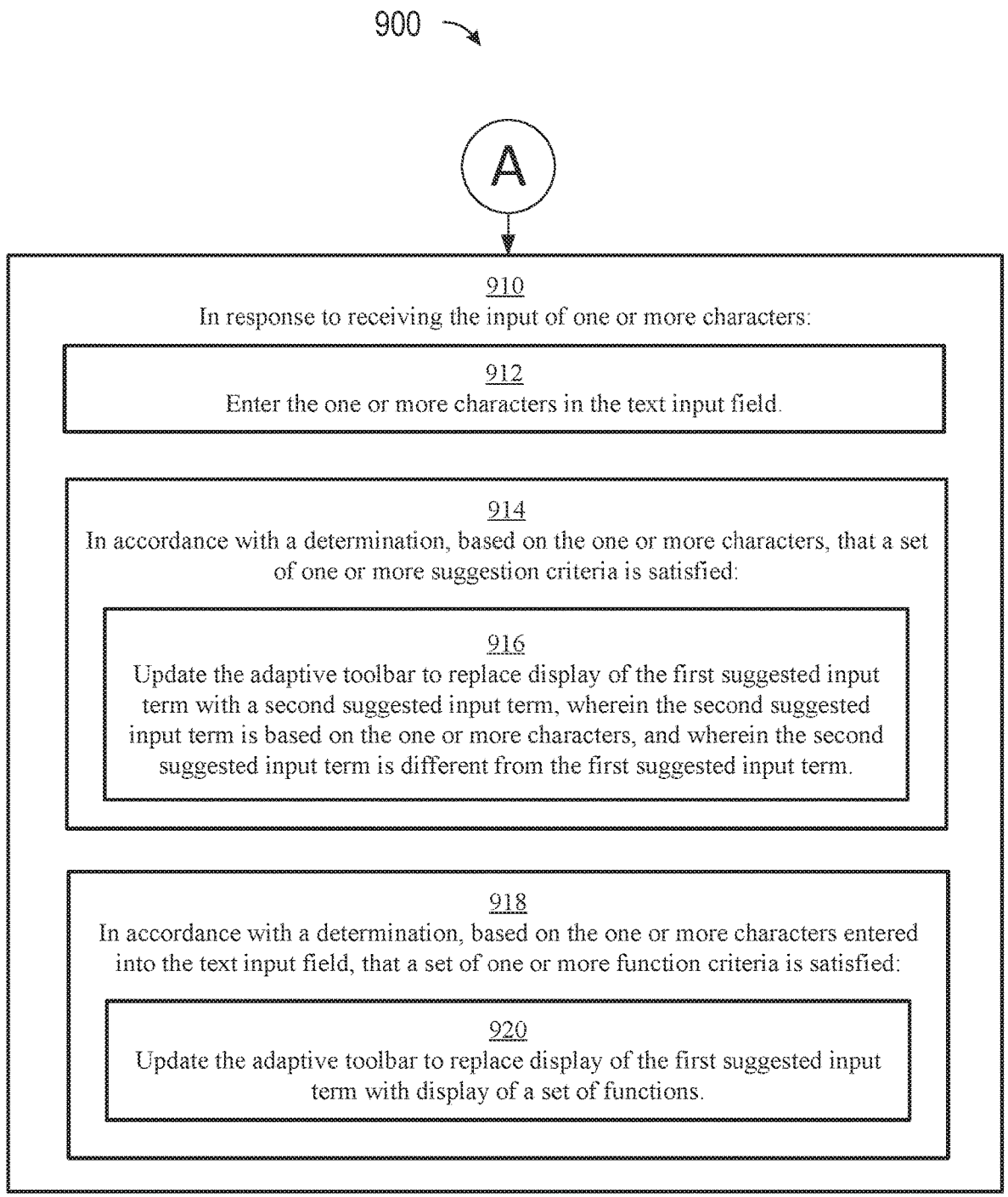
Figure 10A:
FIGS. 10A-10Q illustrate exemplary user interfaces for accessing document functions, in accordance with some embodiments.

Below, FIGS. 1A-1B, 2, 3, 4A-4B, and 5A-5H provide a description of exemplary devices for performing the techniques for managing event notifications. FIGS. 6A-6J illustrate exemplary user interfaces for selecting a contact identifier. FIG. 7 is a flow diagram illustrating methods of selecting a contact identifier in accordance with some embodiments. The user interfaces in FIGS. 6A-6J are used to illustrate the processes described below, including the processes in FIG. 7. FIGS. 8A-8P illustrate exemplary user interfaces for providing an adaptive toolbar. FIGS. 9A-9B is a flow diagram illustrating methods of providing an adaptive toolbar in accordance with some embodiments. The user interfaces in FIGS. 8A-8P are used to illustrate the processes described below, including the processes in FIGS. 9A-9B. FIGS. 10A-10Q illustrate exemplary user interfaces for accessing document functions. FIG. 11 is a flow diagram illustrating methods of accessing document functions in accordance with some embodiments. The user interfaces in FIGS. 10A-10Q are used to illustrate the processes described below, including the processes in FIG. 11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
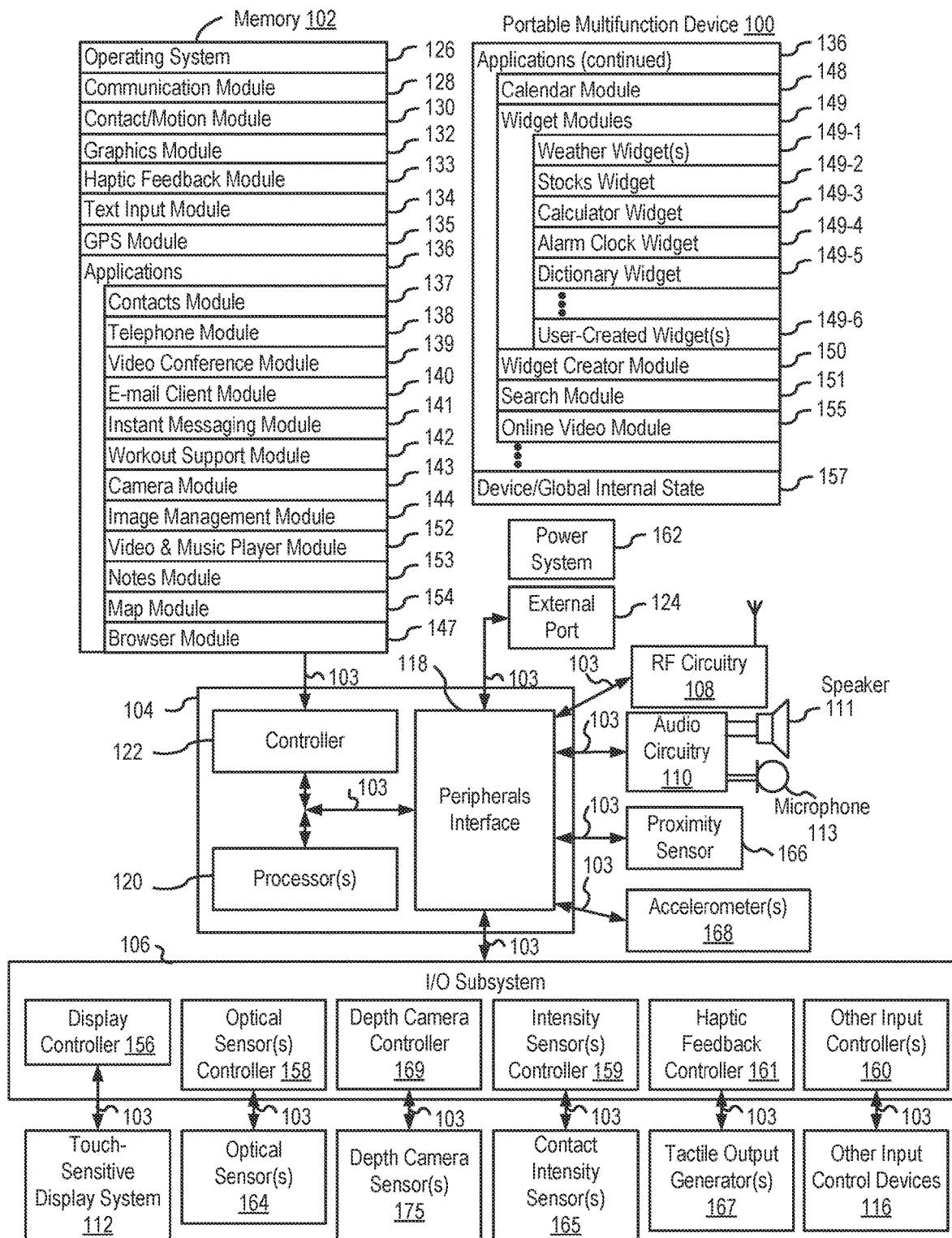
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
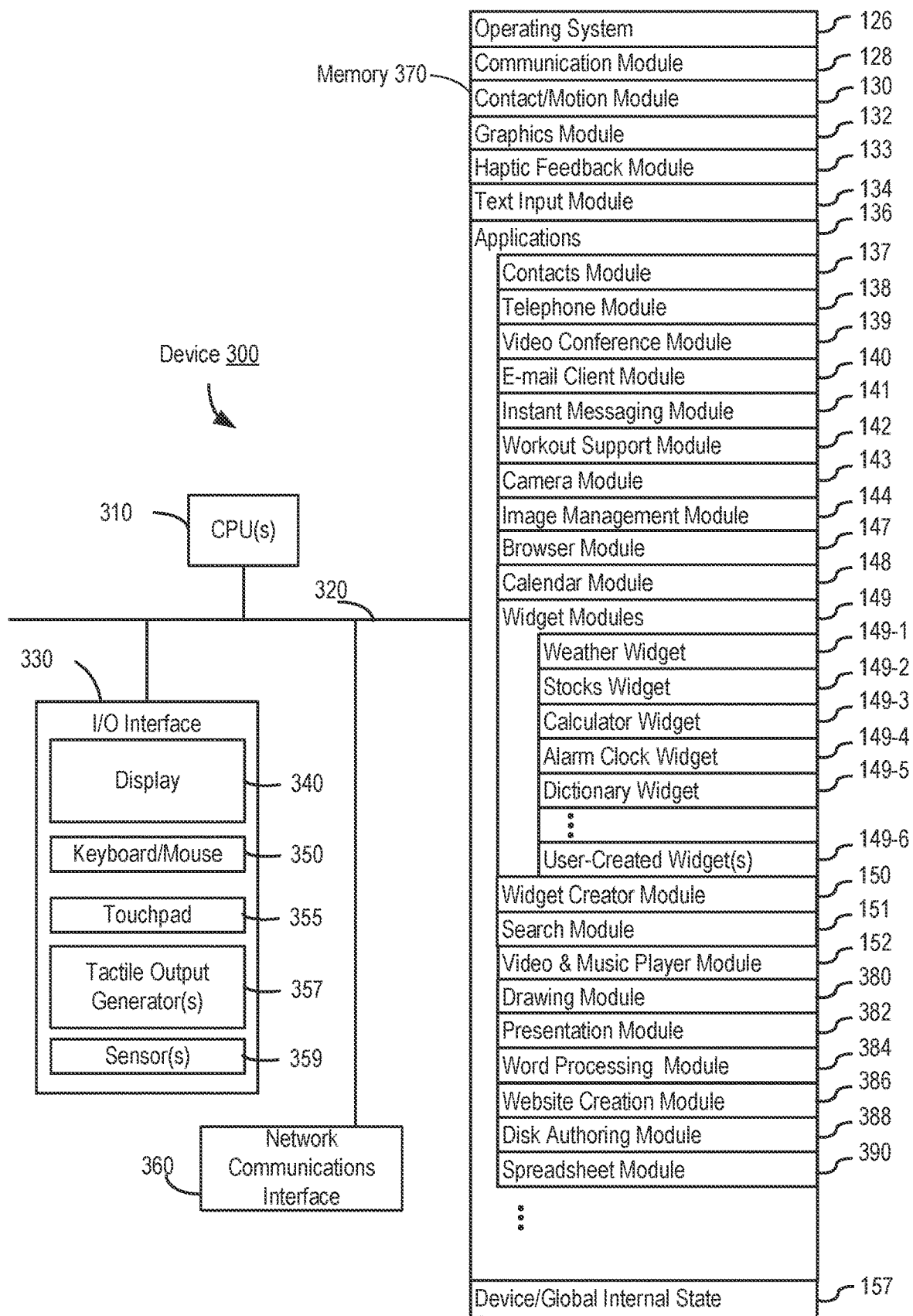
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
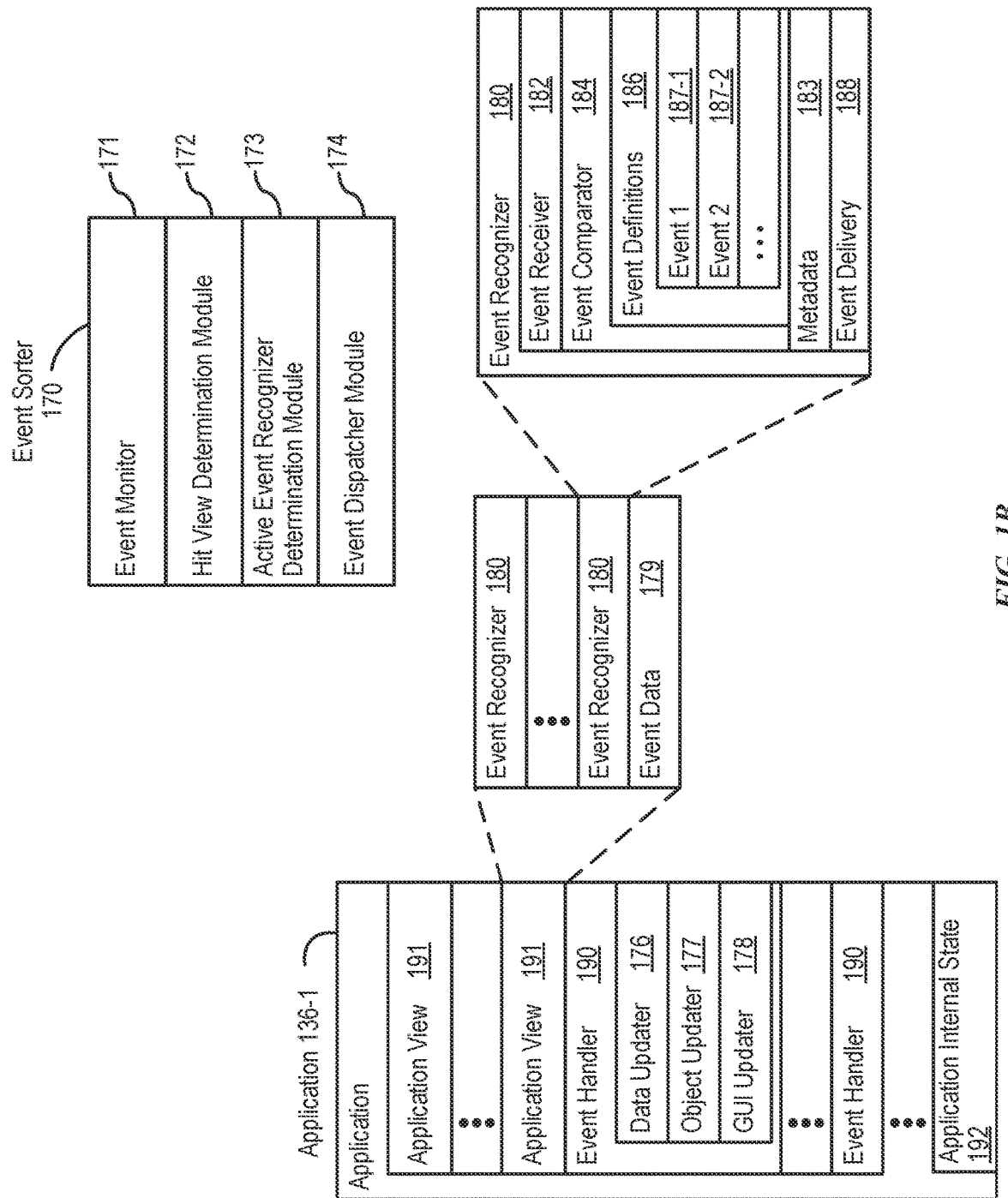
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
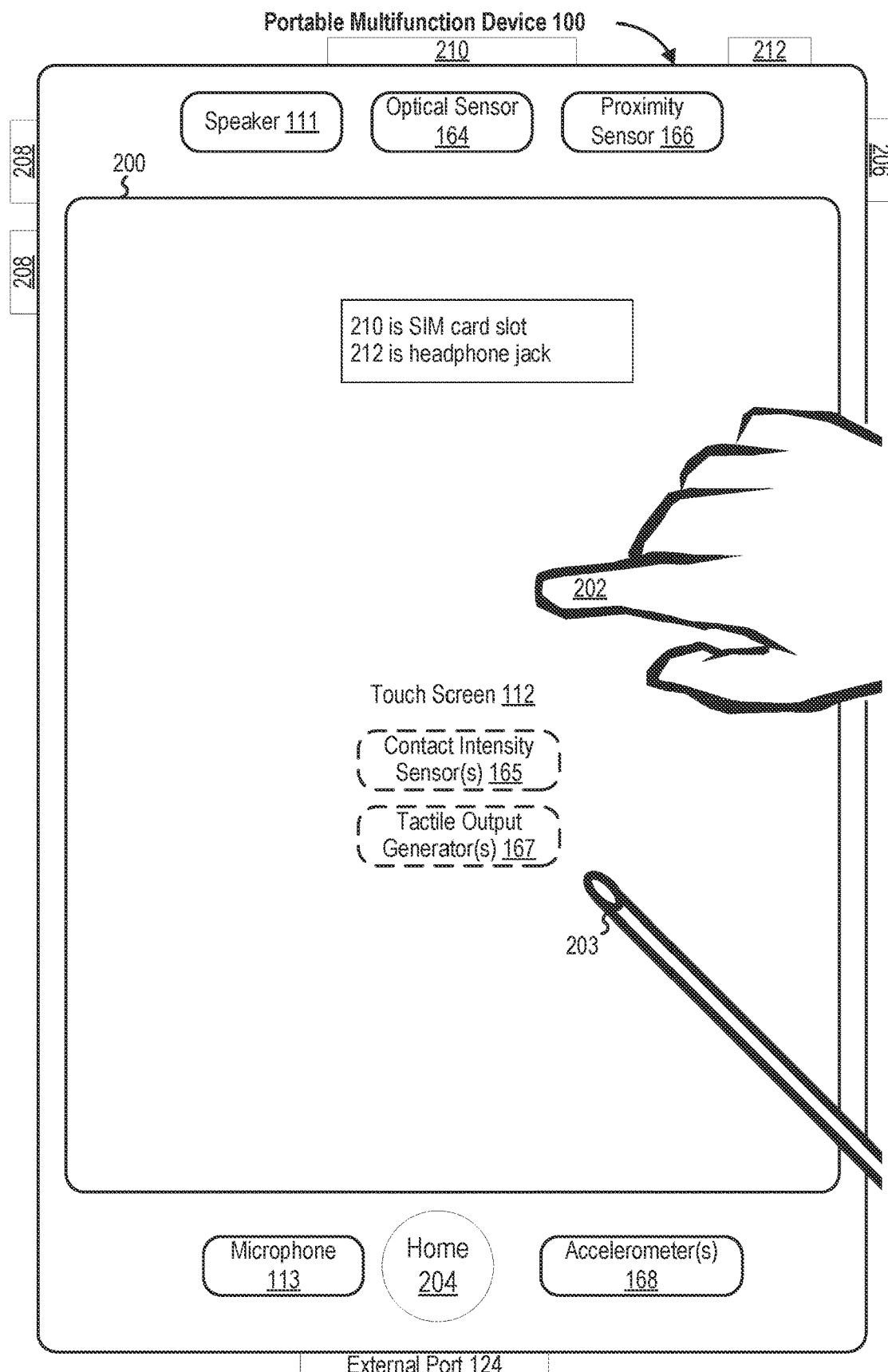
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
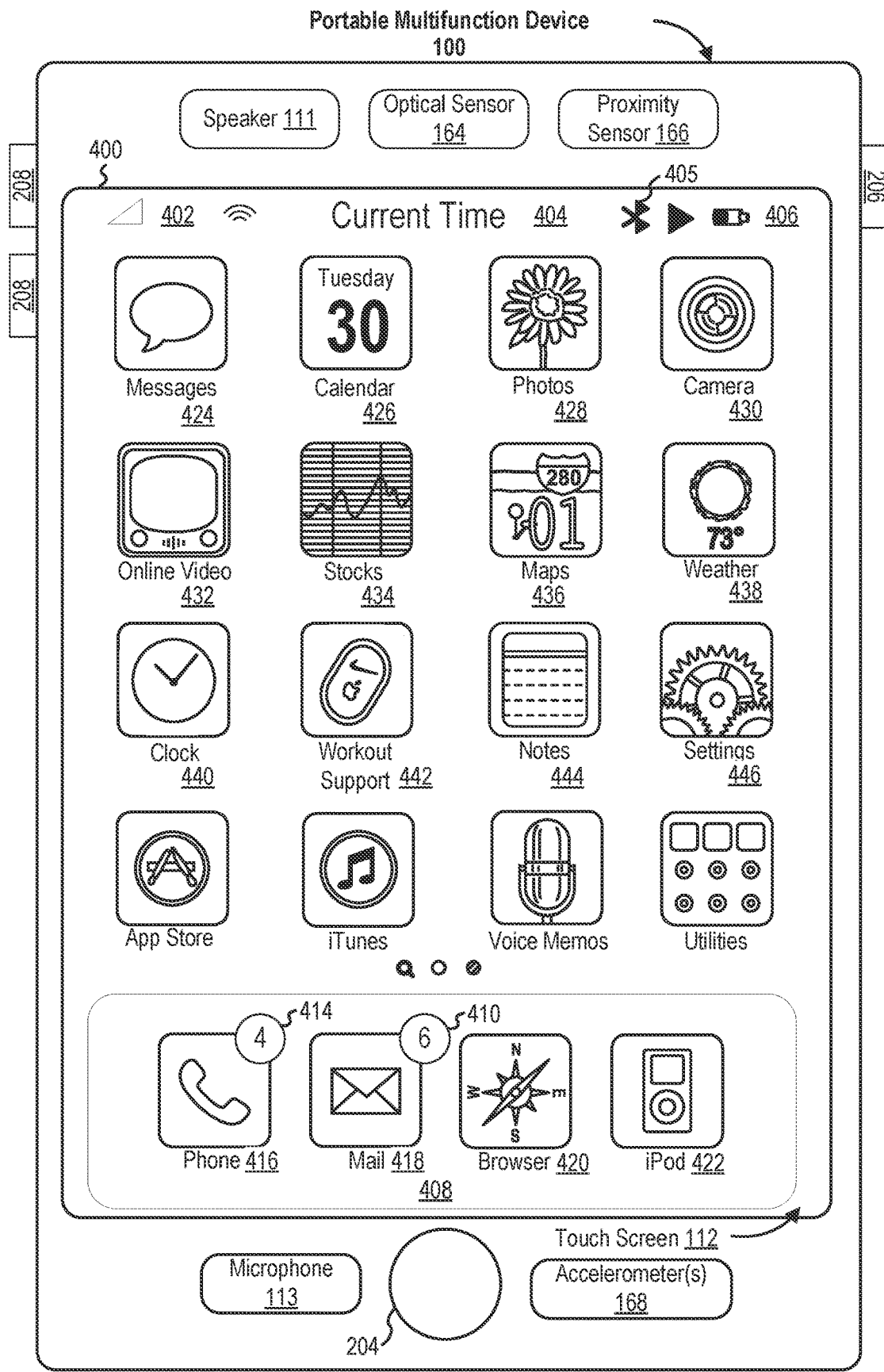
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
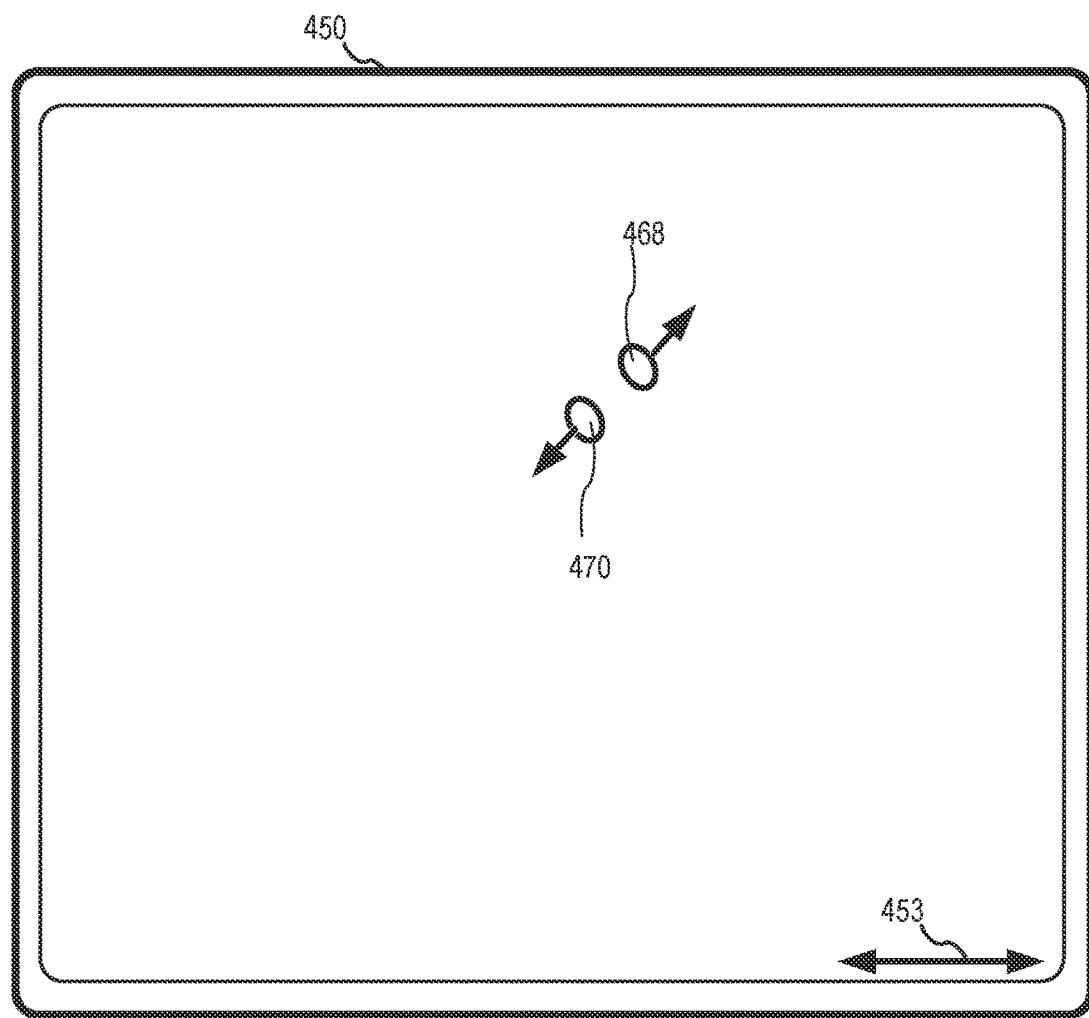
FIG. 4B illustrates an exemplary user interface for a multifunction device with a touch-sensitive surface that is separate from the display in accordance with some embodiments.
Figure 4B:
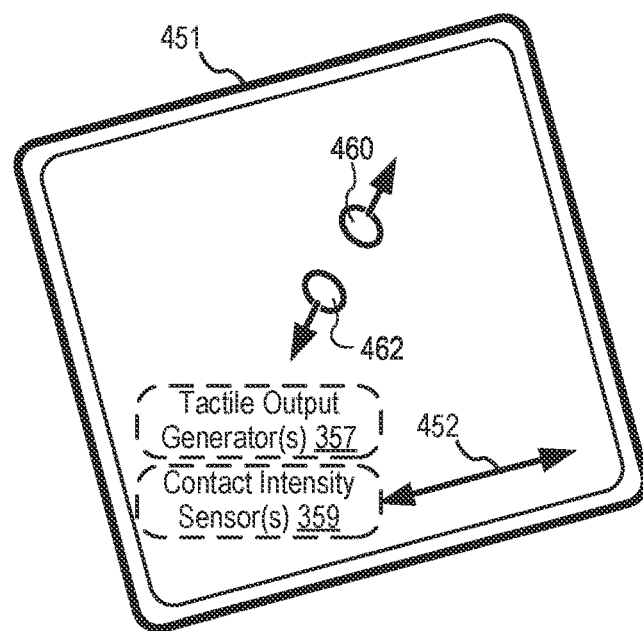

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
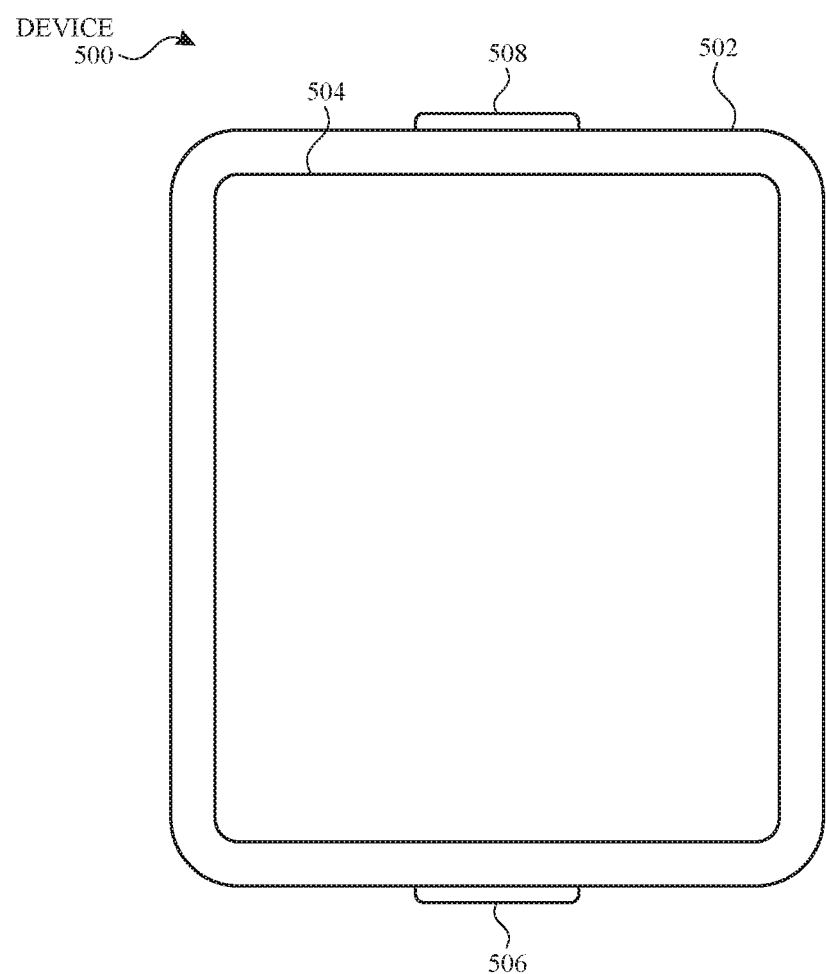
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
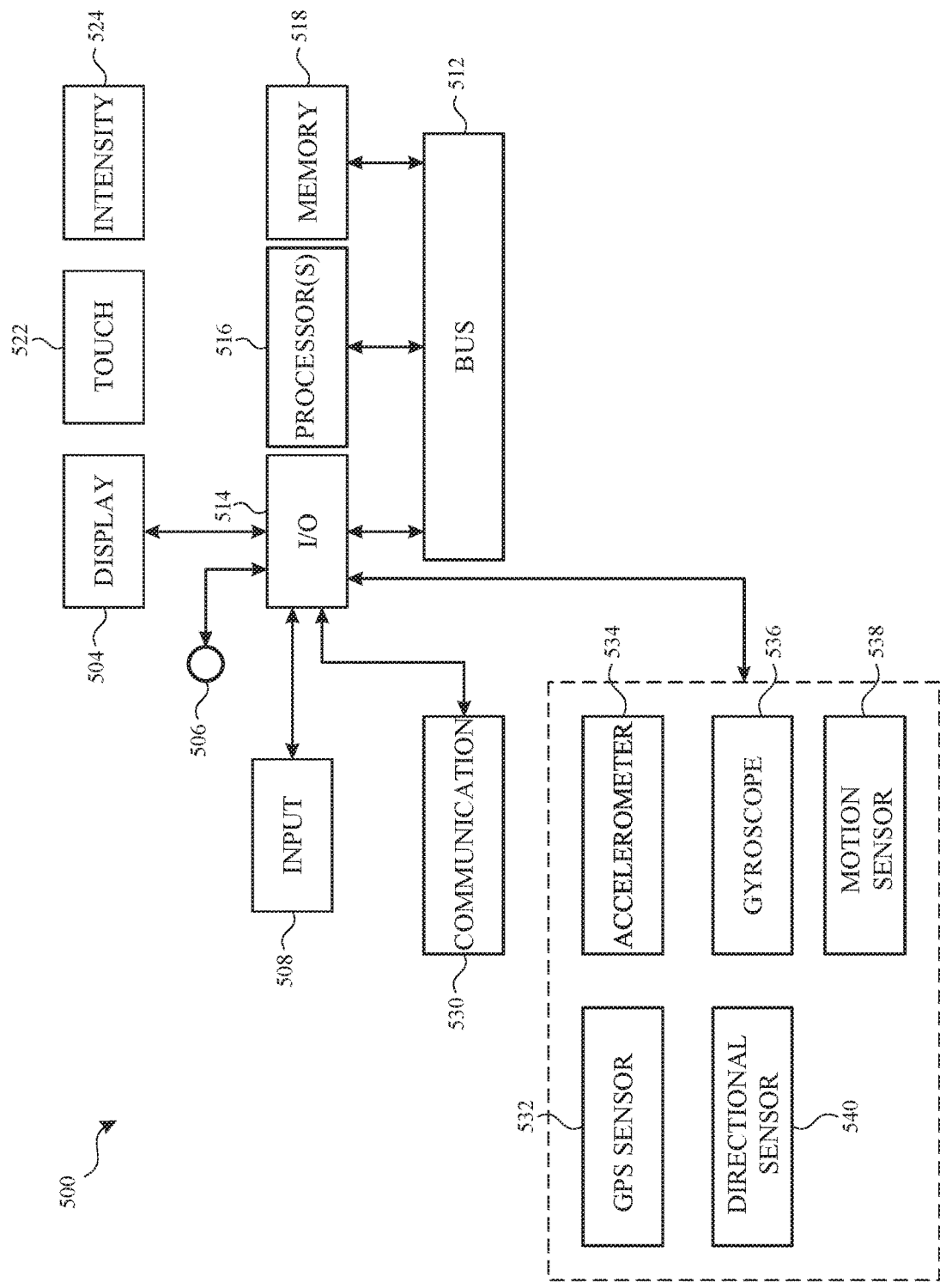
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
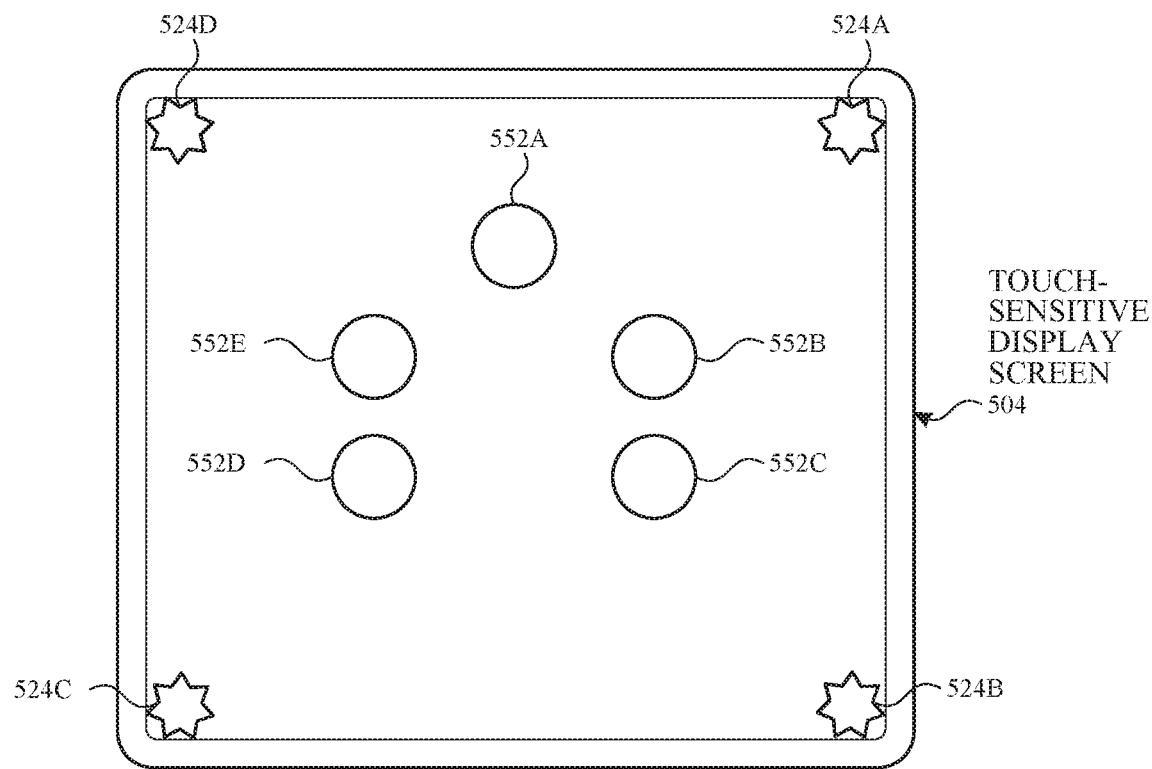
FIGS. 5C-5D illustrate exemplary components of a personal electronic device having a touch-sensitive display and intensity sensors in accordance with some embodiments.
Figure 5C:
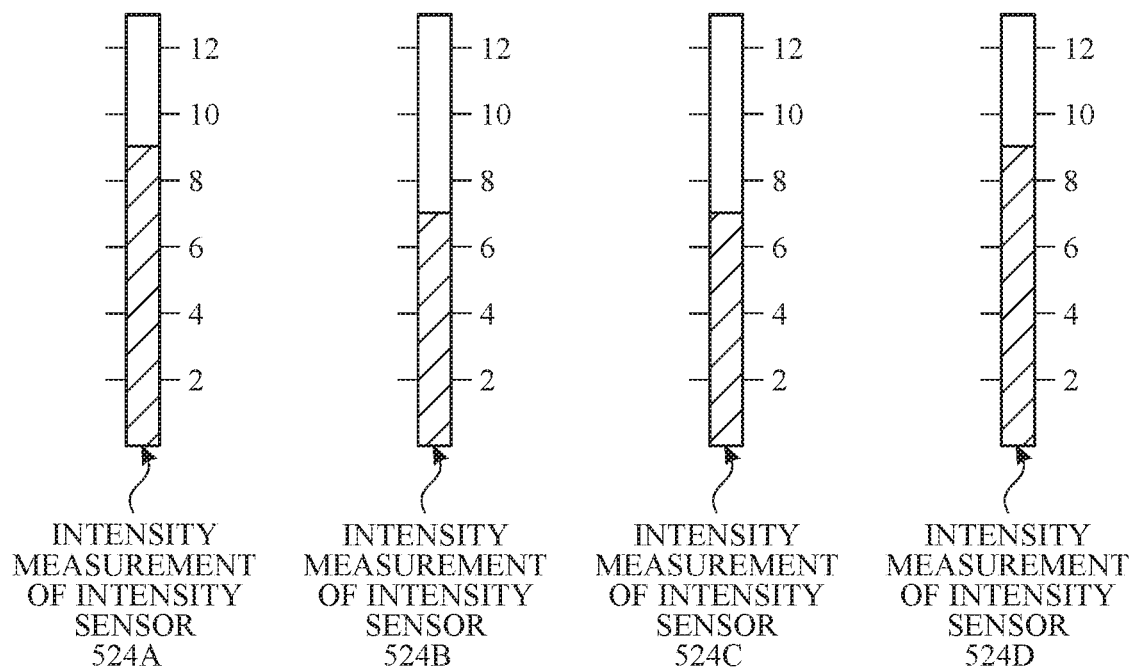
Figure 5D:
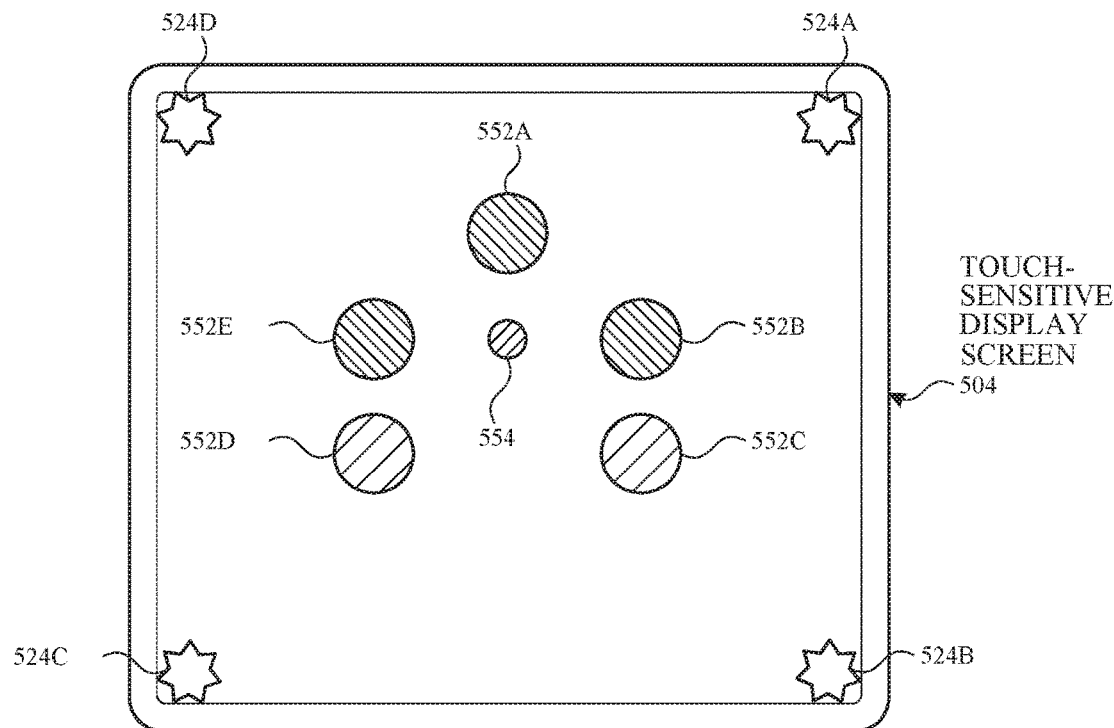
Figure 5D:
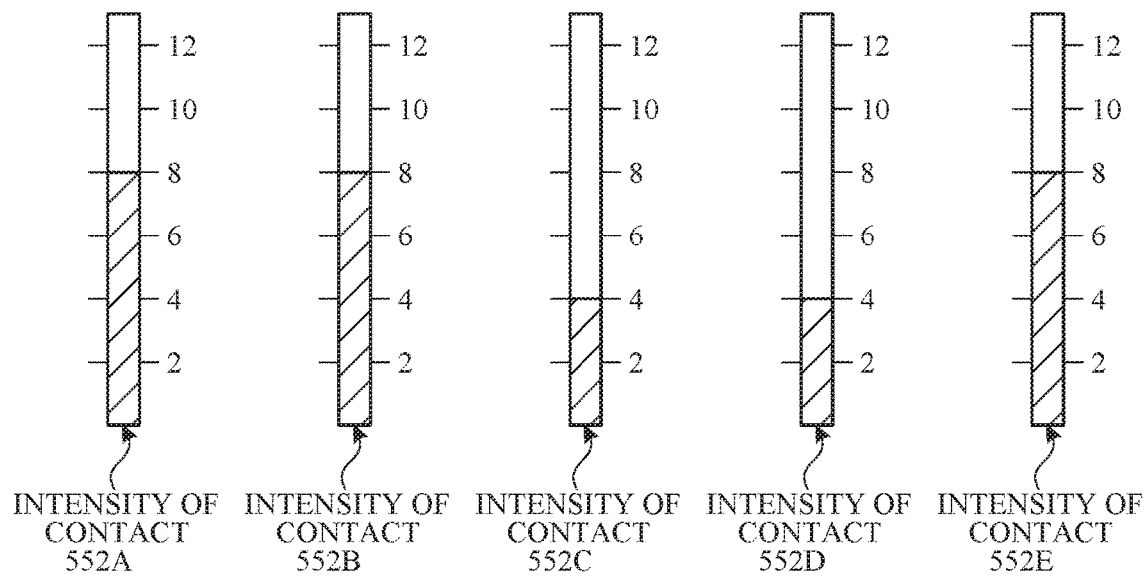

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
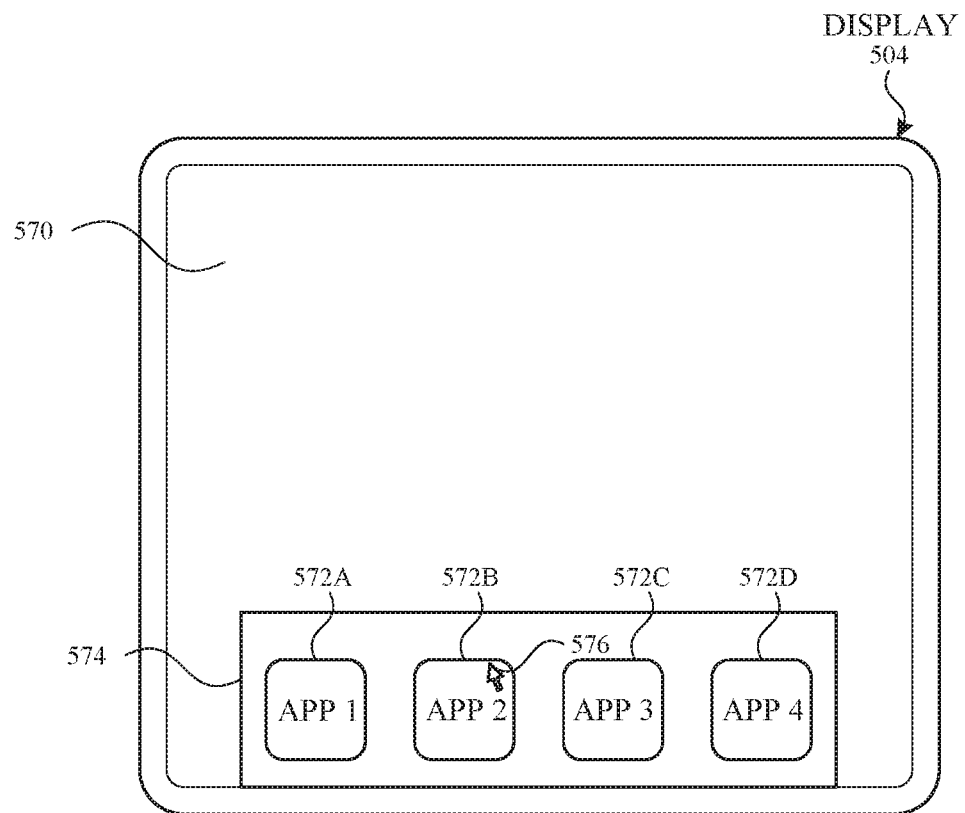
FIGS. 5E-5H illustrate exemplary components and user interfaces of a personal electronic device in accordance with some embodiments.
Figure 5E:
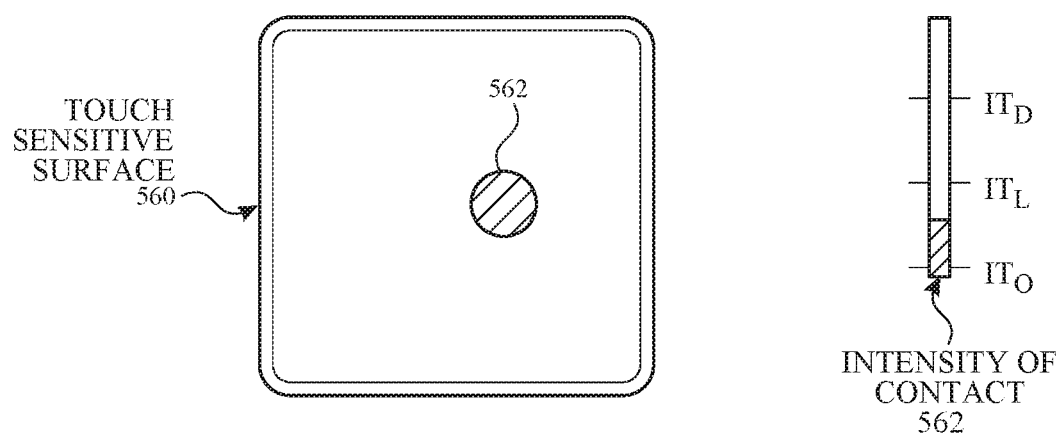
Figure 5F:
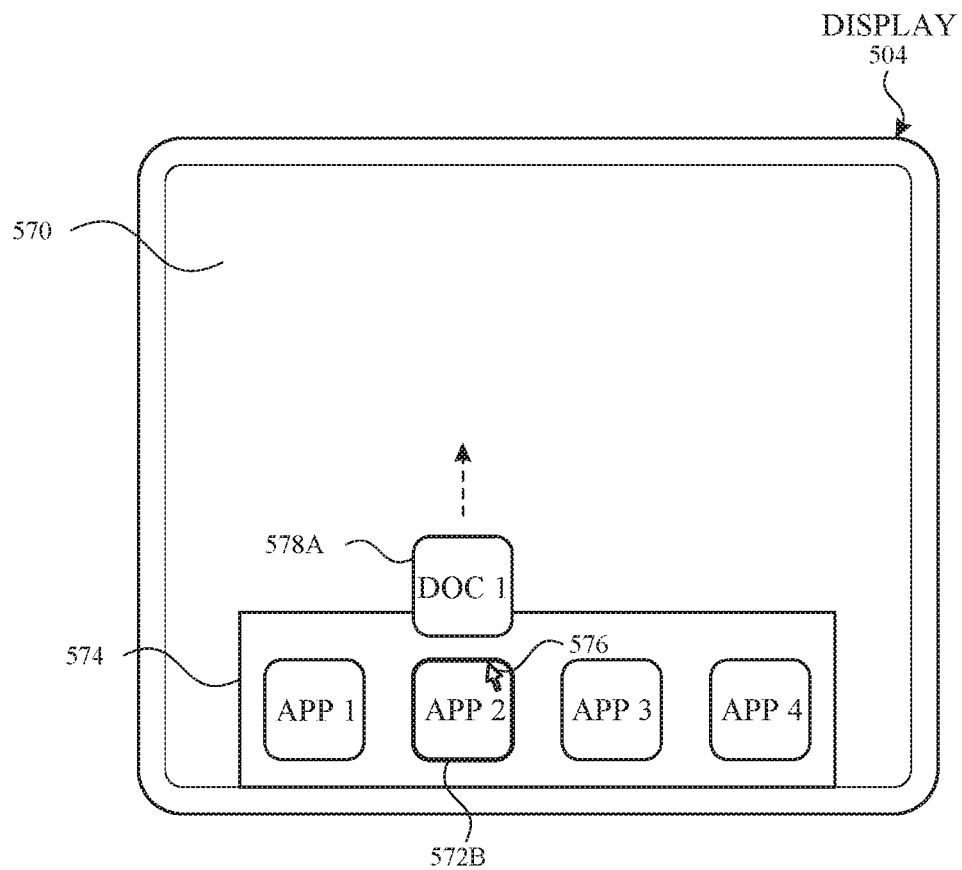
Figure 5F:
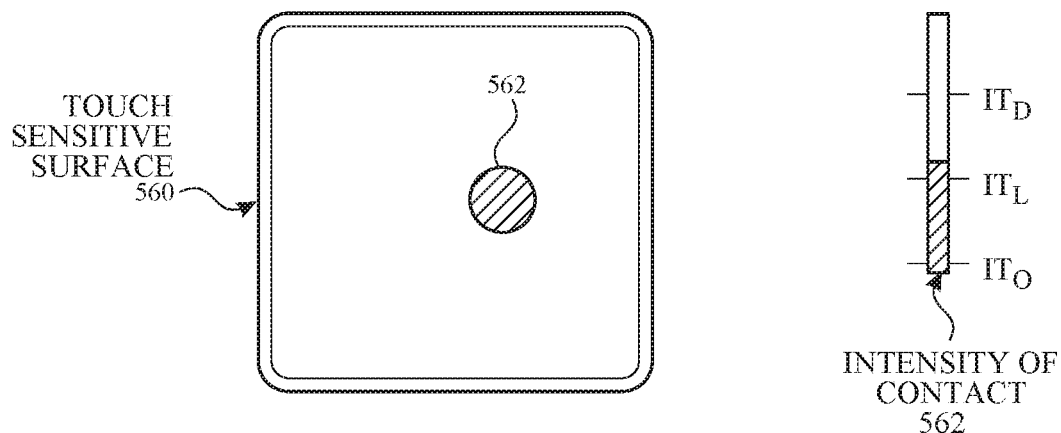
Figure 5G:
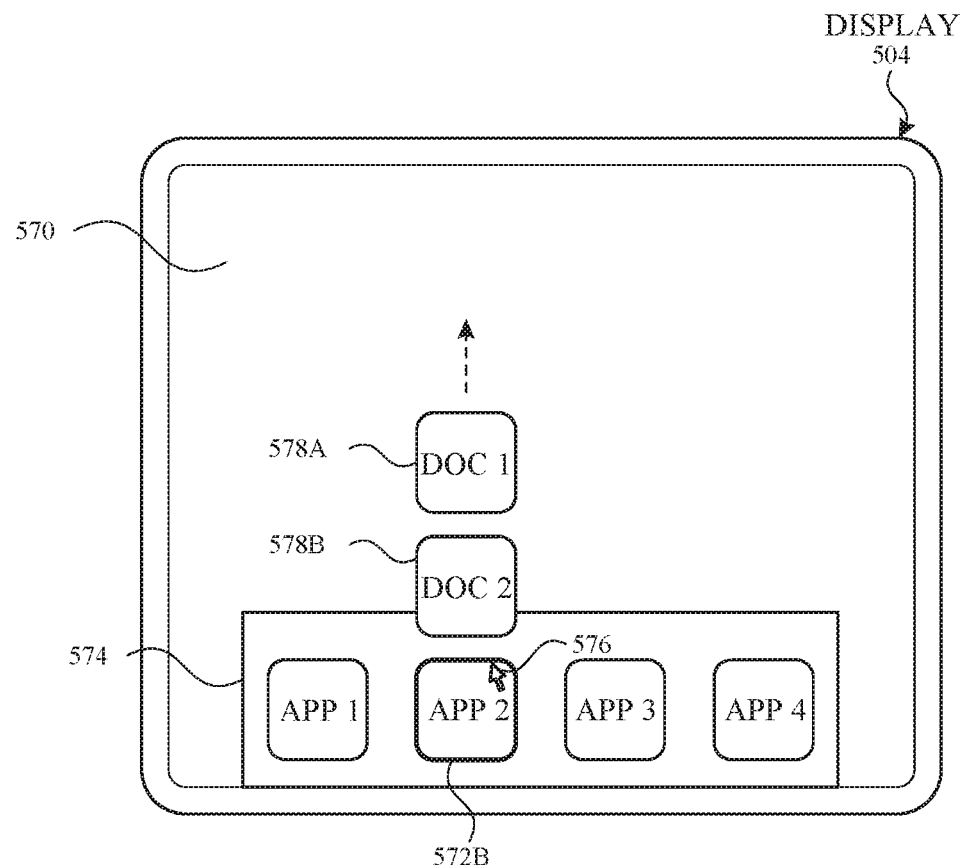
Figure 5G:
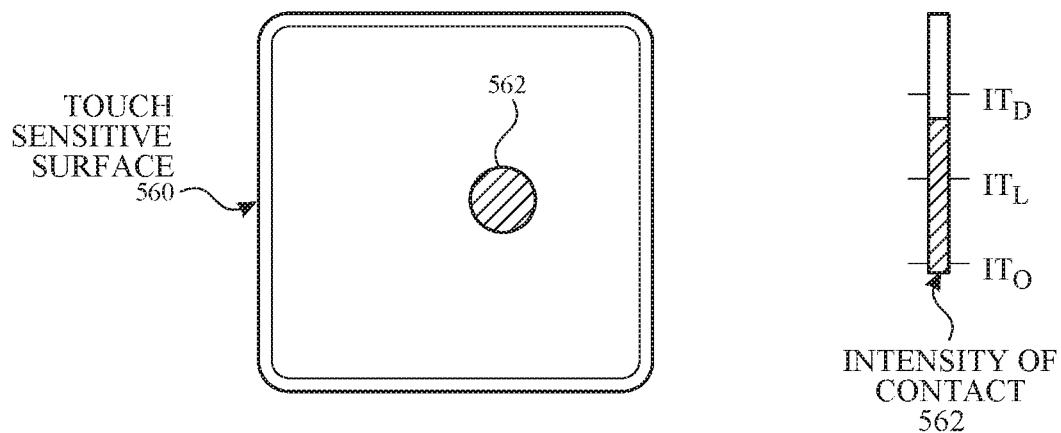
Figure 5H:
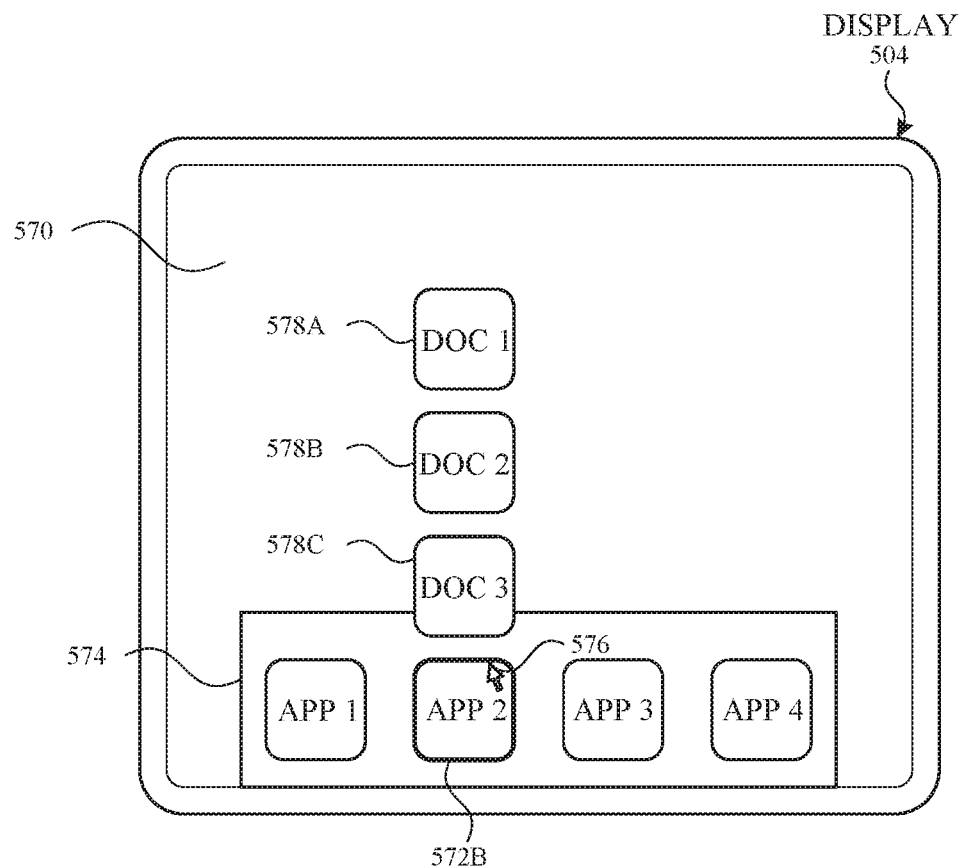
Figure 5H:
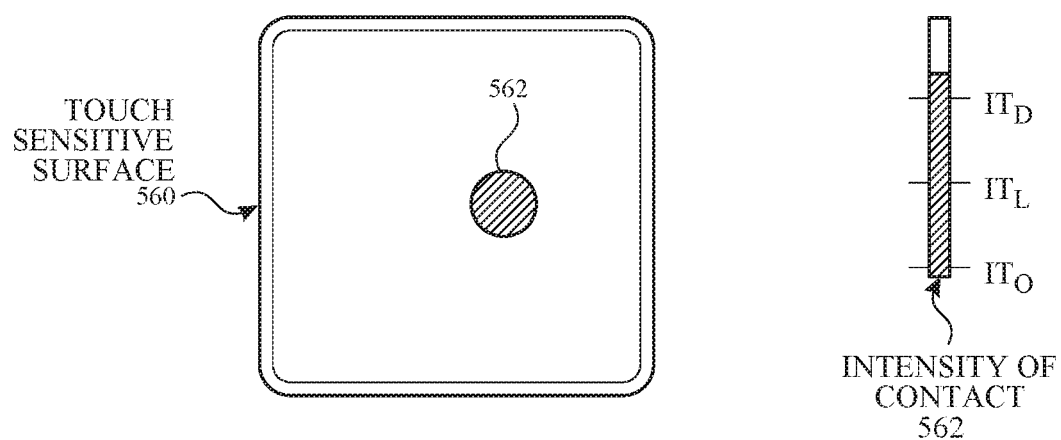

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6J illustrate exemplary user interfaces for selecting a contact identifier, in accordance with some embodiments. The user interfaces in these figures are used to illustrate the processes described below, including the processes in FIG. 7.

Figure 6A:
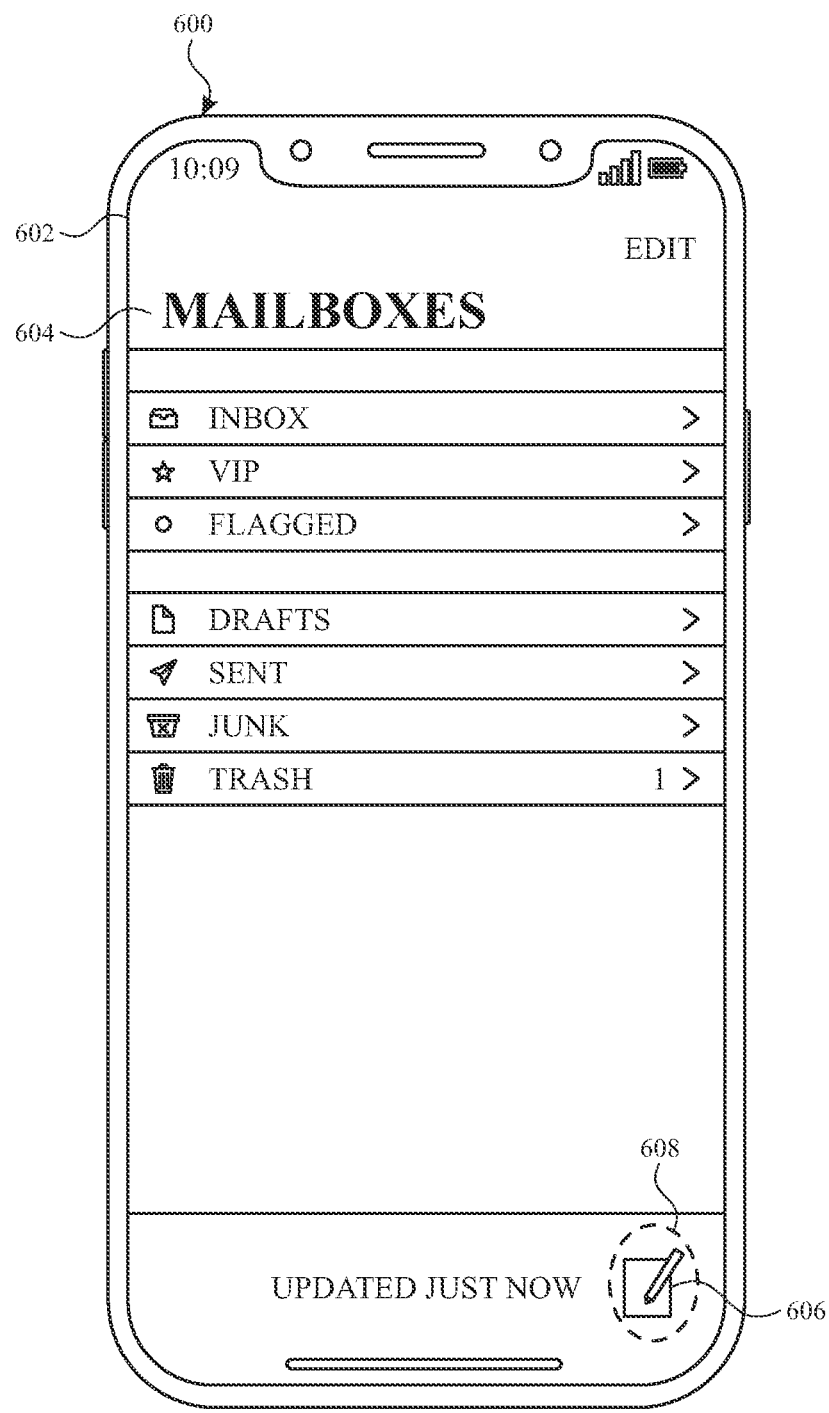
FIGS. 6A-6J illustrate exemplary techniques for selecting a contact identifier, in accordance with some embodiments.

FIG. 6A depicts electronic device 600, which is a smartphone with display 602. Display 602 includes a touch-sensitive surface on which electronic device 600 can detect user gestures (e.g., tap, swipe, drag). In some embodiments, electronic device 600 is, or includes one or more features of, electronic device 100, 300, or 500.

At FIG. 6A, electronic device 600 displays mailbox user interface 604 for an email application. Mailbox user interface 604 includes multiple email mailboxes including, for example, Inbox, Sent, and Trash. Mailbox user interface 604 also includes compose button 606.

Figure 6B:
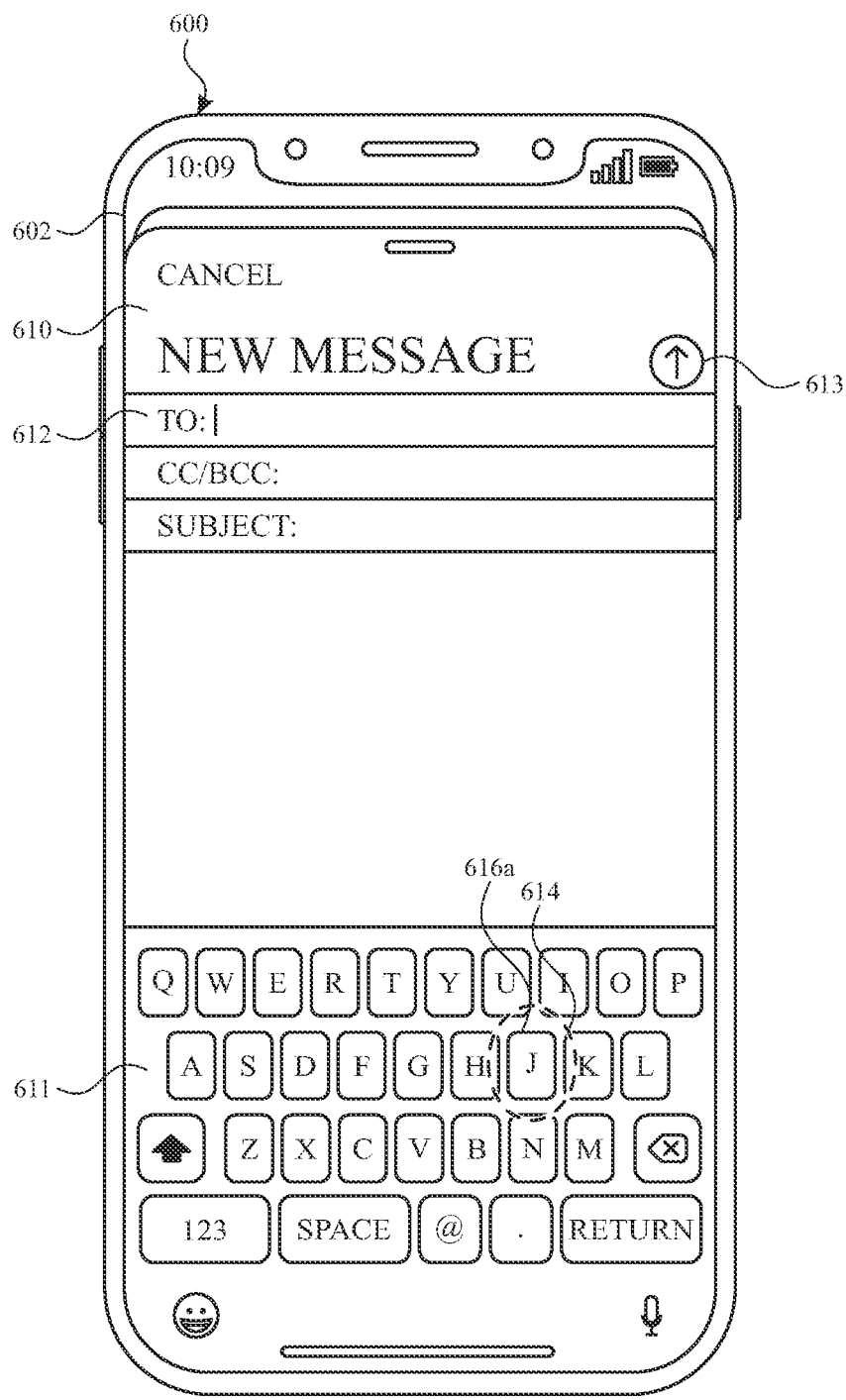

To begin drafting a new email message, a user performs a tap gesture on compose button 606. As a result, while displaying mailbox user interface 604, electronic device 600 detects tap gesture 608 at compose button 606. Upon detecting tap gesture 608, electronic device 600 displays new email user interface 610, as shown in FIG. 6B. New email user interface 610 includes keyboard 611 for entering characters into text fields of new email user interface 610, such as To: field 612. New email user interface 610 also includes send button 613, which, when selected, triggers sending of the contents (e.g., in the body of the email) in new email user interface 610 to the recipient(s) (e.g., the email address in To: field 612).

At FIG. 6B, the user begins to type the name of the intended recipient of the email message in To: field 612. As a result, electronic device 600 detects tap gesture 614 at "J" key 616a.

Figure 6C:
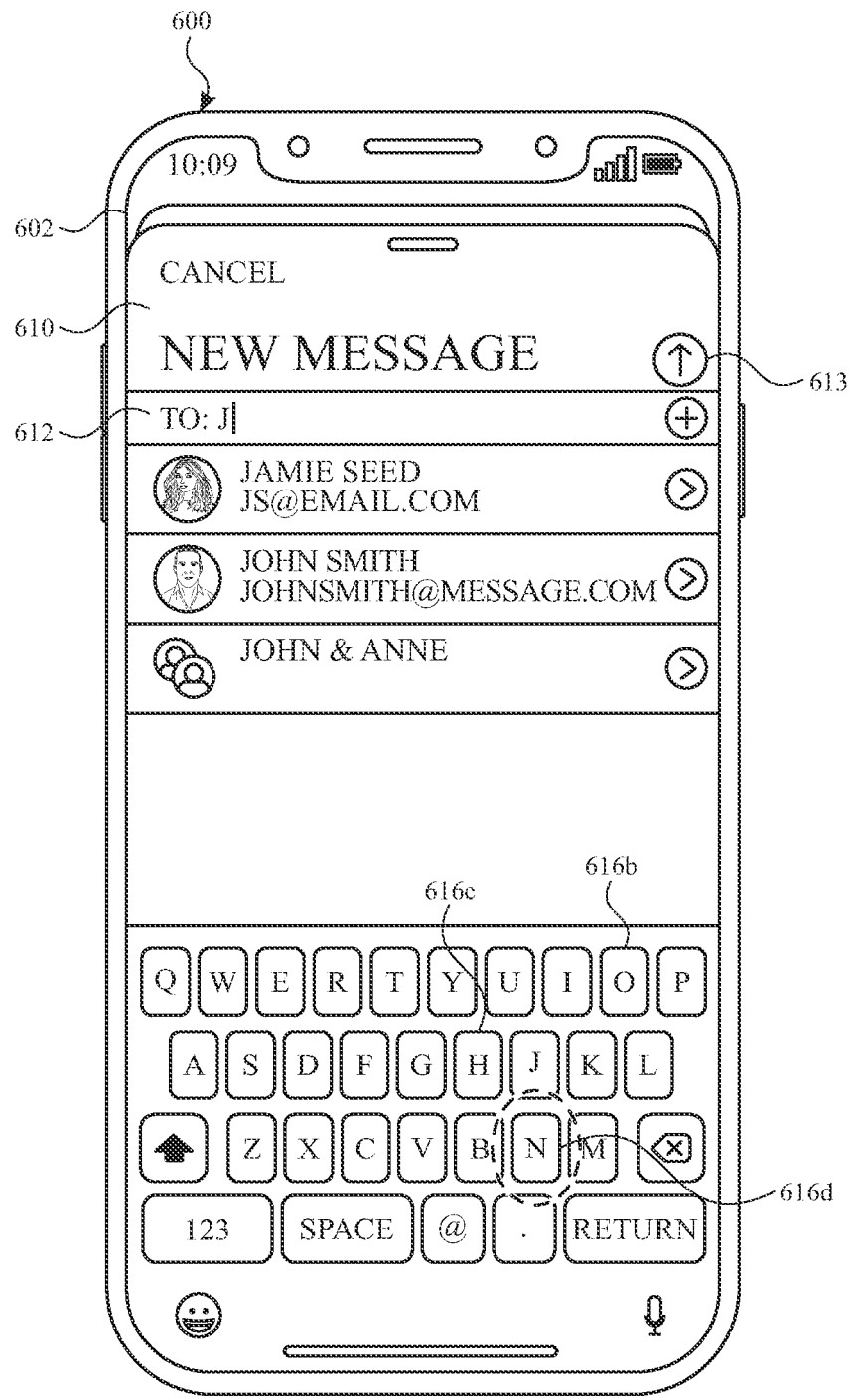

At FIG. 6C, upon detecting tap gesture 614, electronic device 600 enters the "J" character in To: field 612. Upon entering the "J" character, electronic device 600 displays search results based on the entered character. The user continues to type the name of the intended recipient of the email message. As a result, electronic device 600 detects tap gestures at "O" key 616b and "H" key 616c, followed by tap gesture 624 at "N" key 616d.

Figure 6D:
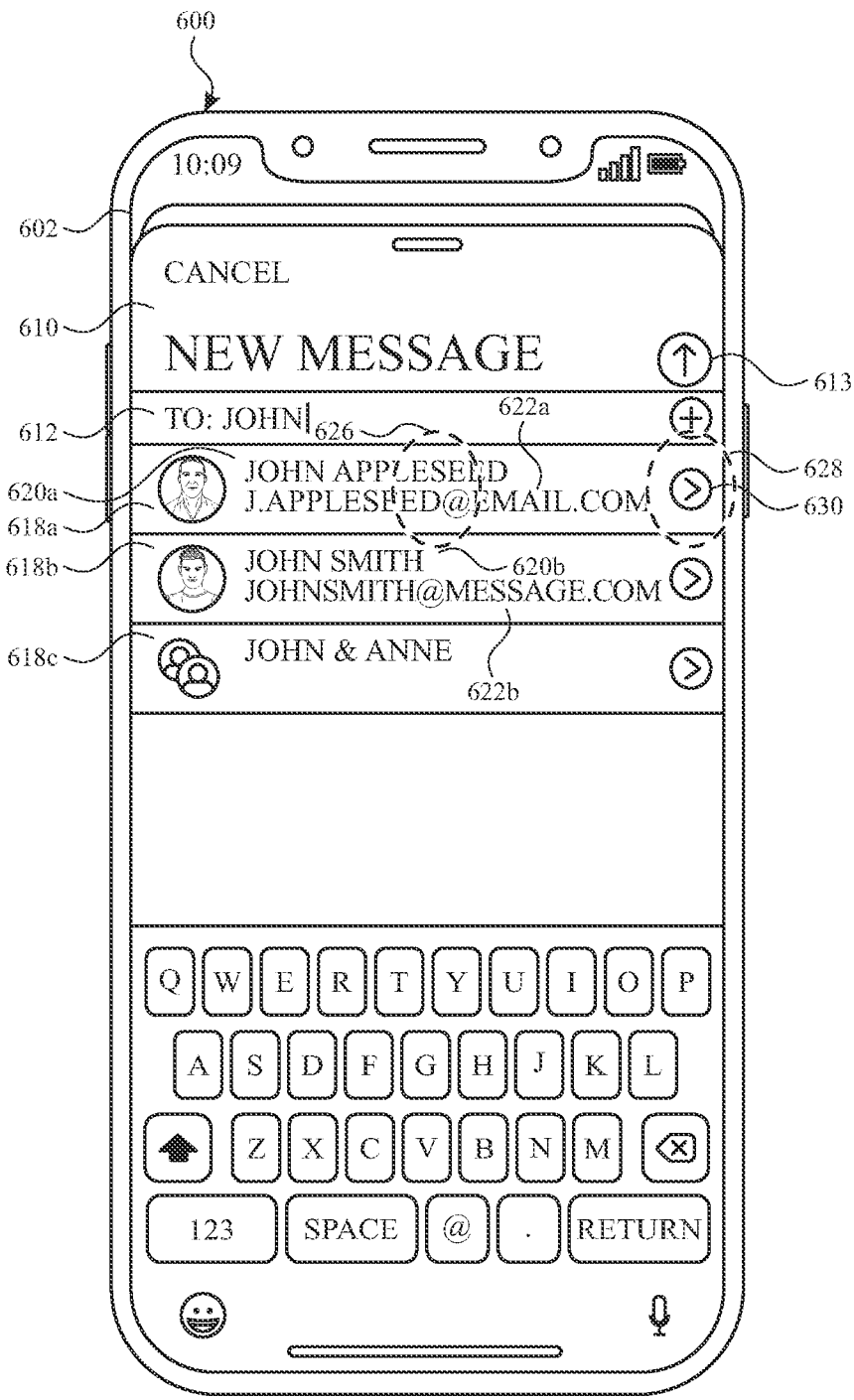

At FIG. 6D, upon detecting the tap gestures (on keys O, H, N), electronic device 600 has entered "John" in To: field 612. Upon entering "John", electronic device 600 displays search results 618a-618c, which are based on the entered characters ("John"). Search results 618a-618c correspond to possible candidates for the intended recipient of the email message. In some embodiments, the search results (e.g., 618a-618c) are ranked from top to bottom based on correspondence or relevance to the entered characters. In some embodiments, a search result corresponds to a single contact entry in an address book stored on electronic device 600.

As depicted in FIG. 6D, search result 618a includes name 620a (e.g., "John Appleseed") and email address 622a ("j.appleseed@email.com"). As discussed below, name 620a is associated with multiple email addresses (e.g., "j.appleseed@email.com", "john.as@work.com", "johnny.apple@fun.com"). Instead of concurrently displaying the multiple email addresses associated with name 620a, electronic device 600 displays a single email address associated with name 620a upon entering the characters (e.g., "John"). Similarly, search result 618b includes name 620b (e.g., "John Smith") and a single email address (e.g., 622b) associated with name 620b.

In some embodiments, electronic device 600 determines the most appropriate email address prior to displaying the single email address. For example, electronic device 600 determines that the user of electronic device 600 most commonly uses "j.appleseed@email.com" when emailing John Appleseed. As another example, electronic device 600 determines that the user of electronic device 600 most recently used "j.appleseed@email.com" when the user last emailed John Appleseed. As yet another example, electronic device 600 determines the most appropriate email address using the domain address of the sender. Thus, if the domain of the sender's email address (the user of electronic device 600) is "work.com", electronic device 600 would attempt to select a recipient email address that also has the domain address "work.com".

Figure 6E:
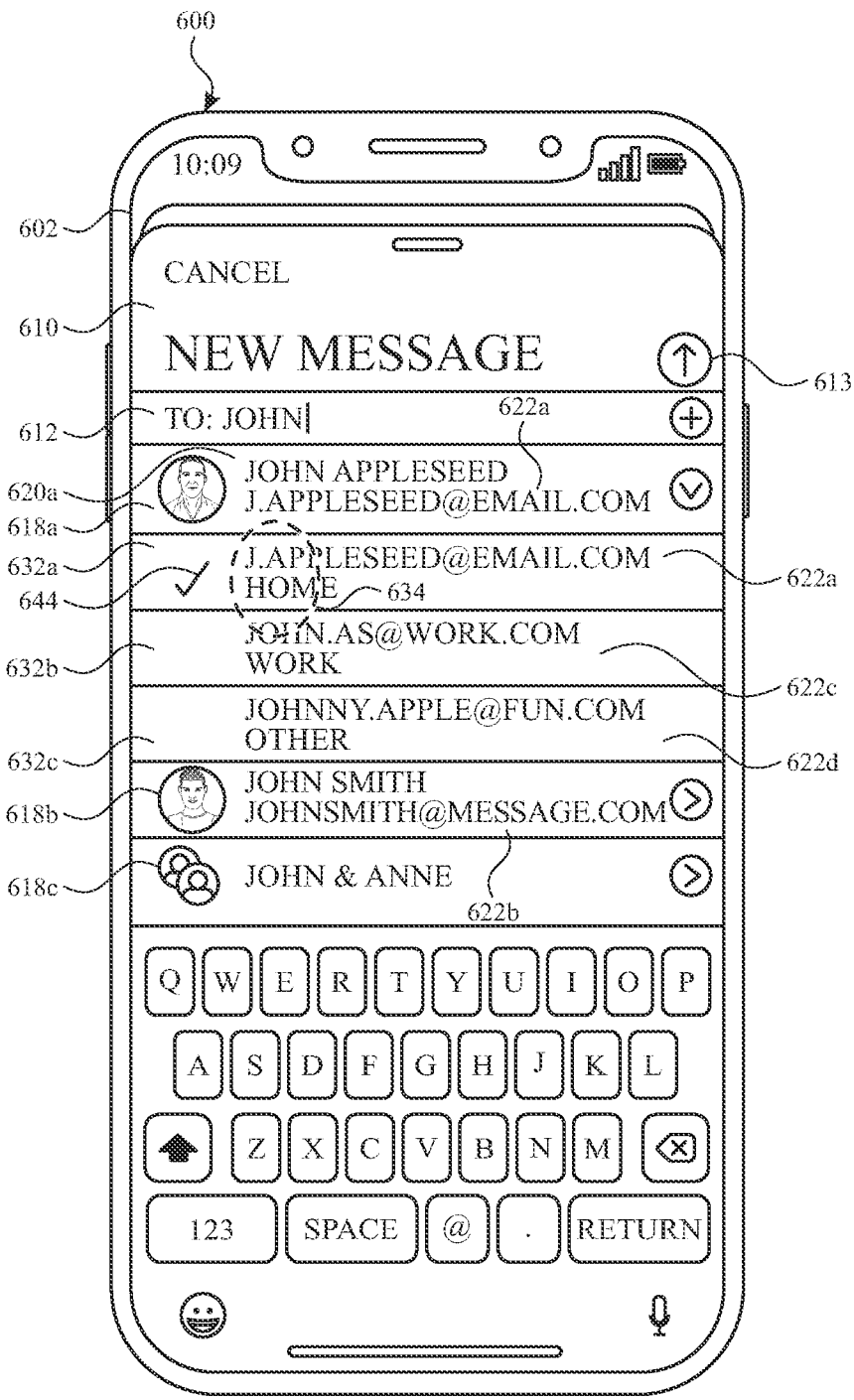
Figure 6F:
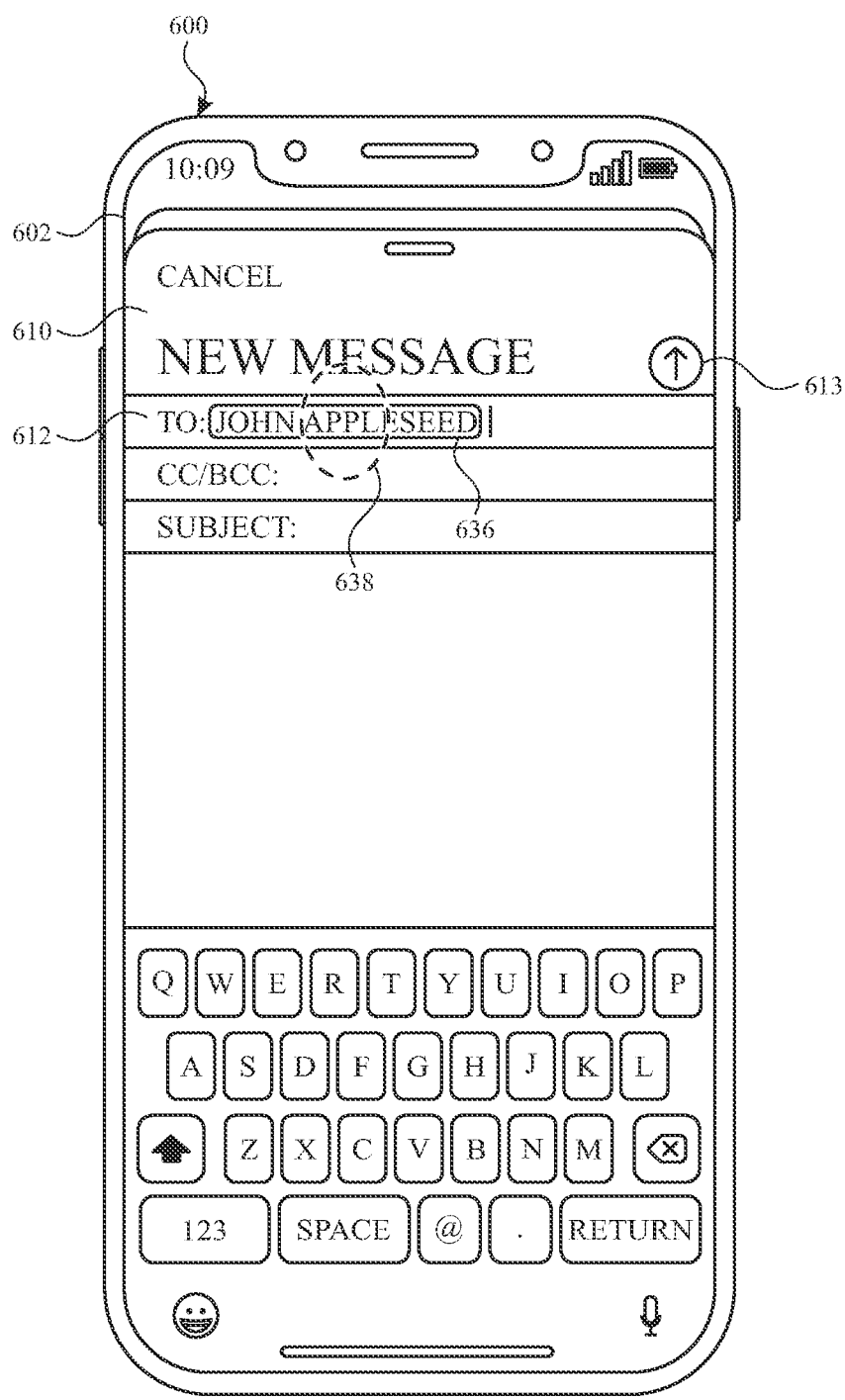

In some embodiments, a user can select a search result for entry into To: field 612. For example, electronic device 600 detects tap gesture 626 at search result 618*a*. In this example, upon detecting tap gesture 626, electronic device 600 enters the contact information (e.g., email address 622*a*) associated with search result 618*a* into To: field 612, as depicted in FIG. 6F. Further upon detecting tap gesture 626, electronic device 600 ceases to display search results 618*a*-618*c*, as depicted in FIG. 6F.

Referring back to FIG. 6D, the user performs a tap gesture to see additional email addresses associated with name 620*a* (e.g., John Appleseed). As a result, electronic device 600 detects tap gesture 628 at chevron icon 630, which corresponds to search result 618*a*.

At FIG. 6E, upon detecting tap gesture 628, electronic device 600 displays expanded results 632*a*-632*c* below search result 618*a*. Expanded results 632*a*-632*c* includes email address 622*a* in addition to other email addresses associated with name 620*a* (e.g., email addresses 622*c*-622*d*). Expanded result 632*a* includes checkmark 644 being displayed adjacent to email address 622*a*. Checkmark 644 provides an indication of which email address (e.g., 622*a*) is currently selected as the email address to be used for name 620*a*. In order to display expanded results 632*a*-632*c*, electronic device 600 shifts display of search results 618*b*-618*c* downwards.

After reviewing the expanded list of email addresses associated with name 620*a*, the user proceeds with email address 622*a*, as originally suggested by electronic device 600. As a result, electronic device 600 detects tap gesture 634 at expanded result 632*a*. Upon detecting tap gesture 634, electronic device 600 enters the contact information (e.g., email address 622*a*) associated with expanded result 632*a* into To: field 612, as depicted in FIG. 6F. Further upon detecting tap gesture 634, electronic device 600 ceases to display search results 618*a*-618*c* and expanded results 632*a*-632*c*.

At FIG. 6F, electronic device 600 displays representation 636, which is a selectable user interface object representing email address 622*a* in To: field 612. In this example, representation 636 includes the name of the recipient, but does not include a visual indication of the recipient's selected email address. The user performs a series of tap gestures to access the multiple email addresses (e.g., 622*a*, 622*c*-622*d*) associated with name 620*a*. As a result, electronic device 600 detects tap gesture 638 at representation 636.

Figure 6G:
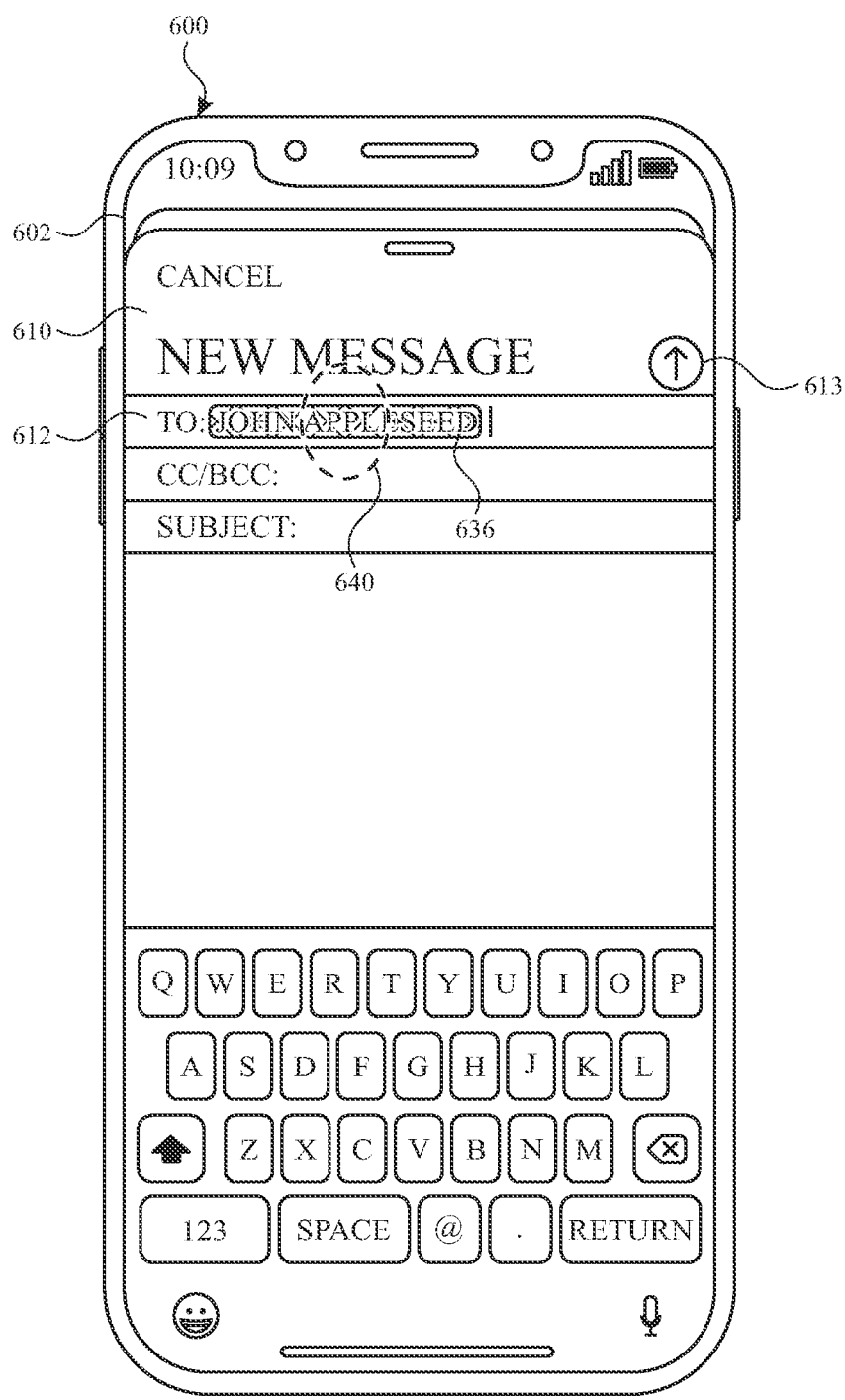

At FIG. 6G, upon detecting tap gesture 638, electronic device 600 displays representation 636 with a visual emphasis, which provides an indication that representation 636 has been selected. Once representation 636 has been selected, electronic device 600 detects tap gesture 640 at representation 636.

Figure 6H:
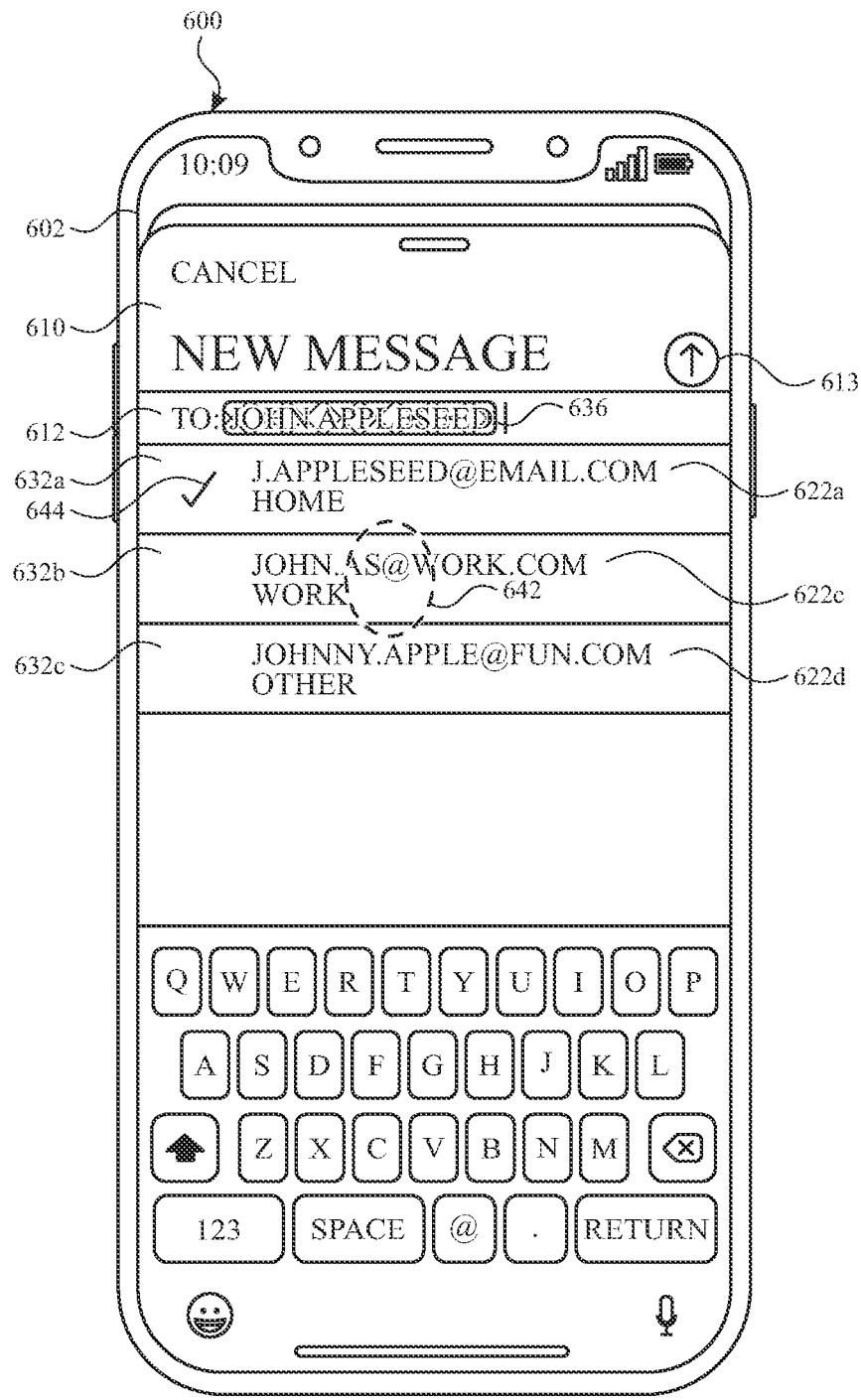

At FIG. 6H, upon detecting tap gesture 640 on selected representation 636, electronic device 600 displays expanded results 632*a*-632*c* below representation 636. Expanded result 632*a* once again includes checkmark 644 being displayed adjacent to email address 622*a*. As discussed above, checkmark 644 provides an indication of which email address (e.g., 622*a*) is currently selected as the email address to be used for name 620*a*. As illustrated in FIG. 6H, expanded result 632*a* optionally replaces the CC, BCC, and/or subject fields of new email user interface 610. The user performs a tap gesture to select a different email address to be used for name 620*a*. As a result, electronic device 600 detects tap gesture 642 at expanded result 632*b*, which corresponds to email address 622*c*.

Figure 6I:
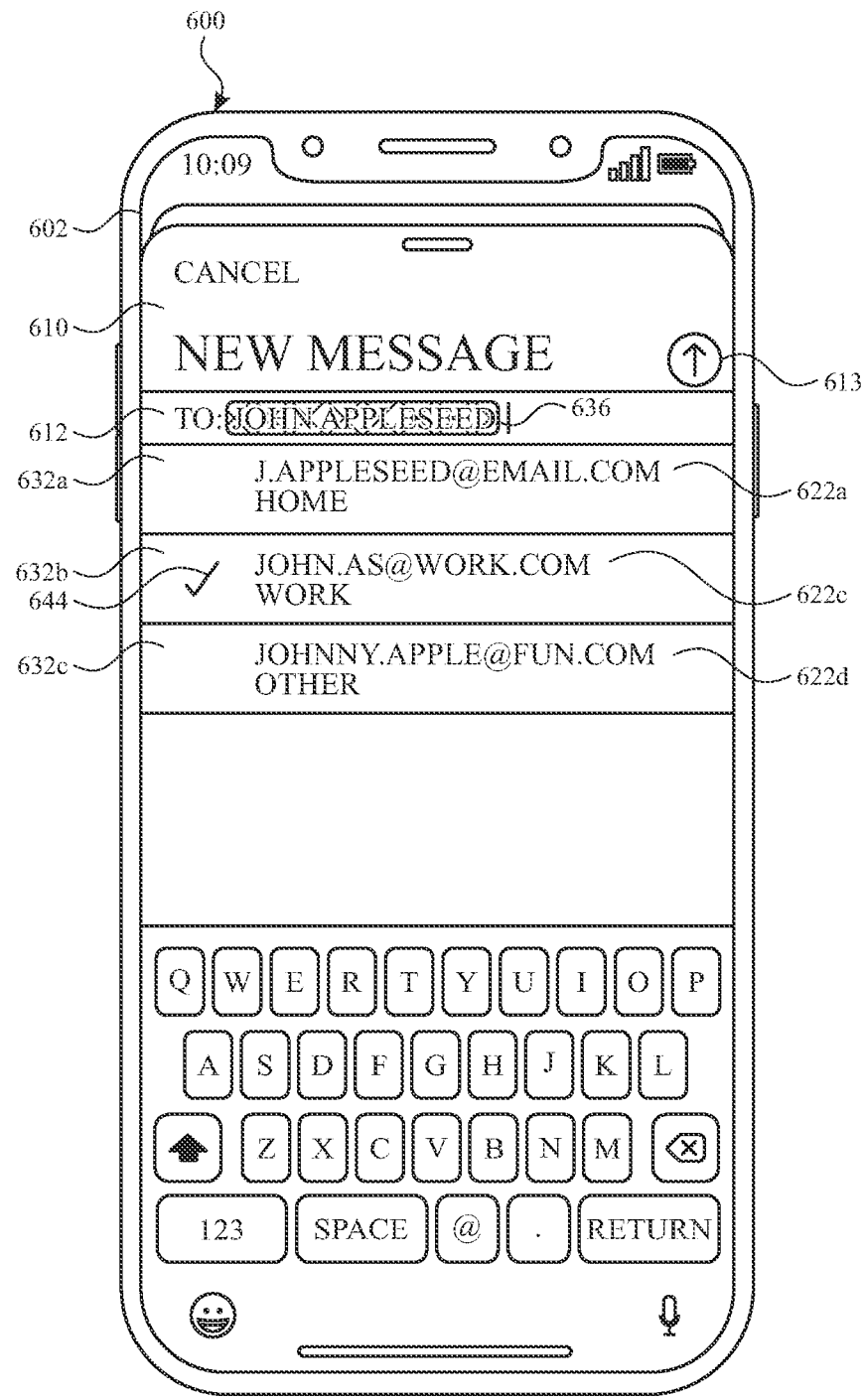
Figure 6J:
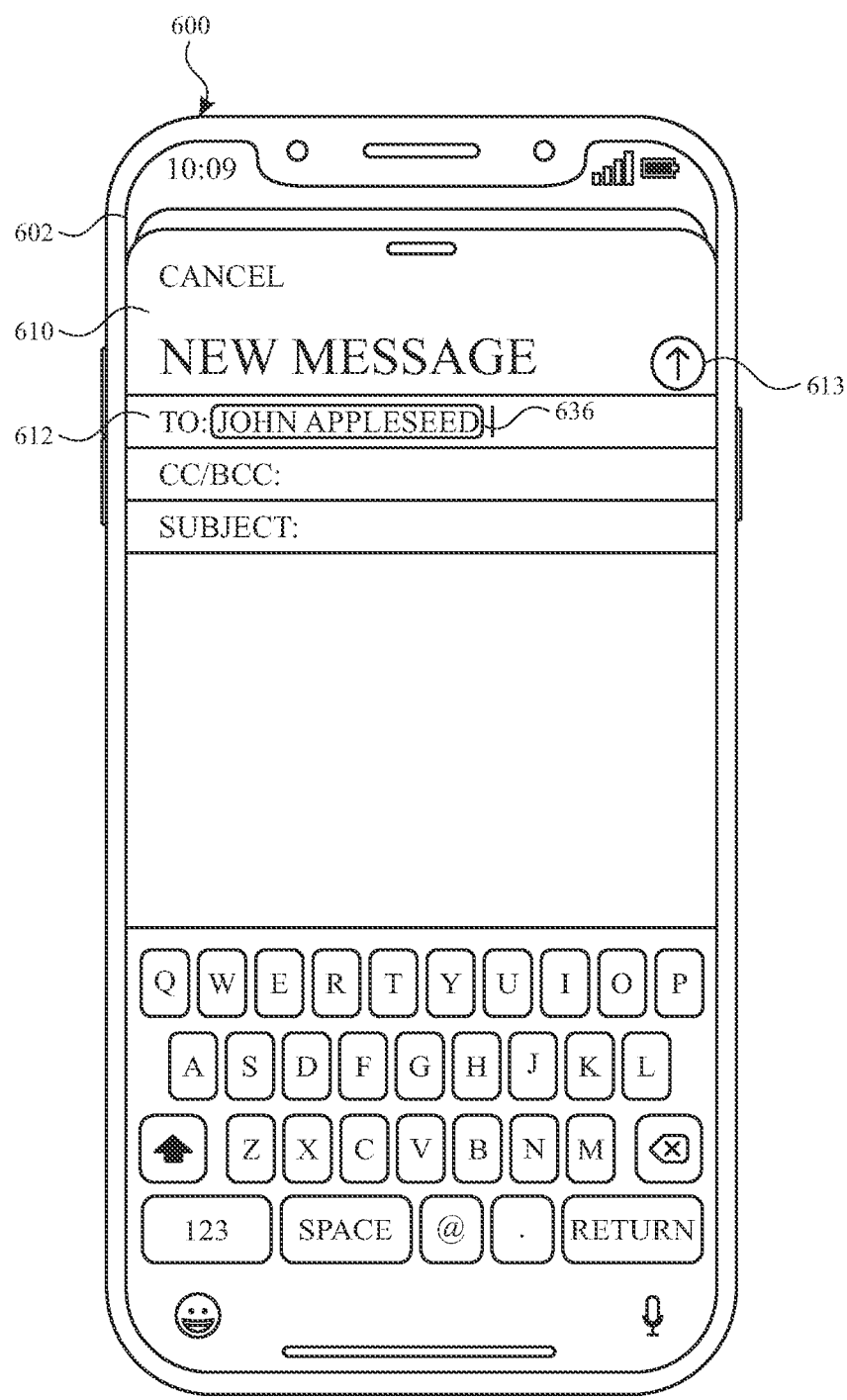

At FIG. 6I, upon detecting tap gesture 642, electronic device 600 moves the display of checkmark 644 from being adjacent to email address 622*a* to being adjacent to email address 622*c*, where checkmark 644 is displayed for a predetermined amount of time. Once the predetermined amount of time elapses, electronic device 600 ceases display of expanded results 632*a*-632*c* (e.g., without requiring additional user input), as depicted in FIG. 6J. Further, electronic device 600 displays representation 636 without the visual emphasis once the predetermined amount of time elapses. In contrast to FIG. 6F, representation 636 of FIG. 6J now represents email address 622*c* in To: field 612. Thus, when the user sends the email message (e.g., by tapping on send button 613), the email message will be sent to email address 622*c* instead of email address 622*a*.

FIG. 7 is a flow diagram illustrating a method for selecting a contact identifier using an electronic device in accordance with some embodiments. Method 700 is performed at a device (e.g., 100, 300, 500, 600) with a display device. Some operations in method 700 are, optionally, combined, the orders of some operations are, optionally, changed, and some operations are, optionally, omitted.

As described below, method 700 provides an intuitive way for selecting a contact identifier. The method reduces the cognitive burden on a user for selecting a contact identifier, thereby creating a more efficient human-machine interface. For battery-operated computing devices, enabling a user to select a contact identifier faster and more efficiently conserves power and increases the time between battery charges.

In some embodiments, the electronic device receives (702) input (e.g., 614) of one or more characters (e.g., alphanumeric characters entered using a keyboard displayed on a touch screen device that incorporates the display device).

In response (704) to receiving the input of one or more characters, the electronic device identifies (706), based on the one or more characters (e.g., based on the one or more characters matching (or corresponding to) the names of entities stored in an address book of the electronic device), one or more entities (e.g., 618*a*-618*c*, the one or more entities being less than the total entities stored in the address book of the electronic device). The one or more entities (e.g., 618*a*-618*c*) correspond (708) to respective entries of an address book of the electronic device. A first entity of the one or more entities corresponds (710) to a first entry of the address book, the first entry including a name for the first entity (e.g., a contactable entity) and a plurality of contact identifiers for contacting the first entity (e.g., a plurality of identifiers for contacting the entity (a plurality of email addresses, a plurality of phone numbers, a phone number and an email address, a plurality of instant messaging handles) using a first contact modality (e.g., using email, using voice call, using video call).

The plurality of contact identifiers of the first entry include (712) a first contact identifier (e.g., 622*a*, a first email address) for contacting the first entity using the first contact modality (e.g., using email, using voice call, using video call) and a second contact identifier (e.g., 622*c*, a second email address different) different from the first contact identifier for contacting the first entity using the first contact modality. In some embodiments, the first contact identifier and the second contact identifier correspond to the same contact modality. For example, both the first contact identifier and the second contact identifier are email addresses. For another example, both the first contact identifier and the second contact identifier are phone numbers.

In response (704) to receiving the input of one or more characters, the electronic device displays (714), via the display device, results (e.g., 632*a*, 632*c*) corresponding to at least some of the one or more entities, including a first result for the first entity, wherein display of the first result includes display of the name of the first entity (e.g., accessed from the first entry of the address book) and display of the first contact identifier for contacting the first entity (e.g., accessed from the first entry of the address book) without including display of the second contact identifier for contacting the first entity. In some embodiments, display of the first result includes display of a single contact identifier for a given/particular contact modality.

Displaying the first contact identifier for contacting the first entity without displaying the second contact identifier for contacting the first entity provides the user with visual feedback about the contact identifier that will be used if that search result is selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the first result for the first entity, the electronic device selects, based on a set of selection criteria, the first contact identifier from among the plurality of contact identifiers to include in the first result. In some embodiments, the set of selection criteria includes a first selection criterion that is based on the frequency of use of a respective contact identifier (e.g., the more frequently the contact identifier has been used in the past, the more likely that contact identifier is to be selected). In some embodiments, the set of selection criteria includes a second selection criterion that is based on the recency of use of a respective contact identifier (e.g., the more recently the contact identifier has been used as compared to the other contact identifiers of the plurality of contact identifiers, the more likely that it is to be selected). In some embodiments, in accordance with a determination that a second entry of one or more entities includes only a single contact identifier of the first modality, the electronic device selects single content identifier for the second entry for display in the respective result. In some embodiments, in accordance with a determination that a third entry of one or more entities does not include a contact identifier of the first modality (e.g., there is no email address stored for the contact), the electronic device does not select a contact identifier and displays the result for the third entity without including a contact identifier. In some embodiments, the set of selection criteria includes a third selection criterion that is based on the type of contact modality of a respective contact identifier (e.g., if the contact identifier is not of the first contact modality type, it is not selected for display).

In some embodiments, prior to displaying the first result for the first entity, the electronic device selects, based on a set of selection criteria, the first contact identifier from among the plurality of contact identifiers to include in the first result. In some embodiments, the set of selection criteria includes a second selection criterion that is based on the contents of the respective contact identifier (e.g., email addresses with a certain domain are prioritized). In some embodiments, the electronic device prioritizes certain contact identifiers for display when those contact identifiers include certain terms. For example, a user drafting an email address using a work email account that includes "apple.com" is more likely to want to send the draft email to an email address of an entity that also includes "apple.com".

In some embodiments, the electronic device displays a text field (e.g., 612, a search field). In some embodiments, in response to receiving the input of one or more characters, the electronic device displays the one or more characters in the text field.

In some embodiments, the electronic device includes a touch-sensitive surface. In some embodiments, while displaying the results corresponding to at least some of the one or more entities, including the first result for the first entity, the electronic device receives, via a touch-sensitive surface, a first user input. In some embodiments, in accordance with a determination that the first user input corresponds to a first portion (e.g., tap gesture on a graphical representation of the entity, on the displayed name of the entity, on the displayed first contact identifier of the first entity) of the first result, the electronic device replaces display of the one or more characters in the text field with a representation (e.g., a pill-shaped object that includes the name of the first entity, and optionally not including the first contact identifier) of the first contact identifier (e.g., and does not corresponds to the second contact identifier). In some embodiments, in accordance with a determination that the first user input corresponds to a second portion (e.g., on a right facing chevron), different from the first portion, of the first result, the electronic device displays (e.g., expanding the first result to further include, below the first result), on the display device, the plurality of contact identifiers for contacting the first entity using the first modality, including the first contact identifier and the second contact identifier.

Displaying a plurality of contact identifiers for contacting the first entity using the first modality provides the user with options to select a different contact identifier for transmitting a message without requiring the user to perform multiple user inputs to access the address book entry for the recipient, thereby reducing the number of inputs required. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying a draft message (e.g., a draft email, a draft instant message) and the results corresponding to at least some of the one or more entities, including the first result for the first entity, the electronic device receives a first user input (e.g., 634, a tap gesture) at a location that corresponds to the first result (e.g., on a first portion of the first result). In some embodiments, in response to receiving the first user input, the electronic device displays, on the display device, a representation (e.g., a pill-shaped object that includes the name of the first entity, and optionally not including the first contact identifier) of the first contact identifier (e.g., and does not corresponds to the second contact identifier) in a field (e.g., the TO field, the CC field, the BCC field) of the draft message.

In some embodiments, while displaying the representation of the first contact identifier in the field (e.g., the TO field, the CC field, the BCC field) of the draft message, the electronic device detects a third user input (e.g., 638, 640, a tap, a double-tap or two sequential taps (one to select, one to activate)) at a location corresponding to the representation of the first contact identifier. In some embodiments, prior to detecting the third user input (e.g., a tap), the electronic device detects a user input for selecting the representation of the first contact identifier (e.g., resulting in highlighting of the representation of the first contact identifier. In some embodiments, in response to detecting the third user input, the electronic device displays (optionally, the plurality of contact identifiers for contacting the first entity using the first modality, including) a set of contact reselection options, including a first option corresponding to the first contact identifier and a second option corresponding to the second contact identifier.

In some embodiments, in the set of contact reselection options, the first option is emphasized (e.g., has a check mark next to it indicating the first contact identifier is currently selected) and the second option is not emphasized (e.g., does not have a check mark next to it).

In some embodiments, while displaying the set of contact reselection options, the electronic device detects a fourth user input at a location corresponding to the second option corresponding to the second contact identifier. In some embodiments, in response to detecting the fourth user input, the electronic device replaces display, on the display device, of the representation (e.g., a pill-shaped object that includes the name of the first entity, and optionally not including the first contact identifier) of the first contact identifier (e.g., and does not corresponds to the second contact identifier) in the field (e.g., the TO field, the CC field, the BCC field) of the draft message with a representation (e.g., a pill-shaped object that includes the name of the first entity, and optionally not including the first contact identifier) of the second contact identifier (e.g., and does not corresponds to the second contact identifier). In some embodiments, in response to detecting the fourth user input, the first option is deemphasized (remove the checkmark from next to it) and the second option is emphasized (e.g., add a checkmark next to it) prior to replacing the first contact identifier with the second contact identifier. In some embodiments, in response to detecting the fourth user input (and, optionally, subsequent to deemphasizing/emphasizing the first/second options, and optionally), the electronic device ceases to display the set of contact reselection options.

In some embodiments, in response to receiving the first user input, the electronic device ceases to display, via the display device, the results corresponding to the at least some of the one or more entities.

Note that details of the processes described above with respect to method 700 (e.g., FIG. 7) are also applicable in an analogous manner to the methods described below. For example, methods 900 and 1000 optionally includes one or more of the characteristics of the various methods described above with reference to method 700. For brevity, these details are not repeated below.

FIGS. 8A-8P illustrate exemplary user interfaces for providing an adaptive toolbar, in accordance with some embodiments. The user interfaces in these figures are used to illustrate the processes described below, including the processes in FIGS. 9A-9B.

FIG. 8A depicts electronic device 600, which is a smartphone with display 602. Display 602 includes a touch-sensitive surface on which electronic device 600 can detect user gestures (e.g., tap, swipe, drag). In some embodiments, electronic device 600 is, or includes one or more features of, electronic device 100, 300, or 500.

At FIG. 8A, electronic device 600 displays new email user interface 610, which includes keyboard 611 for entering characters into text fields of new email user interface 610, such as To: field 612. New email user interface 610 also includes send button 613, which, when selected, triggers sending of the contents (e.g., in body 802) in new email user interface 610 to the recipient(s) (e.g., the email address in To: field 612). Additionally, as discussed above with respect to FIGS. 6A-6J, representation 636 in To: field 612 is a selectable user interface object representing an email address.

Electronic device 600 also displays adaptive toolbar 804. As discussed below, adaptive toolbar 804 provides different options (e.g., suggested words, email-related functions) depending on the context of the input entered in body 802. By automatically displaying different options depending on the context, adaptive toolbar 804 provides an efficient technique for accessing different options without requiring an explicit user input for navigating to a particular option.

As shown in FIG. 8A, a user has typed "Dear Jo" in body 802 of new email user interface 610. Upon detecting the input corresponding to "Dear Jo" (e.g., activation of keys d, e, a, r, <space>, j, o), electronic device 600 displays suggested words 806a-806c in adaptive toolbar 804, as illustrated in FIG. 8A. At FIG. 8A, the user performs a tap gesture to select "John" in order to complete "Jo" in body 802. As a result, electronic device detects tap gesture 808 at suggested word 806b (e.g., "John").

Figure 8B:
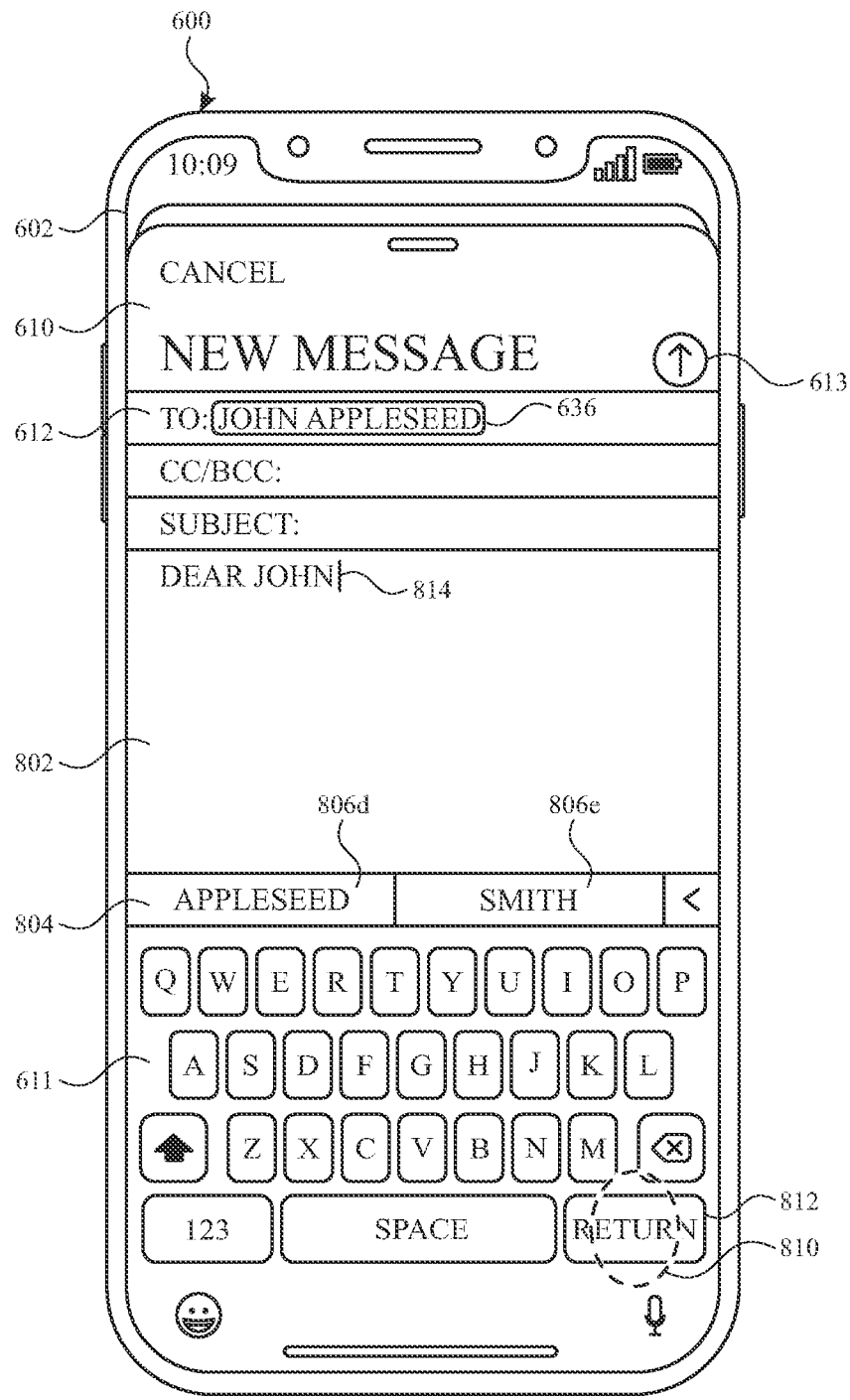

At FIG. 8B, upon detecting tap gesture 808, electronic device 600 enters the characters corresponding to the selected suggested word (e.g., 806b). Thus, electronic device 600 displays "Dear John" in body 802 of FIG. 8B. Further, electronic device 600 updates the suggested words (e.g., 806d-806e) in adaptive toolbar 804 based on the newly entered characters in body 802.

As illustrated by FIG. 8B, the user performs a tap gesture to start a new line of text and continue with the rest of the email message. As a result, at FIG. 8B, while displaying adaptive toolbar 804 with suggested words (e.g., 806d-806e), electronic device 600 detects tap gesture 810 at return key 812 of keyboard 611.

Figure 8C:
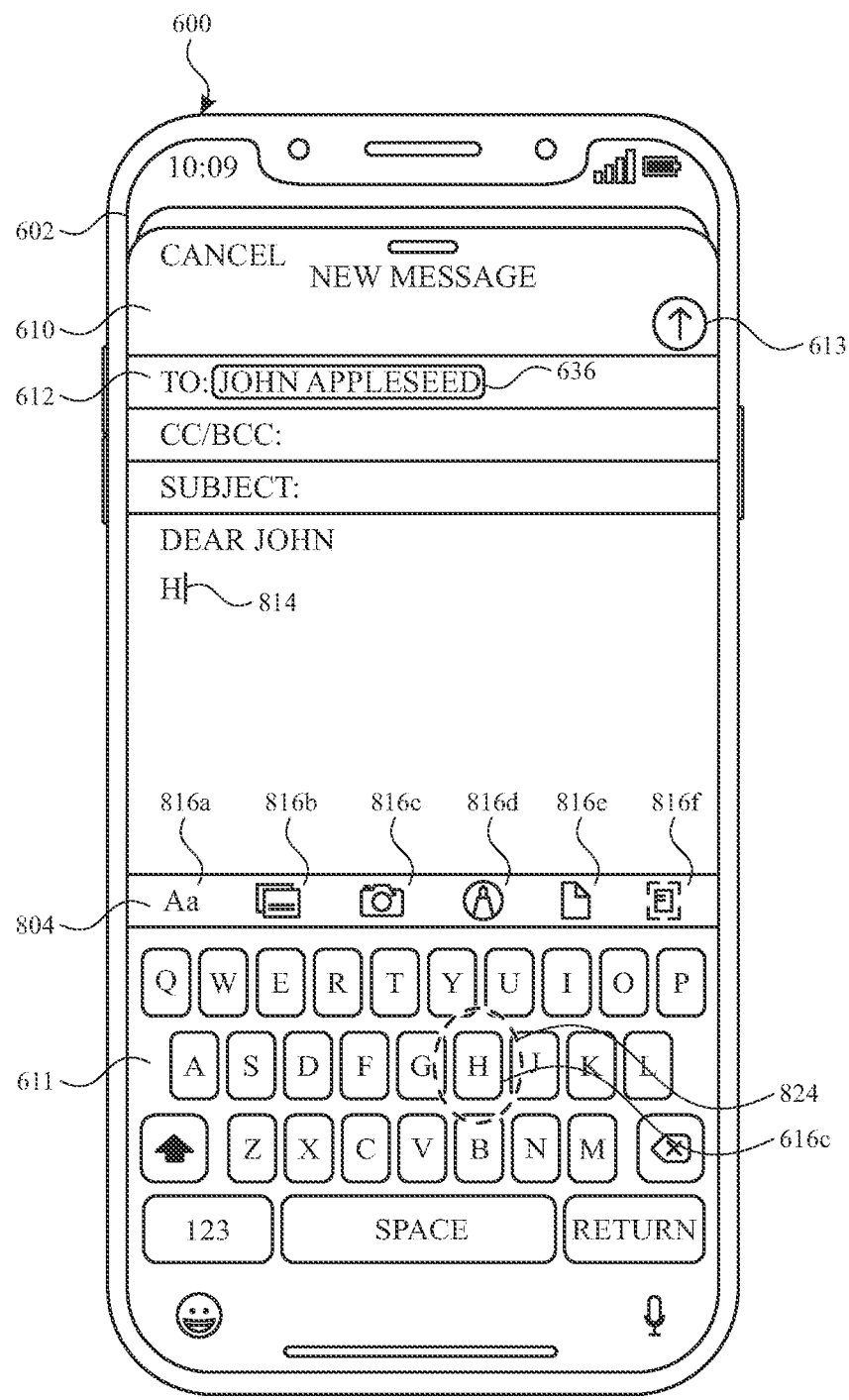

At FIG. 8C, upon detecting tap gesture 810, electronic device 600 enters a newline character and moves the position of cursor 814 to a new line. Upon entering a newline character, electronic device 600 modifies adaptive toolbar 804 by replacing suggested words 806d-806e with function icons 816a-816f.

Each function icon 816a-816f provides a different email-related function. As discussed further below, function icon 816a is a user interface object that, when selected, initiates a process for formatting text entered or to be entered in body 802. Function icon 816b is a user interface object that, when selected, initiates a process for adding one or more photos to an email message (e.g., in body 802). In some embodiments, detecting selection of function icon 816b results in display of photos user interface 818 overlaid on top of a bottom region of new email user interface 610, as depicted in FIG. 8N.

Function icon 816c is a user interface object that, when selected, initiates a process for taking a photo using a camera of electronic device 600. In some embodiments, detecting selection of function icon 816c results in display of camera user interface 820, as depicted in FIG. 8P. Function icon 816d is a user interface object that, when selected, initiates a process for marking up an email message (e.g., drawing strokes in body 802). In some embodiments, detecting selection of function icon 816d results in display of markup user interface 822, as depicted in FIG. 8O.

Function icon 816e is a user interface object that, when selected, initiates a process for adding one or more files to an email message (e.g., in body 802). In some embodiments, detecting selection of function icon 816e results in display of a user interface similar to photos user interface 818, but with representations of document files instead of representations of photos. Function icon 816*f* is a user interface object that, when selected, initiates a process for scanning a document or photo using a camera of electronic device 600. In some embodiments, detecting selection of function icon 816*f* results in display of a user interface similar to camera user interface 820, but with displayed instructions for positioning a document in view of the camera of electronic device 600.

At FIG. 8C, the user continues typing in body 802 using keyboard 611. As a result, while displaying function icons 816*a*-816*f*, electronic device 600 detects tap gesture 824 at "H" key 616*c* (e.g., a character key of keyboard 611).

Figure 8D:
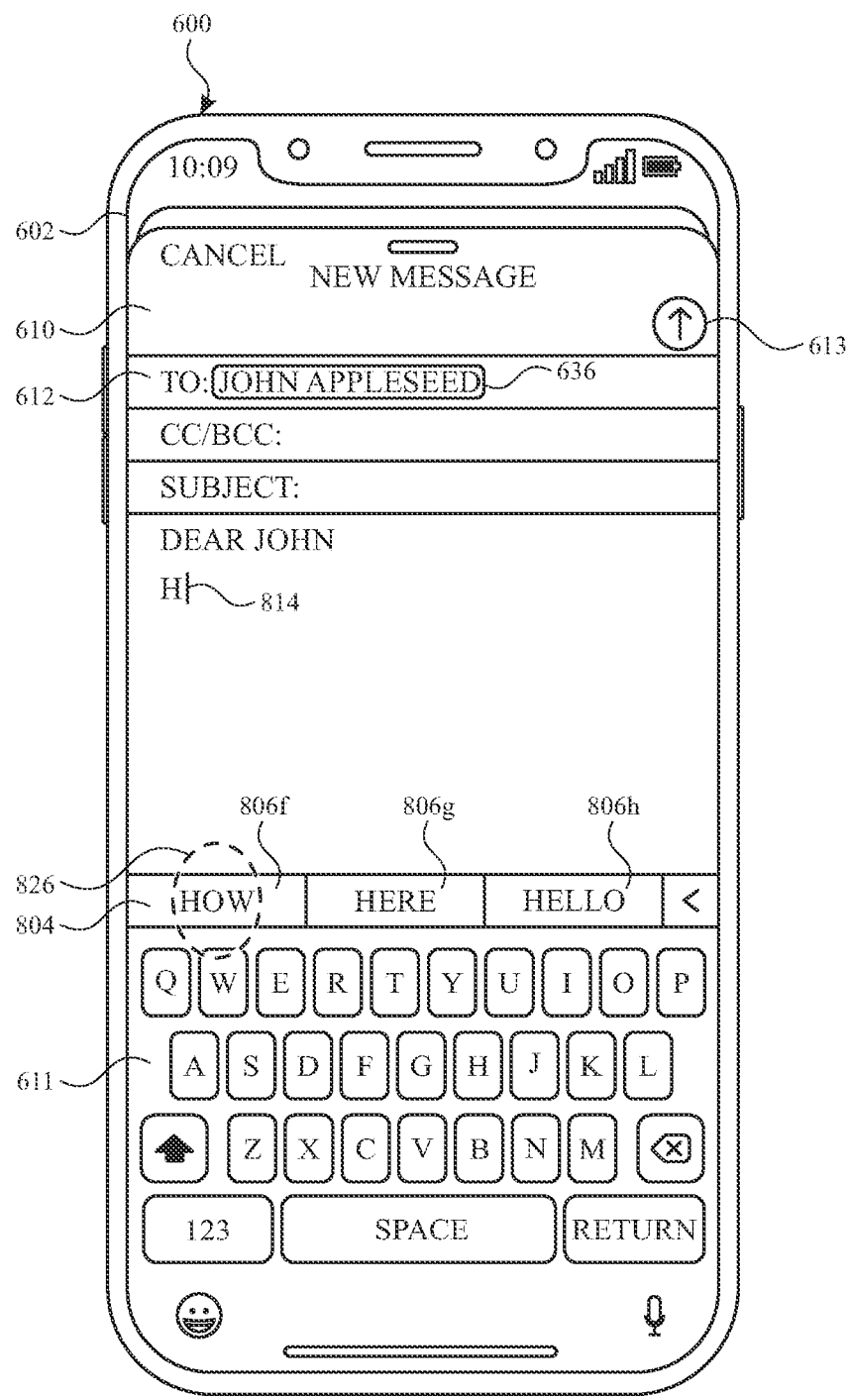

At FIG. 8D, upon detecting tap gesture 824, electronic device 600 enters the character corresponding to "H" key 616*c* into body 802. Upon entering the new text character (e.g., "H"), electronic device 600 modifies adaptive toolbar 804 by replacing function icons 816*a*-816*f* with new suggested words (e.g., 806*f*-806*h*) based on the newly entered character(s).

As shown in FIG. 8D, electronic device 600 displays "H" in body 802. The user performs a tap gesture to select a suggested word. As a result, electronic device 600 detects tap gesture 826 at suggested word 806*f* (e.g., "How").

Figure 8E:
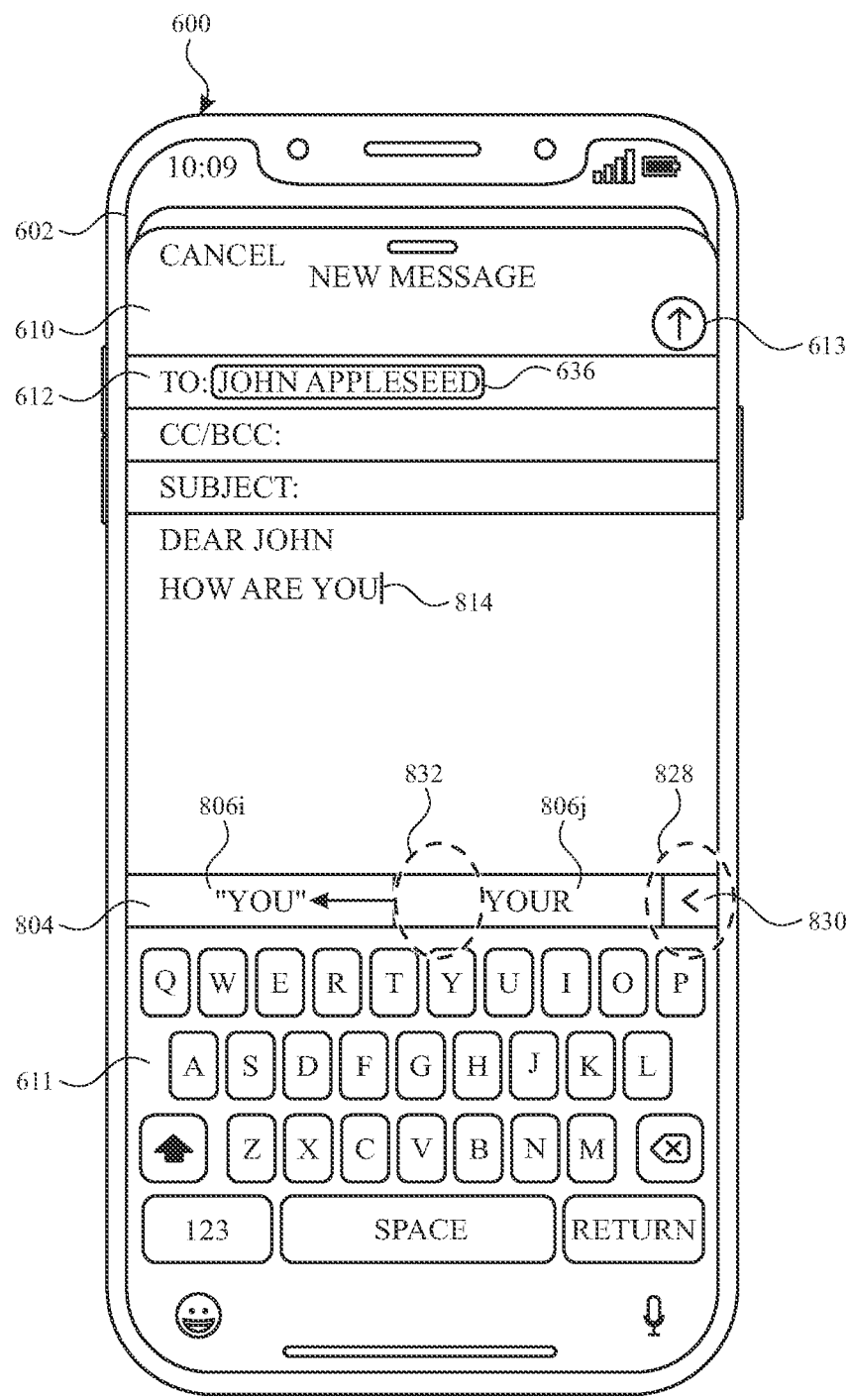

At FIG. 8E, upon detecting tap gesture 826, electronic device 600 enters the characters corresponding to the selected suggested word (e.g., 806*f*). Thus, electronic device 600 displays "How" in body 802. The user continues to type in body 802 using keyboard 611. As a result, electronic device 600 displays "How are you" in body 802 of FIG. 8E. Further, electronic device 600 updates the suggested words (e.g., 806*i*-806*j*) in adaptive toolbar 804 based on the newly entered characters in body 802.

Suppose the user wishes to emphasize "you" in body 802 by underlining "you". Thus, the user seeks to access function icons 816*a*-816*f*. While displaying new email user interface 610, electronic device 600 detects tap gesture 828 at chevron icon 830.

Figure 8F:
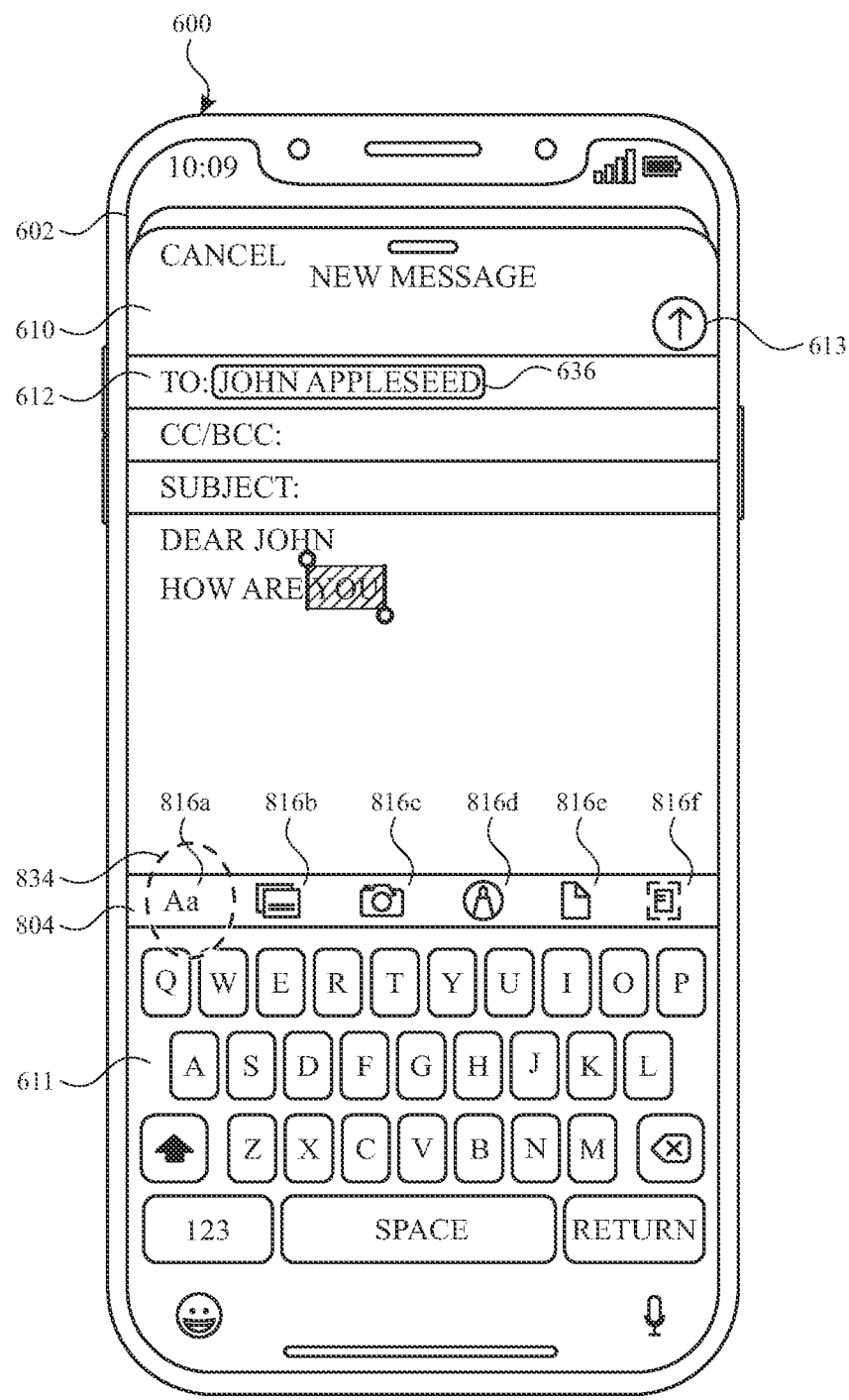

At FIG. 8F, upon detecting tap gesture 828, electronic device 600 modifies adaptive toolbar 804 by replacing suggested words 806*i*-806*j* with function icons 816*a*-816*f*. In some embodiments, electronic device 600 modifies adaptive toolbar 804 in this same manner upon detecting swipe gesture 832 with movement (e.g., in the right-to-left direction).

As shown in FIG. 8F, the user selects the target text (e.g., "you") to be emphasized, followed by performing a tap gesture to access text formatting options. As a result, electronic device 600 detects tap gesture 834 at function icon 816*a*.

Figure 8G:
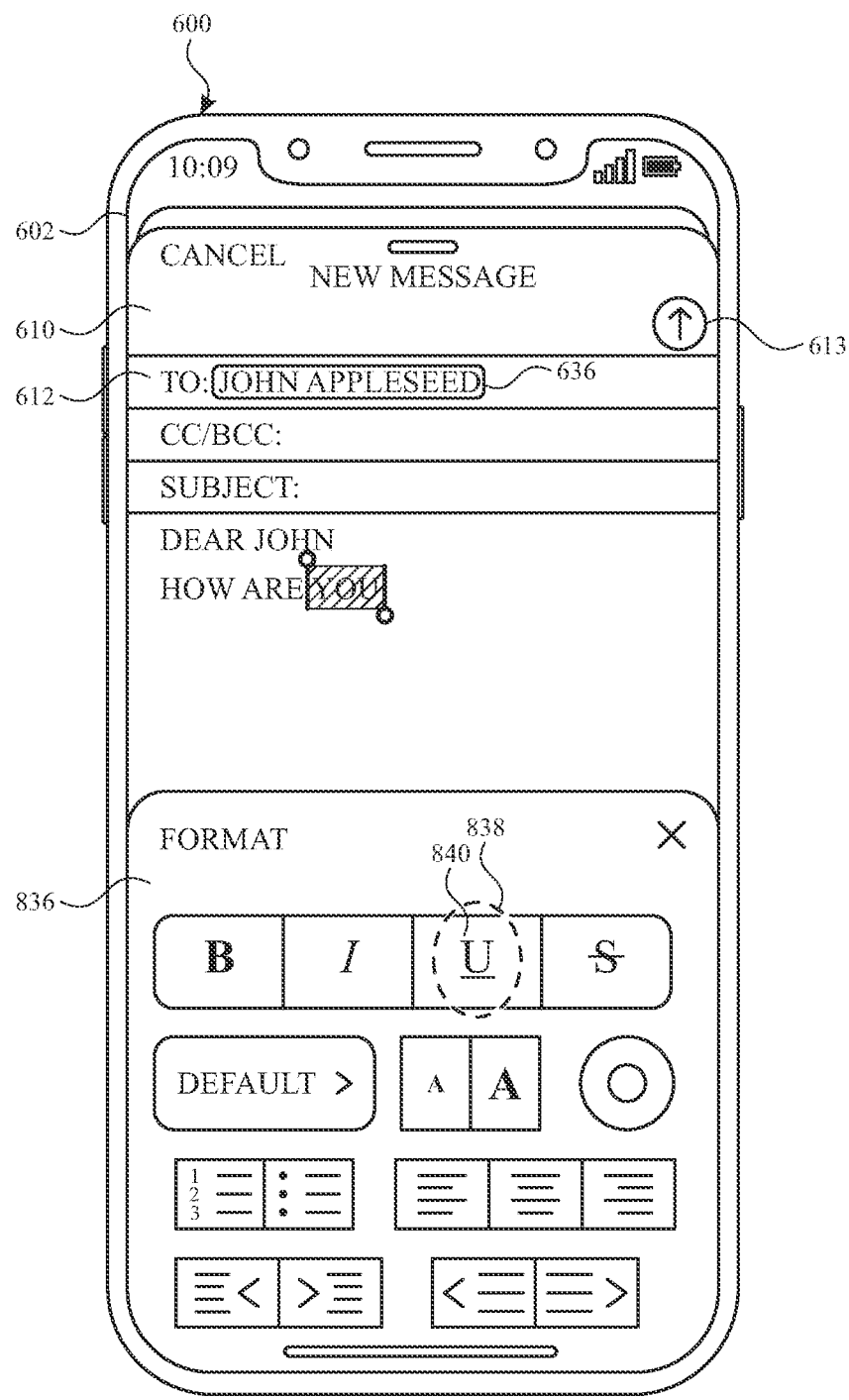

At FIG. 8G, upon detecting tap gesture 834, electronic device 600 initiates a process for formatting text entered or to be entered in body 802. Initiating this process includes displaying formatting user interface 836 overlaid on top of a bottom portion of new email user interface 610. While displaying formatting user interface 836, electronic device 600 detects tap gesture 838 at underline option 840 at FIG. 8G.

Figure 8H:
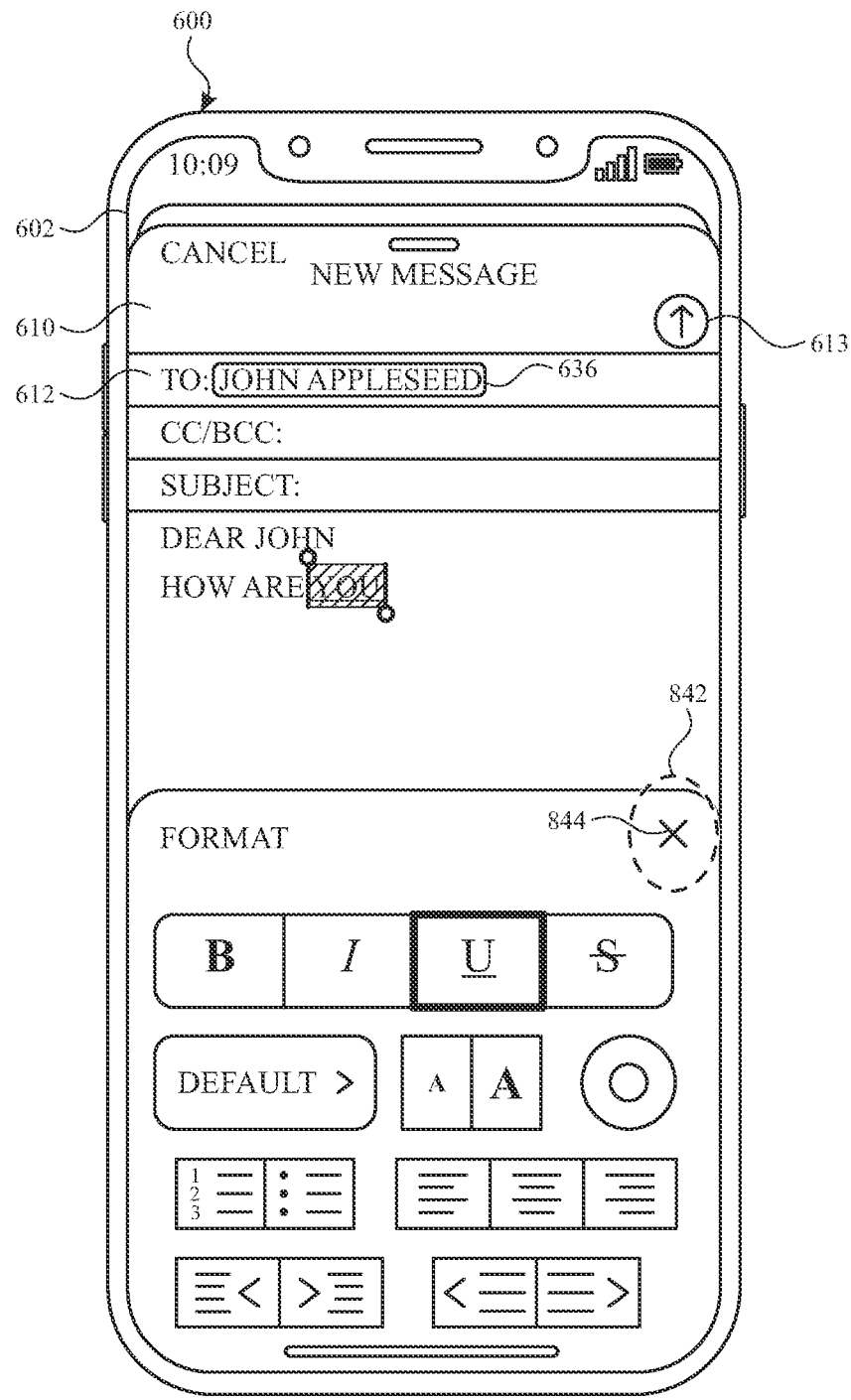

At FIG. 8H, upon detecting tap gesture 838, electronic device 600 visually modifies the selected text in accordance with the selected text formatting option (e.g., 840). Specifically, electronic device 600 underlines "you". Finished with text formatting, the user exits text formatting user interface 836. As a result, electronic device 600 detects tap gesture 842 at exit button 844.

Figure 8I:
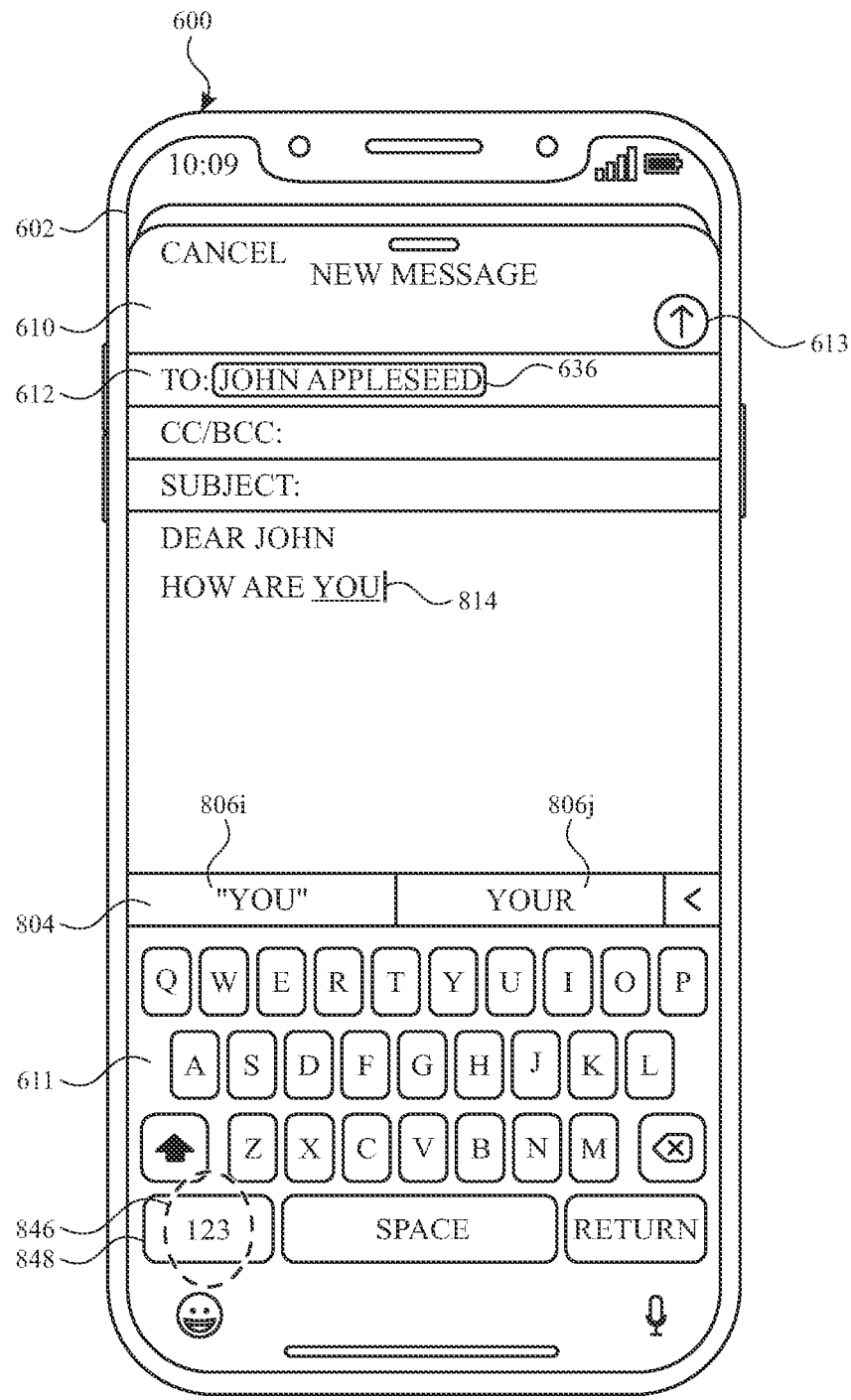

At FIG. 8I, upon detecting tap gesture 842, electronic device 600 ceases to display formatting user interface 836. Further, electronic device 600 displays keyboard 611 with suggested words 806*i*-806*j* in the adaptive toolbar. The user then modifies keyboard 611 to access the punctuation marks. As a result, electronic device 600 detects tap gesture 846 at alternate keys button 848.

Figure 8J:
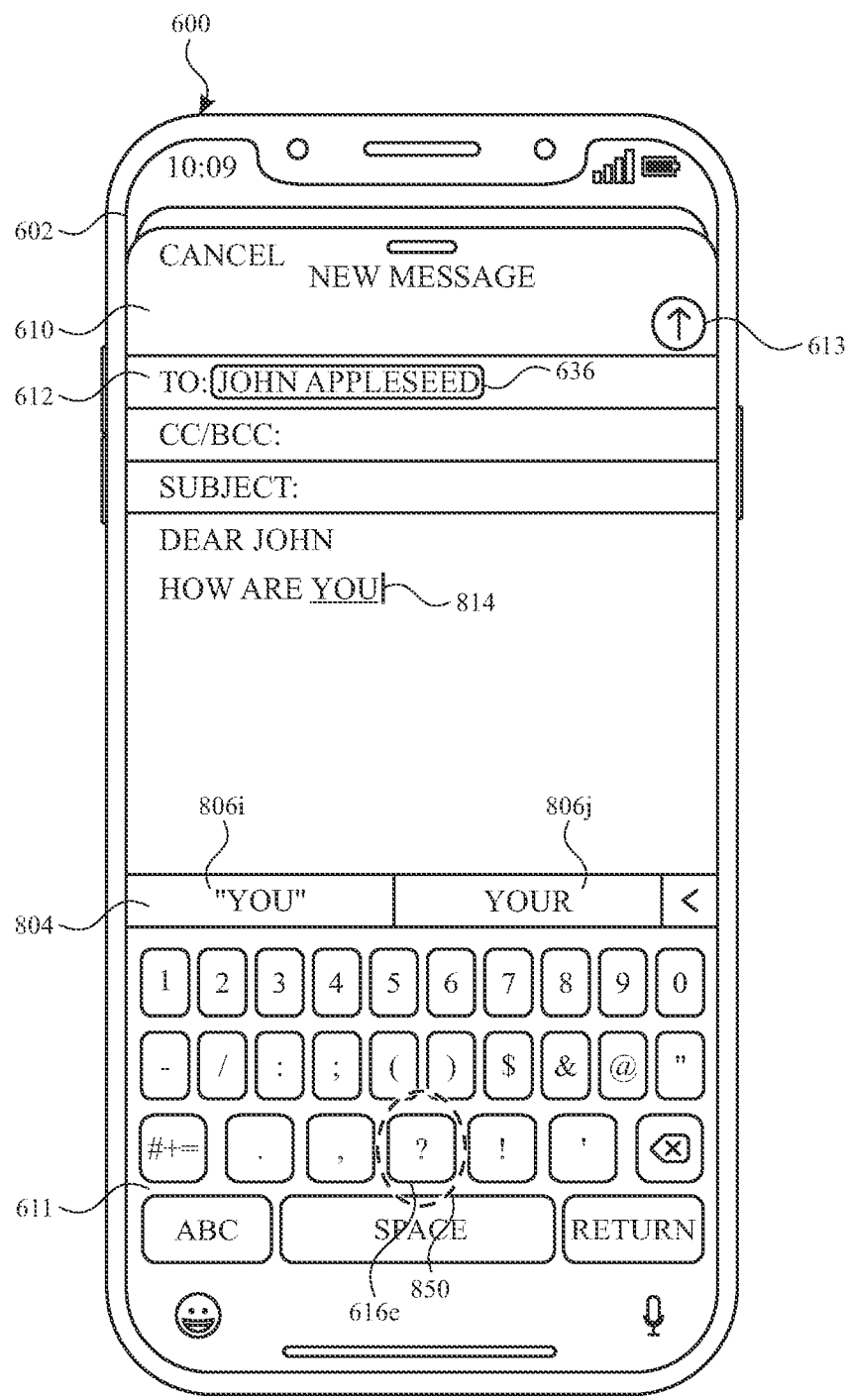

At FIG. 8J, upon detecting tap gesture 846, electronic device 600 modifies keyboard 611 to include number keys and punctuation keys. As shown in FIG. 8J, electronic device 600 detects tap gesture 850 at "?" key 616*e*.

Figure 8K:
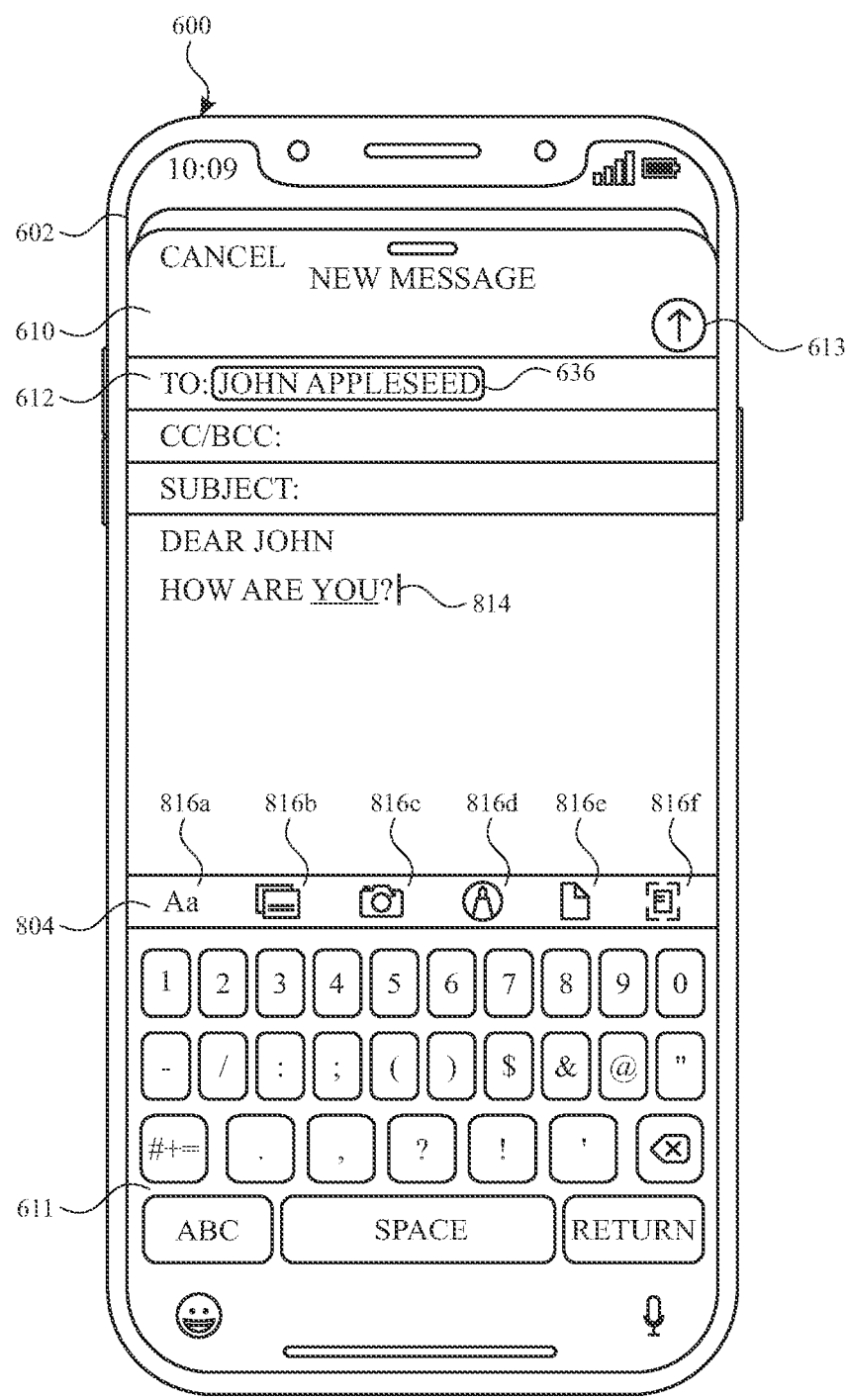

At FIG. 8K, upon detecting tap gesture 850, electronic device 600 enters a punctuation mark corresponding to the selected key. Thus, electronic device 600 enters "?" in body 802. Upon entering a punctuation mark (e.g., "?") in body 802, electronic device 600 modifies adaptive toolbar 804 by replacing suggested words 806*i*-806*j* with function icons 816*a*-816*f*, as shown in FIG. 8K.

Figure 8L:
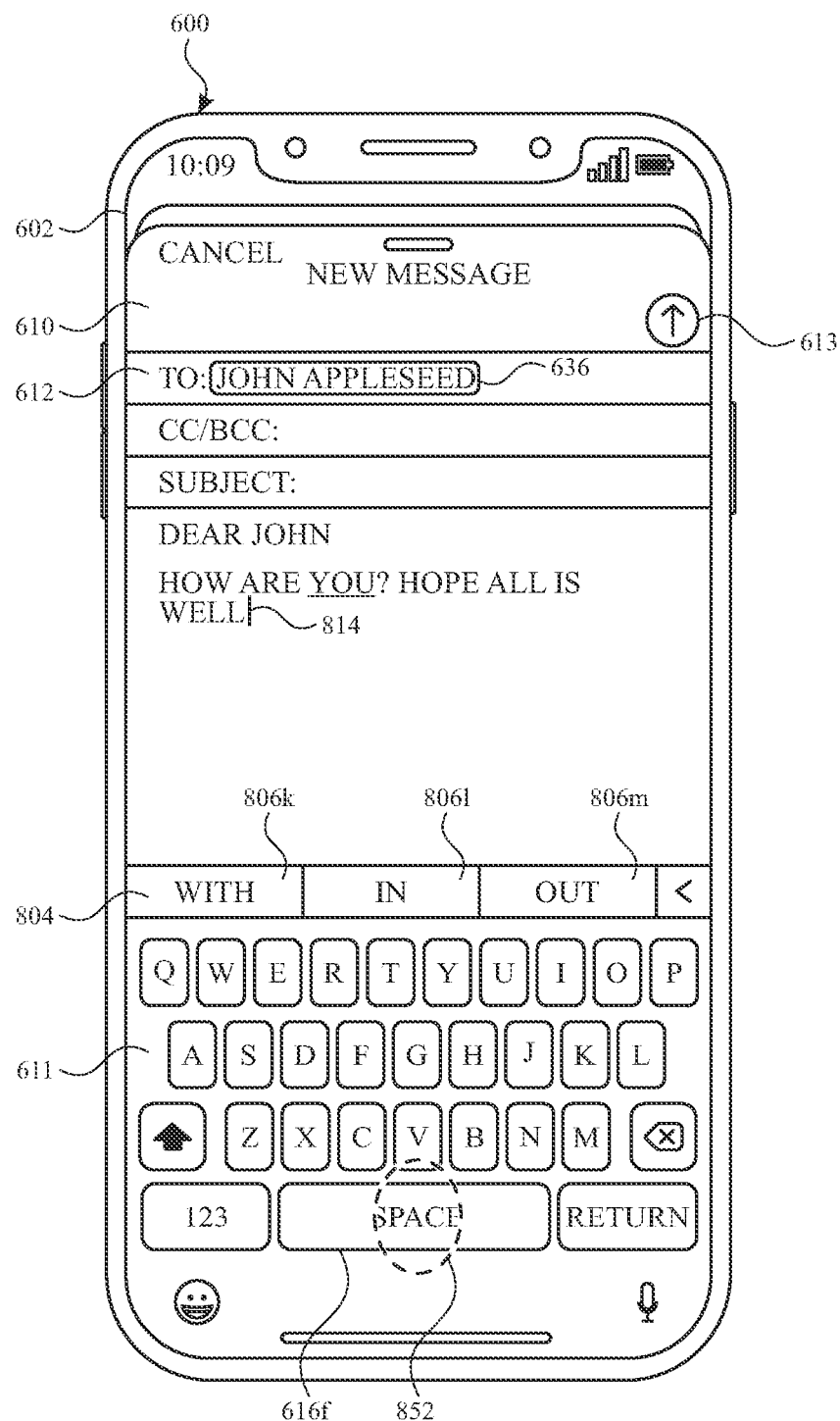

At FIG. 8L, the user continues typing in body 802 using keyboard 611. As a result, electronic device 600 displays "How are you? Hope all is well" in body 802. Further, upon entering the one or more text characters (e.g., Hope all is well), electronic device 600 modifies adaptive toolbar 804 by replacing function icons 816*a*-816*f* with new suggested words (e.g., 806*k*-806*m*) based on the newly entered text characters.

To end the sentence, the user performs a gesture corresponding to a request to enter a period. As a result, electronic device 600 detects double-tap gesture 852 at space key 616*f*.

Figure 8M:
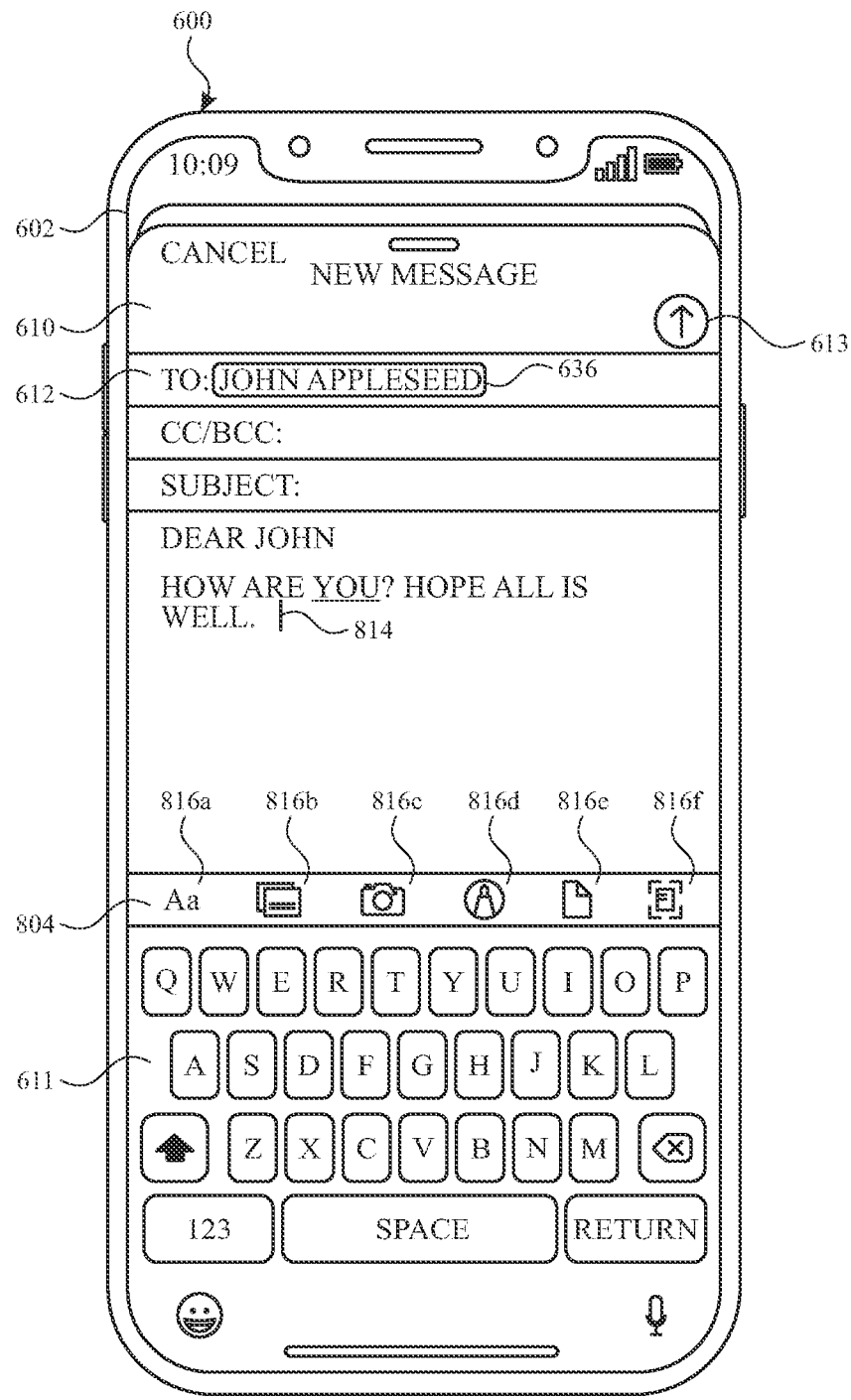
Figure 8N:
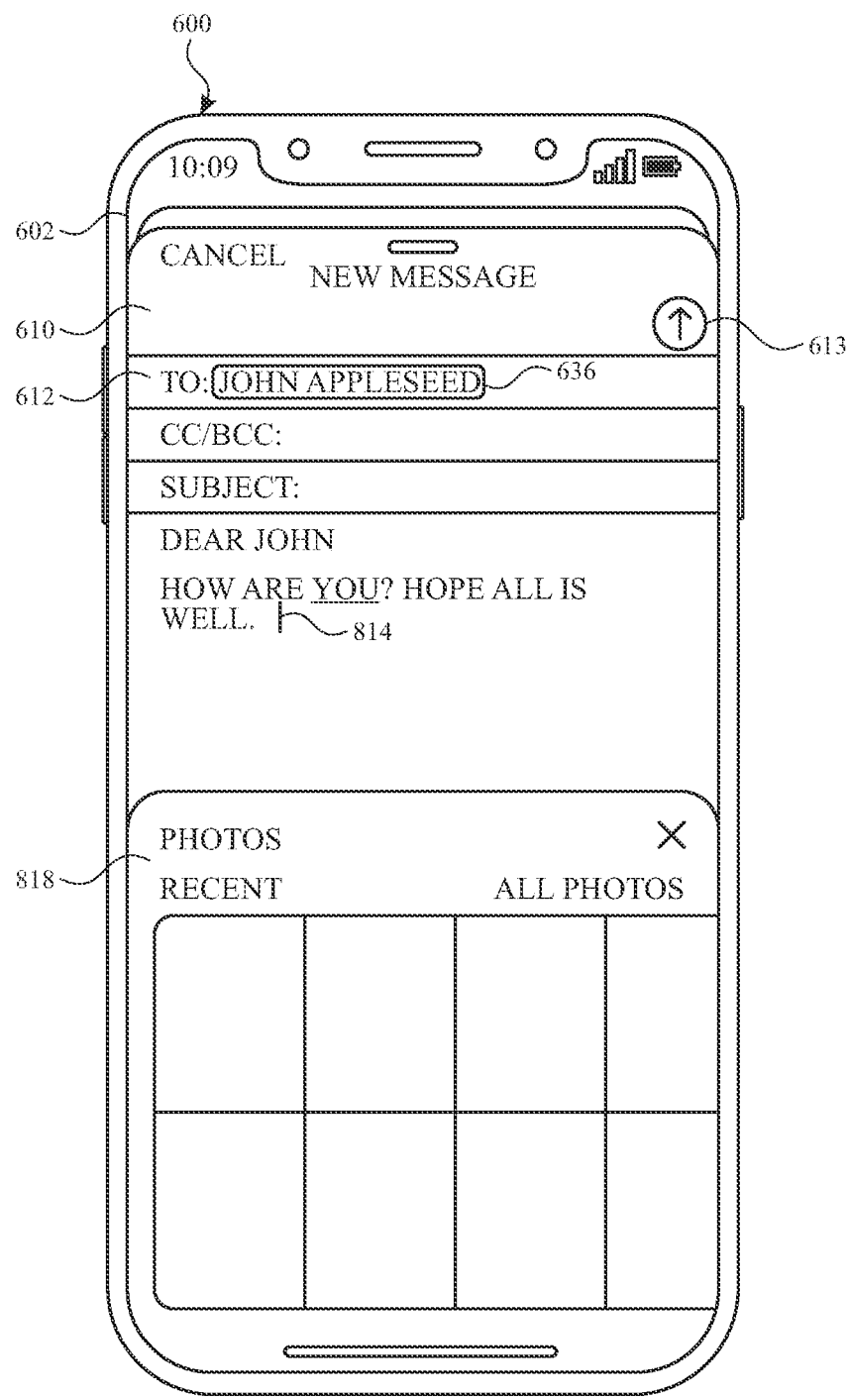
Figure 8O:
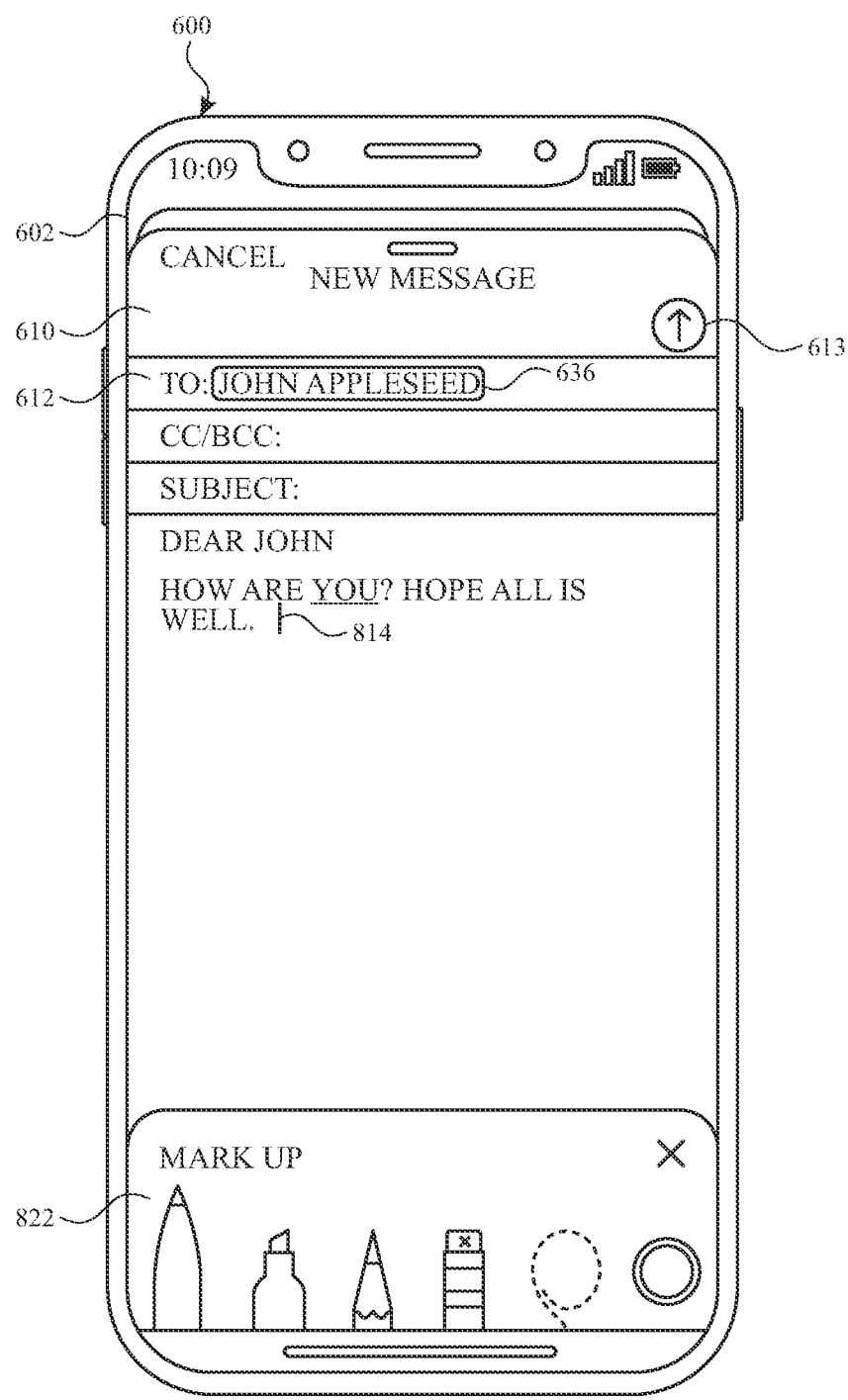

At FIG. 8M, upon detecting double-tap gesture 852, electronic device 600 enters a period at the end of the sentence in body 802. Upon entering a punctuation mark (e.g., "."), electronic device 600 modifies adaptive toolbar 804 by replacing suggested words 806*k*-806*m* with function icons 816*a*-816*f*.

FIGS. 9A-9B is a flow diagram illustrating a method for providing an adaptive toolbar using an electronic device in accordance with some embodiments. Method 900 is performed at a device (e.g., 100, 300, 500, 600) with a display device. Some operations in method 900 are, optionally, combined, the orders of some operations are, optionally, changed, and some operations are, optionally, omitted.

As described below, method 900 provides an intuitive way for providing an adaptive toolbar. The method reduces the cognitive burden on a user for accessing functions of the toolbar, thereby creating a more efficient human-machine interface. For battery-operated computing devices, enabling a user to access functions of the toolbar faster and more efficiently conserves power and increases the time between battery charges.

In some embodiments, the electronic device concurrently displays (902), via the display device: a text input field (904) (e.g., 802, a document that accepts text, an input field for sending a message, a body or subject line of a draft email) and an adaptive toolbar (906) (e.g., 804, where the functionality of the toolbar changes as input is received), wherein the adaptive toolbar is configured to transition between a suggestion mode (e.g., 804 at FIG. 8A) to provide a suggested input term (or a plurality of suggested input terms) and a function mode (e.g., 804 at FIG. 8B) to provide a function (or a plurality of functions) other than a suggested input term.

Transitioning the adaptive toolbar between providing suggested input terms and functions provides the user with easy access to both the suggested input terms and the functions, without requiring extraneous inputs to access the terms and functions. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the text input field and the adaptive toolbar in the suggestion mode including display of a first suggested input term, the electronic device receives (908) input of one or more characters (e.g., 824, 850, 852, alphanumeric and whitespace characters entered using a keyboard displayed on a touch screen device that incorporates the display device; unicode characters; whitespace characters such as a space, a newline; a sentence terminator such as a period, exclamation mark, and question mark).

In some embodiments, the electronic device displays, on the display device, a keyboard (e.g., 611, a virtual keyboard, an alphanumeric keyboard, a QWERTY keyboard) concurrently with the text input field and the adaptive toolbar. In some embodiments, receiving input of one or more characters includes detecting activation of one or more keys of the keyboard, the one or more keys corresponding to the one or more characters.

Thus, sequential activation of the keys corresponds to the letters "H", "i" and "!" will sequentially cause those letters to be displayed in the text input field. In some embodiments, the keyboard is displayed adjacent to adaptive toolbar. In some embodiments, in response to input detected at character entry keys, the electronic device displays text corresponding to the input in the text input field. In some embodiments, receiving input of one or more characters include detecting one or more sets of strokes on a touch-sensitive surface (e.g., one or more handwritten characters), and in response to detecting the one or more sets of strokes (e.g., strokes, handwriting input composed of one or more strokes), the electronic device (sequentially) displays text in the input field corresponding to the input.

In response (910) to receiving the input of one or more characters, the electronic device enters (912) (e.g., displays) the one or more characters in the text input field (e.g., 802).

In response (910) to receiving the input of one or more characters, in accordance with (914) a determination, based on the one or more characters (e.g., that were entered into the text input field), that a set of one or more suggestion criteria is satisfied, the electronic device updates (916) the adaptive toolbar to replace display of the first suggested input term (e.g., 806*f*) with a second suggested input term (e.g., 806*i*). In some embodiments, the second suggested input term is based on the one or more characters (e.g., that were entered into the text input field). In some embodiments, the second suggested input term is different from the first suggested input term (and, optionally, without displaying a first set of non-suggestion functions). In some embodiments, the electronic device identifies, based on the one or more characters entered into the text input field, the second suggested input term prior to updating the adaptive toolbar to include the second suggested input term.

In response (910) to receiving the input of one or more characters, in accordance with (918) a determination, based on the one or more characters entered into the text input field, that a set of one or more function criteria is satisfied, the electronic device updates (920) the adaptive toolbar to replace display of the first suggested input term (e.g., 806*i*) with display of a set of functions (e.g., 816*a*-816*f*, one or more functions that do not correspond to suggested input terms, and without displaying the second suggested input term (or any suggested input terms)). In some embodiments, the set of one or more suggestion criteria includes a criterion that is satisfied when the one or more characters include (e.g., end with) an alphabetical character (e.g., the one or more characters end in a character selected from A-Z).

Updating the adaptive toolbar when set of one or more function criteria is satisfied allows the user to access relevant functions of the toolbar without requiring further user input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of one or more function criteria include a first function criterion that is satisfied when the one or more characters include (e.g., end with) a whitespace character (e.g., the one or more characters are a single character, and the single character is a whitespace character). In some embodiments, the set of one or more function criteria is satisfied when a single criterion of the set of one or more function criteria is satisfied.

In some embodiments, the set of one or more function criteria include a second function criterion that is satisfied when the one or more characters include (e.g., end with) two space characters (e.g., the one or more characters are two characters, and the two characters are two space characters). In some embodiments, the set of one or more function criteria is satisfied when a single criterion of the set of one or more function criteria is satisfied.

In some embodiments, the set of one or more function criteria include a third function criterion that is satisfied when the one or more characters include (e.g., end with) a newline character (e.g., the one or more characters a single character, and the single character is a newline character, which is also known as a line breaking character). In some embodiments, the set of one or more function criteria is satisfied when a single criterion of the set of one or more function criteria is satisfied.

In some embodiments, the set of one or more function criteria include a fourth function criterion that is satisfied when the one or more characters include (e.g., end with) an end-of-sentence character (e.g., the one or more characters a single character, and the single character is an end-of-sentence character, such as a period, a question mark, and an exclamation mark). In some embodiments, the set of one or more function criteria is satisfied when a single criterion of the set of one or more function criteria is satisfied.

In some embodiments, while the one or more characters are entered in the text input field and displaying the set of functions in the adaptive toolbar, wherein display of the set of functions in the adaptive tool bar includes display of a first function option, the electronic device detects activation of the first function option. In some embodiments, while the one or more characters are entered in the text input field and displaying the set of functions in the adaptive toolbar, wherein display of the set of functions in the adaptive tool bar includes display of a first function option, in response to detecting activation of the first function option, the electronic device initiates a process for adjusting a visual characteristic of (e.g., changing a style (bold, italicize, underline, strikethrough, character color, character background color) at least the one or more characters (e.g., the one or more characters, other characters) entered in the text input field. In some embodiments, detecting activation of the first function option results in automatically (e.g., without requiring additional user input) changing a visual characteristic of the content or the one or more characters (or other selected characters) displayed in the text input field. In some embodiments, detecting activation of the first function option does not cause display of suggested input terms in the adaptive toolbar. In some embodiments, detecting activation of the first function option results in display of a user interface that includes a plurality of character modification options. In some embodiments, activation of a respective character modification option changes a visual characteristic of the content or the one or more characters (or other selected characters) in the text input field.

In some embodiments, while the one or more characters are entered in the text input field and displaying the set of functions in the adaptive toolbar, wherein display of the set of functions in the adaptive tool bar includes display of a second function option (e.g., that is different from the first function option, and displayed concurrently with the first function option), the electronic device detects activation of the second function option. In some embodiments, while the one or more characters are entered in the text input field and displaying the set of functions in the adaptive toolbar, wherein display of the set of functions in the adaptive tool bar includes display of a second function option (e.g., that is different from the first function option, and displayed concurrently with the first function option), in response to detecting activation of the second function option, the electronic device initiates a process for displaying (e.g., inserting) a media item (e.g., an image, a video) in the text input field (e.g., adjacent to the one or more characters displayed in the text field).

In some embodiments, detecting activation of the second function option results in display of one or more navigable user interfaces for receiving selection of the media item to be displayed in the text input field. In some embodiments, the one or more navigable user interfaces include a camera media user interface that includes a plurality of representations of media items captured using a camera application of the electronic device. In some embodiments, the one or more navigable user interfaces include a camera user interface that includes a viewfinder of a camera application and one or more options for capturing a media item (e.g., an image, a video) using a camera of the electronic device. In some embodiments, the one or more navigable user interfaces include a document scanning interface that includes a viewfinder of a document scanning application and one or more options for capturing a visual copy of a document (e.g., a paper document) using a camera of the electronic device. In some embodiments, the one or more navigable user interfaces include a file access interface that includes a view of a file structure (e.g., folders, directories, categories) of the electronic device and one or more options for selecting a file for insertion into the text input field. In some embodiments, detecting activation of the second function option causes replacement of the keyboard with a user interface corresponding to the second function option.

In some embodiments, while the one or more characters are entered in the text input field and displaying the second suggested input term in the adaptive toolbar, the electronic device detects a first input gesture at a location corresponding to the adaptive toolbar (e.g., detecting activation of a mode affordance, detecting a swipe gesture (left swipe gesture, right swipe gesture)). In some embodiments, in response to detecting the first input gesture at the location corresponding to the adaptive toolbar, the electronic device updates the adaptive toolbar to replace display of the second suggested input term with display of the set of functions (e.g., one or more functions that do not correspond to suggested input terms, and without displaying the second suggested input term (or any suggested input terms)).

In some embodiments, while the one or more characters are entered in the text input field and displaying the second suggested input term in the adaptive toolbar, the electronic device displays, on the display device, a mode affordance (e.g., in the toolbar, adjacent to the second suggested input term, a left-facing chevron). In some embodiments, the first input gesture at the location corresponding to the adaptive toolbar is an activation of the mode affordance. In some embodiments, the mode affordance is not displayed when the adaptive toolbar is displaying suggested input terms (as compared to the set of functions), and detecting the same input gesture at the location corresponding to the adaptive toolbar does not replace the second suggested input term with the set of functions.

In some embodiments, the first input gesture at the location corresponding to the adaptive toolbar is a swipe gesture (e.g., a left swipe gesture) that starts at a location corresponding to the adaptive toolbar (e.g., on the adaptive toolbar, on the mode affordance). In some embodiments, detecting the swipe gesture causes the second the mode affordance slide off the display in the same direction as the swipe gesture was detected, and the causes the set of functions to slide onto the display in the same direction as the swipe gesture was detected.

In some embodiments, while displaying the set of functions in the adaptive toolbar, the electronic device receives input of a second set of one or more characters (e.g., alphanumeric characters entered using a keyboard displayed on a touch screen device that incorporates the display device; unicode characters). In some embodiments, in response to receiving input of the second set of one or more characters, in accordance with a determination, based on the second set of one or more characters, that the set of one or more suggestion criteria is satisfied, the electronic device updates the adaptive toolbar to replace display of the set of functions with display of a third suggested input term, wherein the third suggested input term is based on the second set of one or more characters. In some embodiments, the electronic device identifies, based on the second set of one or more characters entered into the text input field, the third suggested input term prior to updating the adaptive toolbar to include the third suggested input term. In some embodiments, in response to receiving input of the second set of one or more characters, in accordance with a determination, based on the second set of one or more characters, that the set of one or more function criteria is satisfied, the electronic device maintains display of the adaptive toolbar (e.g., one or more functions that do not correspond to suggested input terms, and without displaying the third suggested input term (or any suggested input terms)).

Note that details of the processes described above with respect to method 900 (e.g., FIGS. 9A-9B) are also applicable in an analogous manner to the methods described below and above. For example, methods 700 and 1100 optionally includes one or more of the characteristics of the various methods described above with reference to method 900. For brevity, these details are not repeated below.

FIGS. 10A-10Q illustrate exemplary user interfaces for accessing document functions, in accordance with some embodiments. The user interfaces in these figures are used to illustrate the processes described below, including the processes in FIG. 11.

FIG. 10A depicts electronic device 600, which is a smartphone with display 602. Display 602 includes a touch-sensitive surface on which electronic device 600 can detect user gestures (e.g., tap, swipe, drag). In some embodiments, electronic device 600 is, or includes one or more features of, electronic device 100, 300, or 500.

At FIG. 10A, electronic device 600 depicts inbox user interface 604 of an email application. Inbox user interface 604 includes multiple representations of email conversations (e.g., 606a-606c). In some embodiments, an email conversation includes all emails in the same thread (e.g., with the same subject). A user performs a tap gesture to view the emails corresponding to representation 606a. As a result, electronic device 600 detects tap gesture 608 at representation 606a.

Figure 10B:
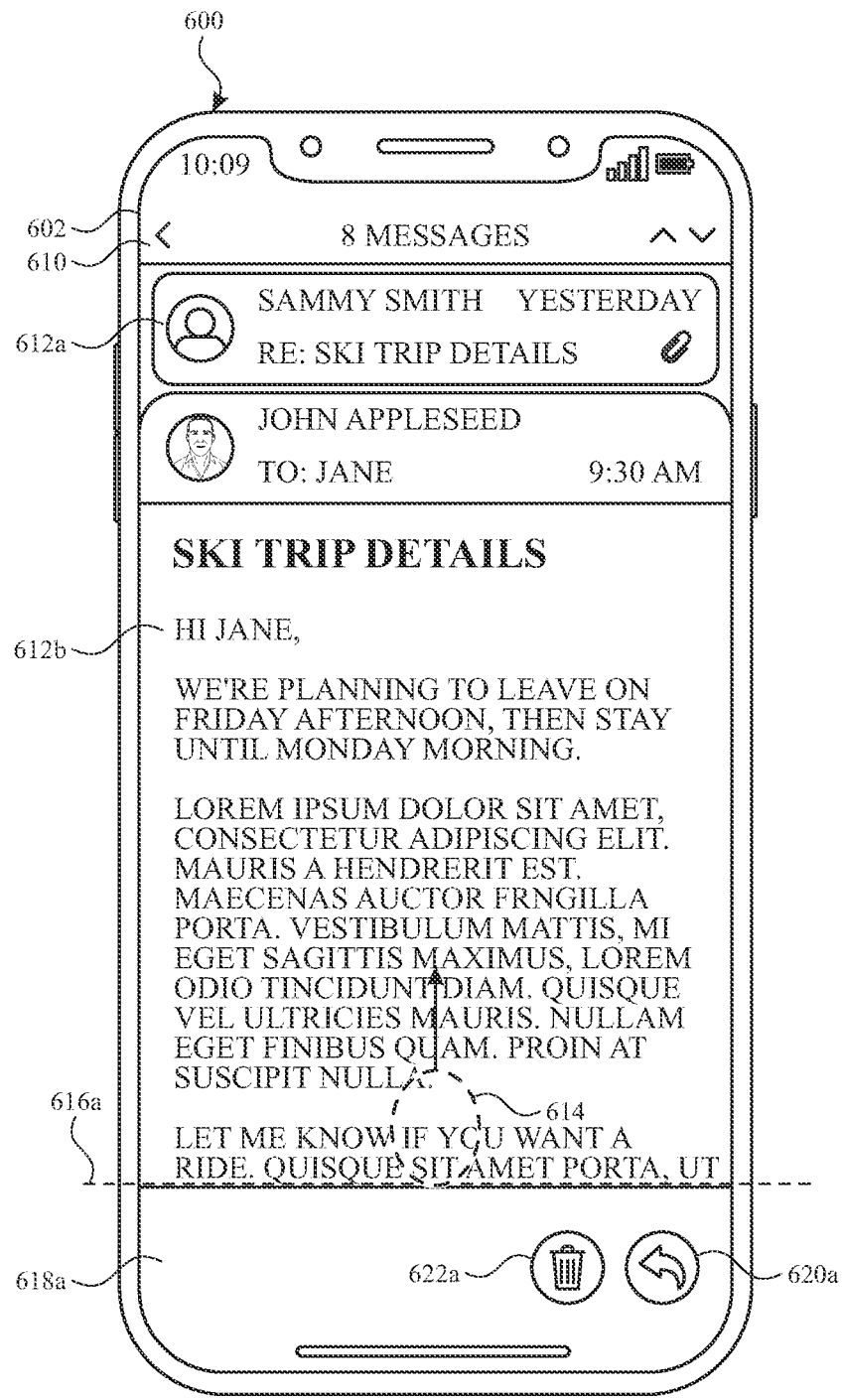

At FIG. 10B, upon detecting tap gesture 608, electronic device 600 displays conversation user interface 610 of the email application. Conversation user interface 610 includes multiple email messages (e.g., 612a-612b). Since email message 612a has already been read (e.g., is in a read state), electronic device 600 displays emails message 612a in a compact state, as depicted in FIG. 10B. In contrast, email message 612b has not been read (e.g., is in an unread state), and is thus displayed in an expanded state.

As shown in FIG. 10B, email message 612b includes footer 618a, which corresponds to email message 612b and does not correspond to email message 612a. Footer 618a includes menu button 620a, which is further discussed below, and delete button 622a, which, when selected, initiates a process for deleting the corresponding email message (e.g., 612b).

The user scrolls upward to view additional content (e.g., portion of an email message that is not yet displayed in FIG. 10B). As a result, while displaying conversation user interface 610, electronic device 600 detects scroll gesture 614 with movement in the upward direction.

Figure 10C:

At FIG. 10C, upon detecting scroll gesture 614, electronic device 600 scrolls email message 612b upward (e.g., in the direction of scroll gesture 614). For illustrative purposes, FIG. 10C depicts threshold line 616a, which marks a threshold for determining whether footer 618a scrolls upward with email message 612b or remains at the same location at the bottom of display 602. In some embodiments, upon detecting scroll gesture 614, electronic device 600 determines whether the bottom of scrolled email message 612b reaches passed threshold line 616a. At FIG. 10C, upon a determination that the bottom of scrolled email message 612b has not reached passed threshold line 616a, electronic device 600 maintains display of footer 618a at the same location (e.g., the location at which footer 618a is displayed in FIG. 10B) while scrolling email message 612b.

As shown in FIG. 10C, the user continues to scroll upward to view additional content (e.g., portion of an email message that is not yet displayed in FIG. 10C) of email message 612b. As a result, while displaying conversation user interface 610, electronic device 600 continues to detect scroll gesture 614 with movement in the upward direction.

Figure 10D:
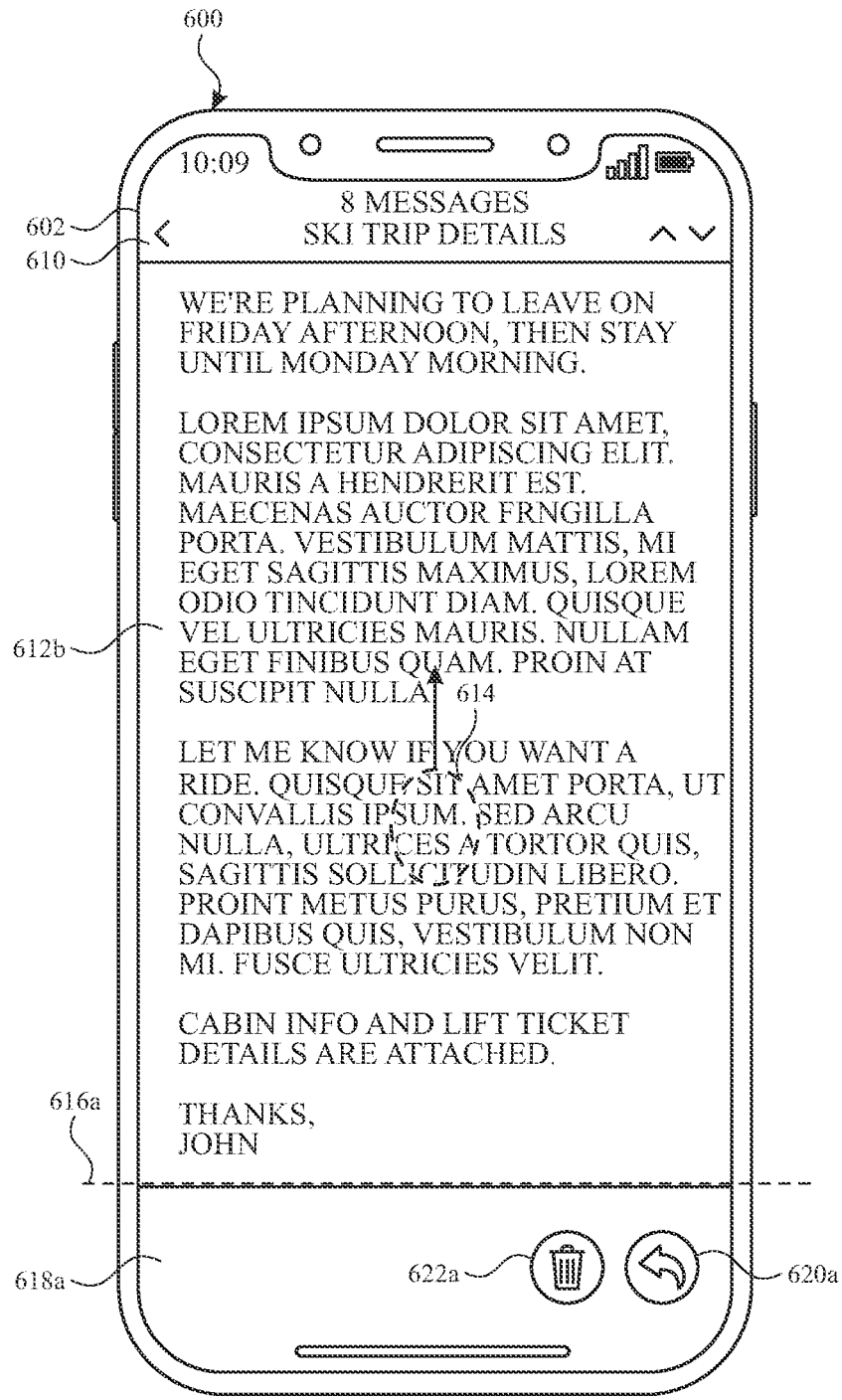

At FIG. 10D, upon further detection of scroll gesture 614, electronic device 600 scrolls email message 612b upward (e.g., in the direction of scroll gesture 614). In some embodiments, upon detection of scroll gesture 614, electronic device 600 determines whether the bottom of scrolled email message 612b reaches passed threshold line 616a. At FIG. 10D, upon a determination that the bottom of scrolled email message 612b has not reached passed threshold line 616a, electronic device 600 continues to maintain display of footer 618a at the same location (e.g., the location at which footer 618a is displayed in FIGS. 10B-10C) while scrolling email message 612b.

As shown in FIG. 10D, the user still continues to scroll upward to view additional content (e.g., portion of an email message that is not yet displayed in FIG. 10D) of email message 612b. As a result, while displaying conversation user interface 610, electronic device 600 still continues to detect scroll gesture 614 with movement in the upward direction.

Figure 10E:
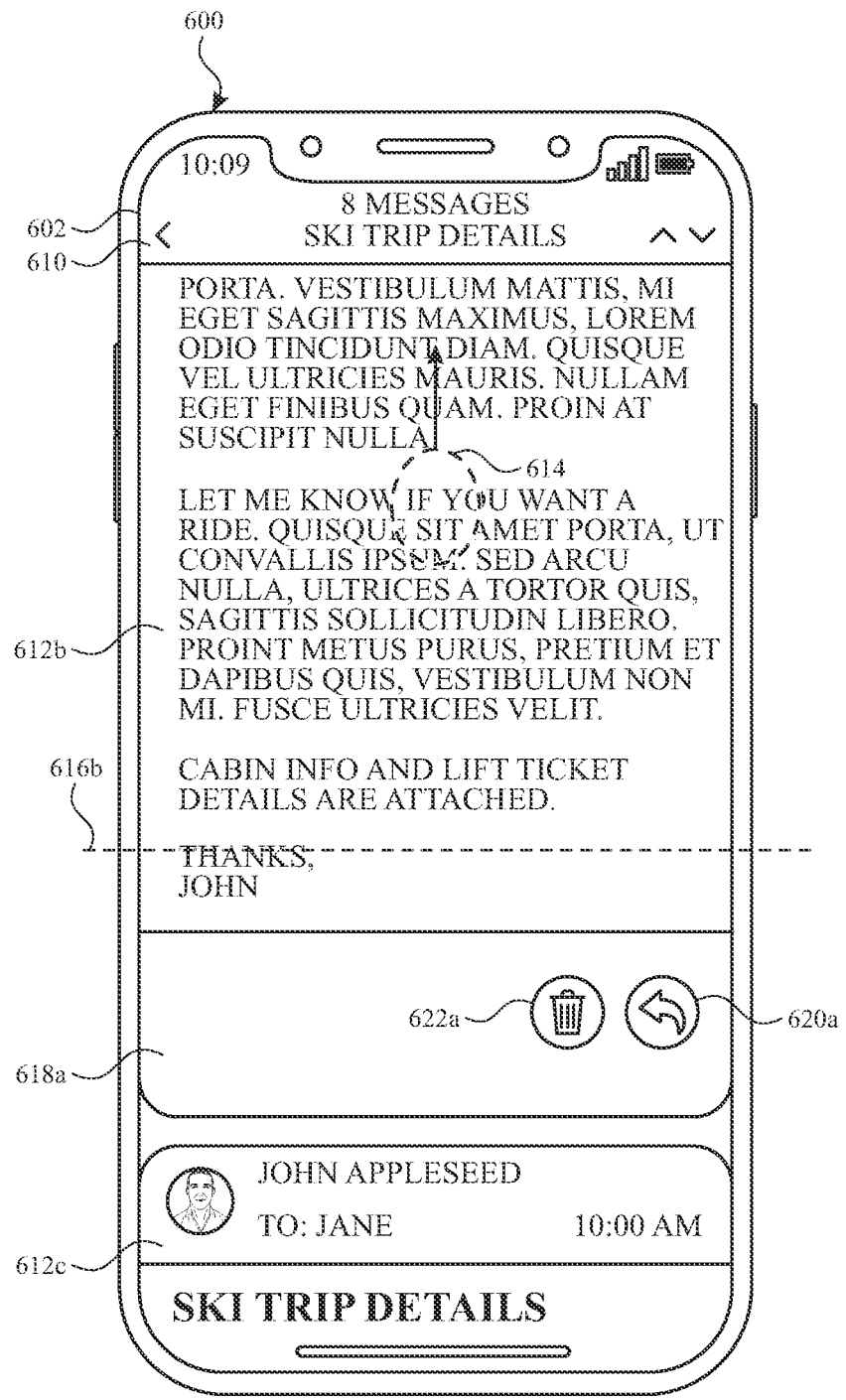

At FIG. 10E, upon further detection of scroll gesture 614, electronic device 600 scrolls email message 612b upward (e.g., in the direction of scroll gesture 614). In some embodiments, upon detection of scroll gesture 614, electronic device 600 determines whether the bottom of scrolled email message 612b reaches passed threshold line 616a. At FIG. 10E, upon a determination that the bottom of scrolled email message 612b has reached passed threshold line 616a, electronic device 600 scrolls footer 618a upward with email message 612b (e.g., does not maintain display of footer 618a at the same location). As footer 618a scrolls upward, footer 618a remains contiguous with the bottom of email message 612b.

As shown in FIG. 10E, upon further detection of scroll gesture 614, electronic device 600 also scrolls a new email message (e.g., 612c) onto display 602 from the bottom edge of display 602. FIG. 10E depicts email message 612c without a footer. For illustrative purposes, FIG. 10E depicts threshold line 616b, which marks a threshold for determining whether to display footer 618b (e.g., by scrolling footer 618b onto display 602 from the bottom edge of display 602). In some embodiments, upon detection of scroll gesture 614, electronic device 600 determines whether the top of scrolled email message 612c has reached passed threshold line 616b. At FIG. 10E, upon a determination that the top of scrolled email message 612c has not reached passed threshold line 616b, electronic device 600 displays email message 612c, but does not display footer 618b.

At FIG. 10E, the user still continues to scroll upward to view additional content (e.g., portion of an email message that is not yet displayed in FIG. 10E). As a result, while displaying conversation user interface 610, electronic device 600 still continues to detect scroll gesture 614 with movement in the upward direction.

Figure 10F:
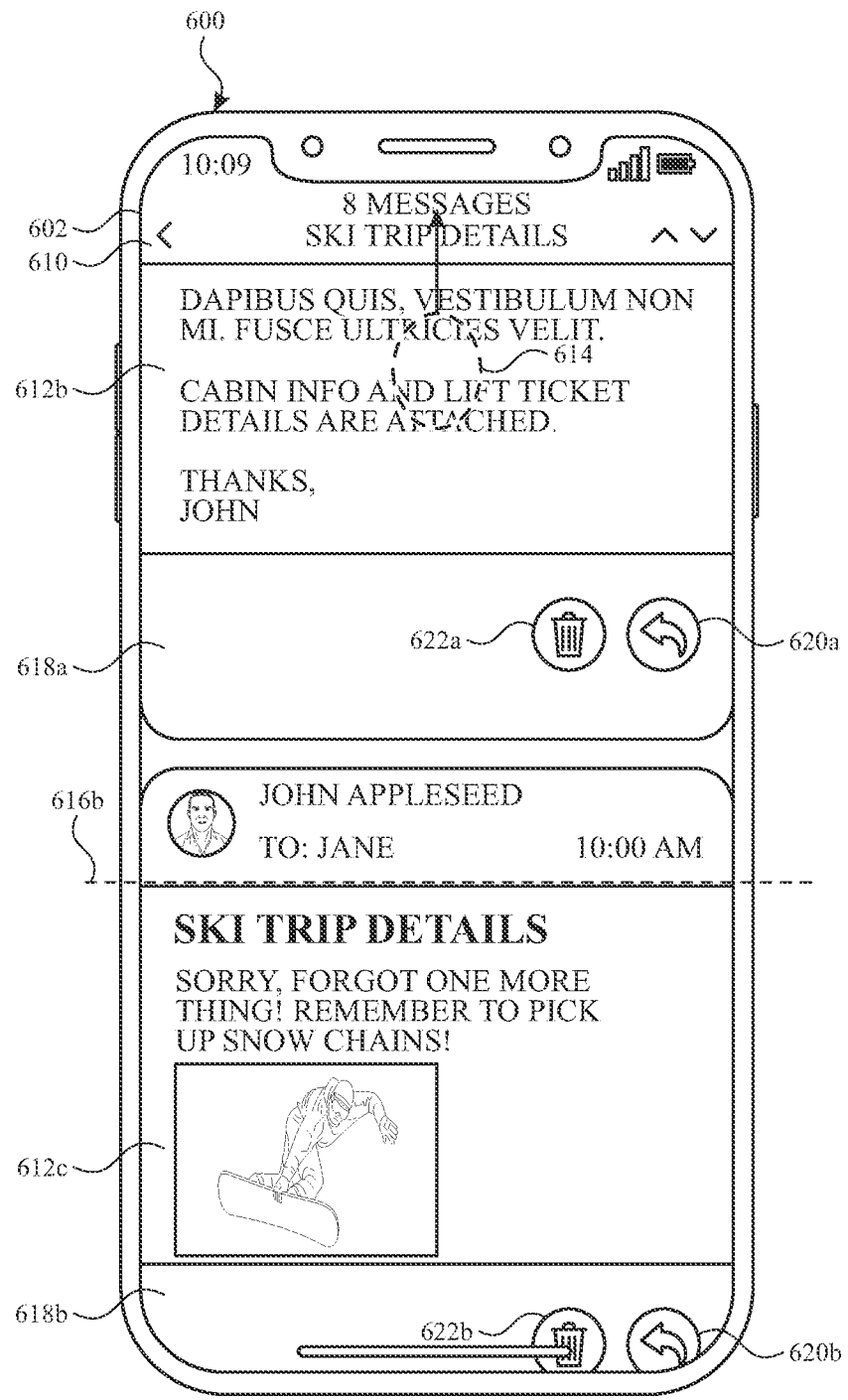

At FIG. 10F, upon further detection of scroll gesture 614, electronic device 600 scrolls email message 612b and email message 612c upward (e.g., in the direction of scroll gesture 614). In some embodiments, upon detection of scroll gesture 614, electronic device 600 determines whether the top of scrolled email message 612c has reached passed (e.g., above) threshold line 616b.

As depicted in FIG. 10F, upon a determination that the top of scrolled email message 612c has reached passed threshold line 616b, electronic device 600 displays at least a portion of footer 618b (e.g., by scrolling footer 618b onto display 602 from the bottom edge of display 602). Footer 618b corresponds to email message 612c and does not correspond to email message 612b. Footer 618b includes menu button 620b, which is further discussed below, and delete button 622b, which, when selected, initiates a process for deleting the corresponding email message (e.g., 612c).

At FIG. 10F, the user still continues to scroll upward. As a result, while displaying conversation user interface 610, electronic device 600 detects scroll gesture 614 and, in response, scrolls email message 612c and footer 618b upward (e.g., in the direction of scroll gesture 614), as shown in FIG. 10G.

Figure 10G:
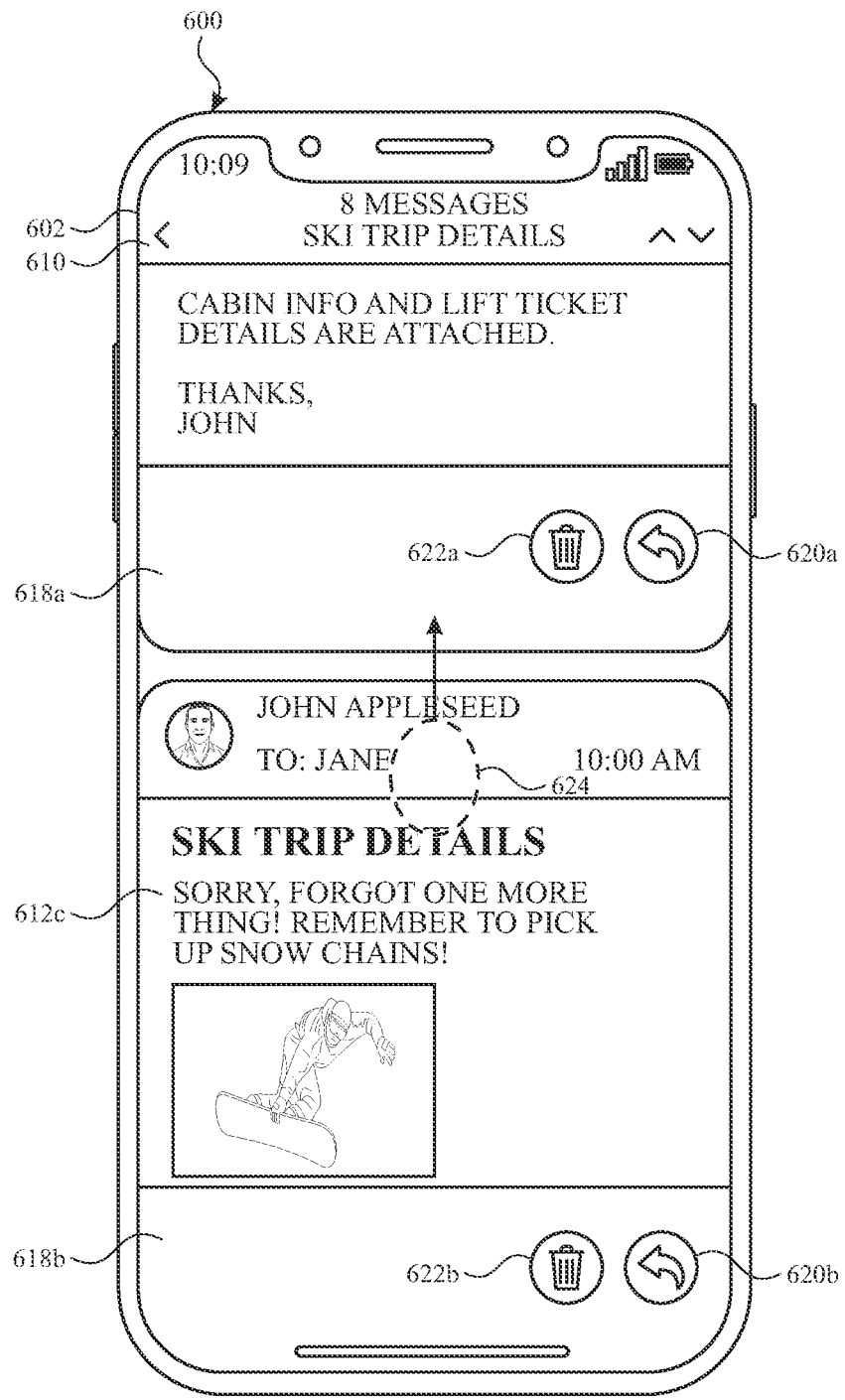

FIG. 10G depicts footer 618b being fully displayed on display 602 (e.g., no portion of footer 618b is not being displayed) in response to the scroll gestures. Email message 612c is the most recent email message in the conversation. Because the most recent email message is displayed at the bottom of the conversation thread, there is no additional content to access by scrolling upward. In some embodiments, the most recent email message is displayed at the top of the conversation thread.

Figure 10H:
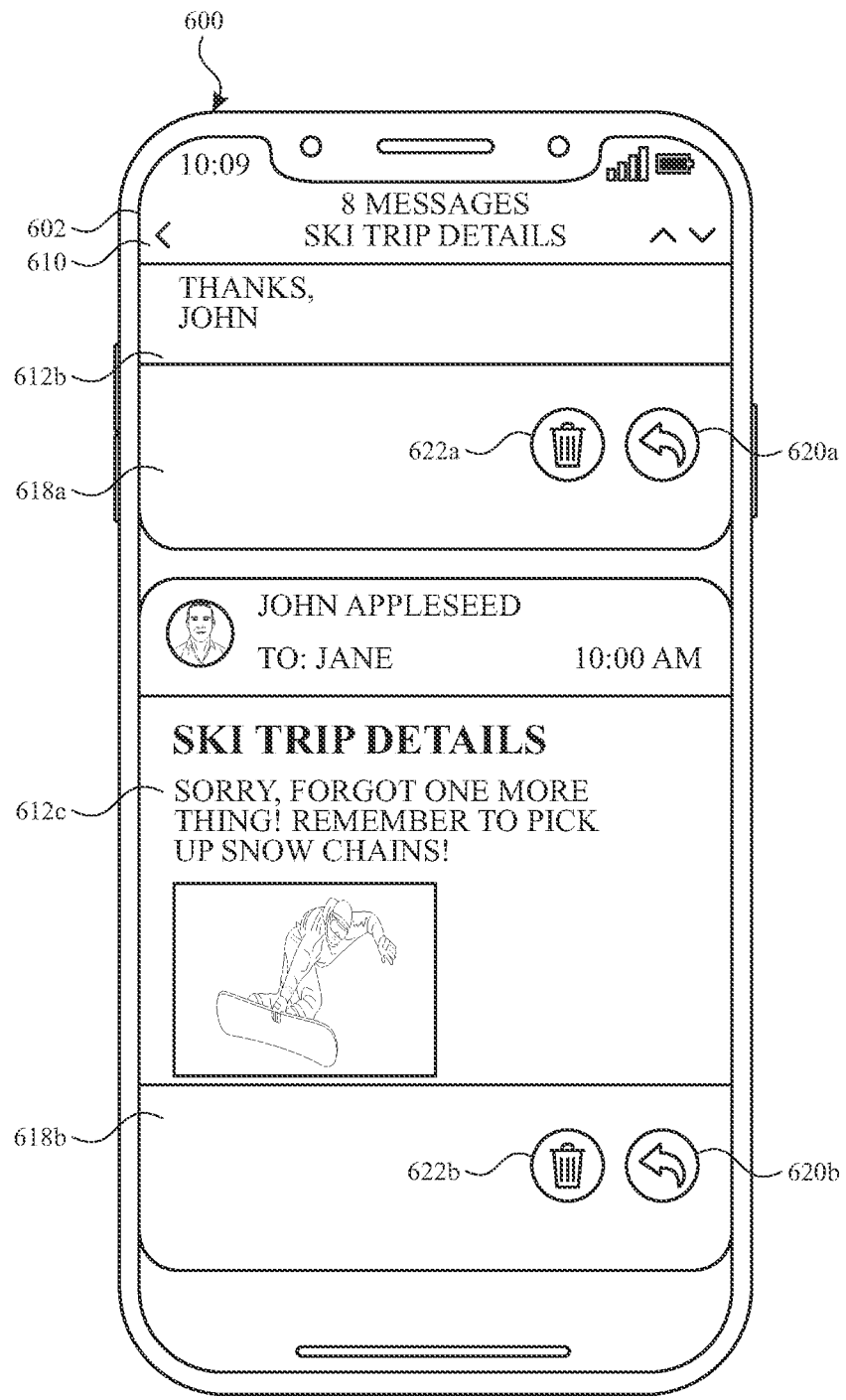

At FIG. 10G, the user starts a new scroll gesture. As a result, while displaying conversation user interface 610, electronic device 600 detects scroll gesture 624. At FIG. 10H, upon detecting scroll gesture 624, electronic device 600 scrolls email message 612c and footer 618b upward. Upon liftoff of scroll gesture 624, electronic device 600 automatically scrolls email message 612c and footer 618b back downward to their respective original locations, as shown in FIG. 10I.

Figure 10I:
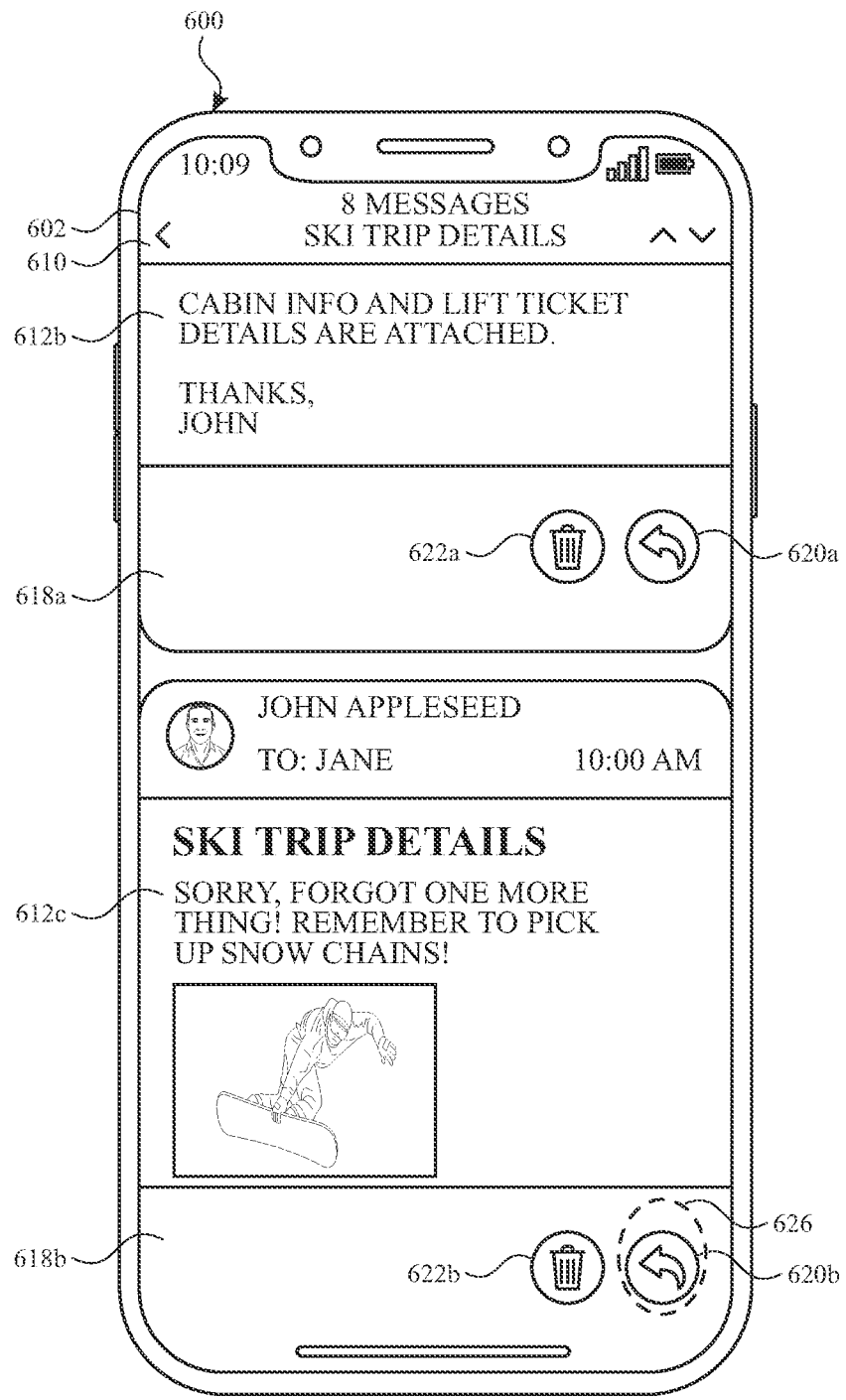

At FIG. 10I, the user performs a tap gesture on menu button 620b, which corresponds to email message 612c. As a result, electronic device 600 detects tap gesture 626 at menu button 620b.

Figure 10J:
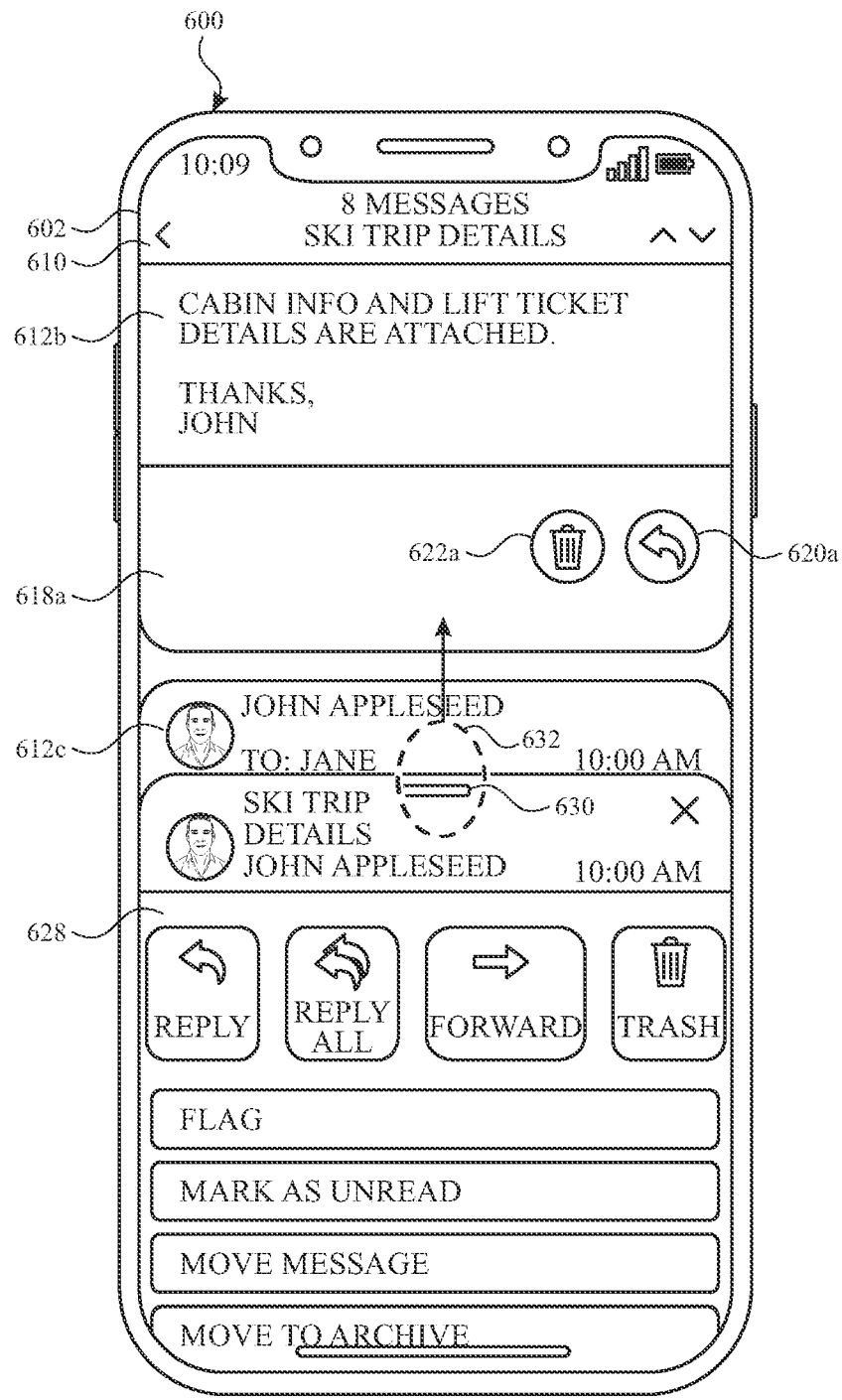

At FIG. 10J, upon detecting tap gesture 626, electronic device 600 displays menu 628 in a compact state. Menu 628 is overlaid on top of a bottom portion of conversation user interface 610. Menu 628 includes grabber icon 630, which provides an indication that menu 628 can be interacted with (e.g., resized). The user performs a drag gesture to expand menu 628. As a result, electronic device 600 detects drag gesture 632 at grabber icon 630 with movement in the upward direction.

Figure 10K:
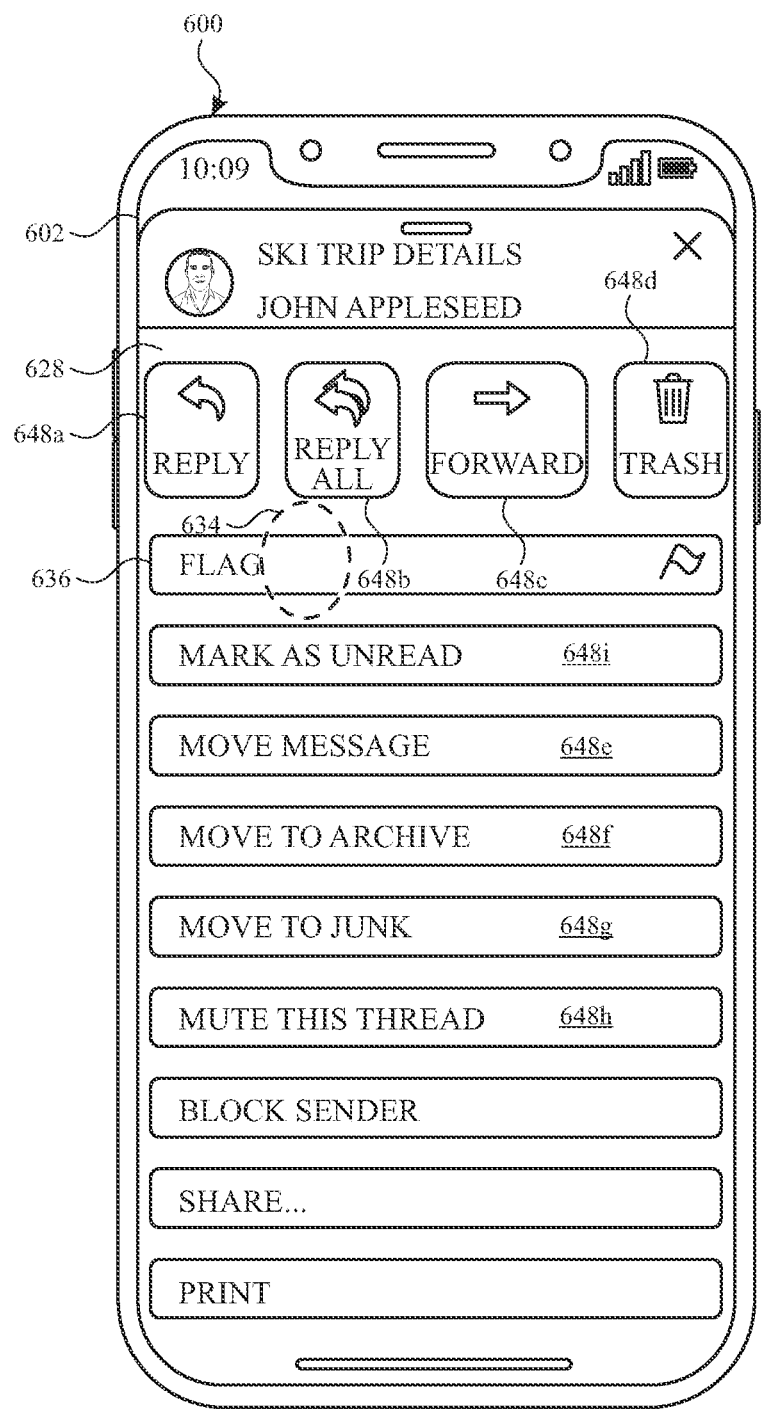

At FIG. 10K, upon detecting drag gesture 632, electronic device 600 displays menu 628 in an expanded state. Further, electronic device 600 ceases to display email messages 612b-612c and their respective footers (e.g., 618a-618b).

Menu 628 includes multiple options associated with email message 612c. For example, menu 628 includes an option (e.g., 648a) to reply to email message 612c, an option (e.g., 648b) to reply all to email message 612c, an option (e.g., 648c) to forward email message 612c, an option (e.g., 648d) to delete email message 612c, options (e.g., 648e-648g) to move email message 612c to a different folder, an option (e.g., 648h) to mute notifications associated with email message 612c, and an option (e.g., 648i) to change the read status of email message 612c.

As shown in FIG. 10K, the user performs a tap gesture associated with an option different from those listed above. Specifically, the user performs a tap gesture to flag email message 612c. As a result, electronic device detects tap gesture 634 at flag button 636.

Figure 10L:
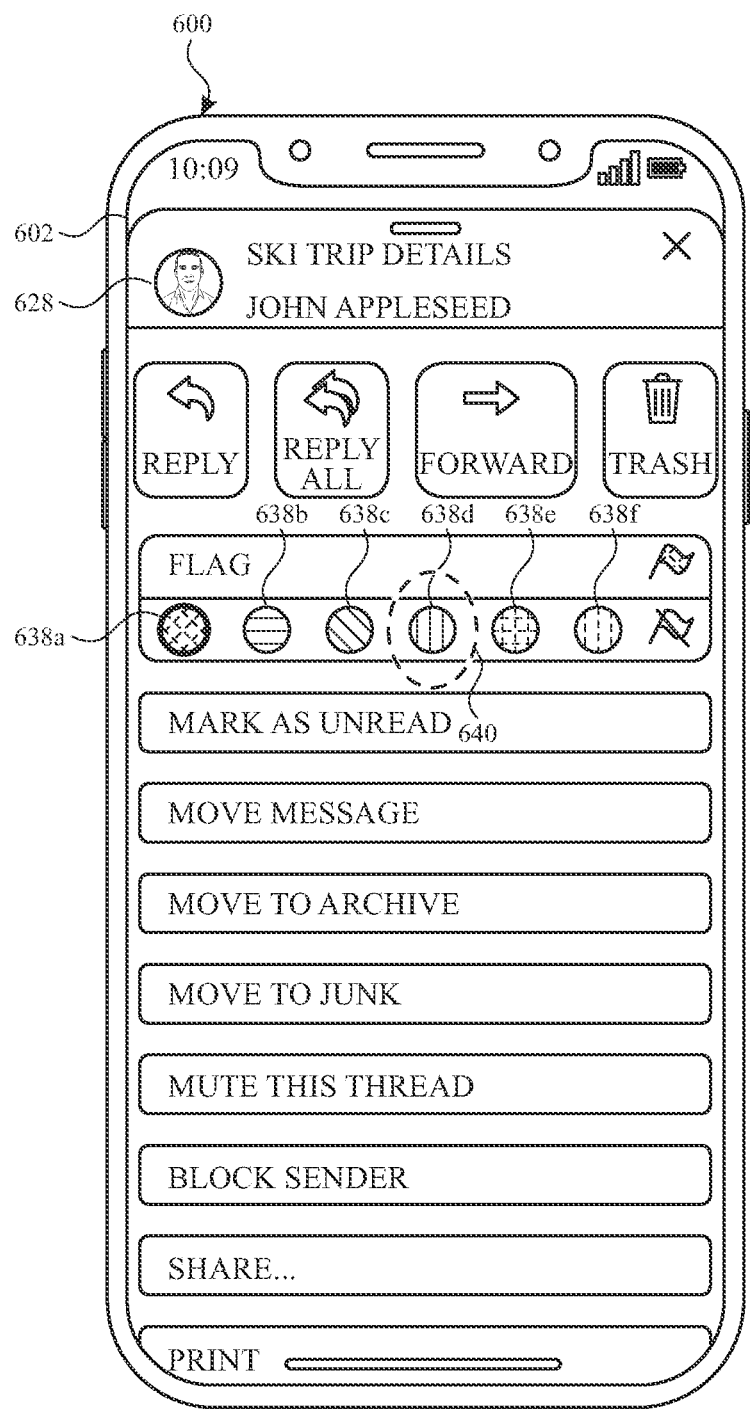

At FIG. 10L, upon detecting tap gesture 634, electronic device 600 associates email message 612c with a default flag (e.g., 638a). Flagging an email message provides a user with the ability to easily look up the flagged email message at a later time. A user can categorize email messages using flags. For example, all email messages that have been flagged with flag 638a are categorized into one category. Similarly, all email messages that have been flagged with flag 638b are categorized into a different category.

As shown in FIG. 10L, the user performs a tap gesture to change the flag associated with email message 612c. As a result, electronic device 600 detects tap gesture 640 at flag 638d.

Figure 10M:
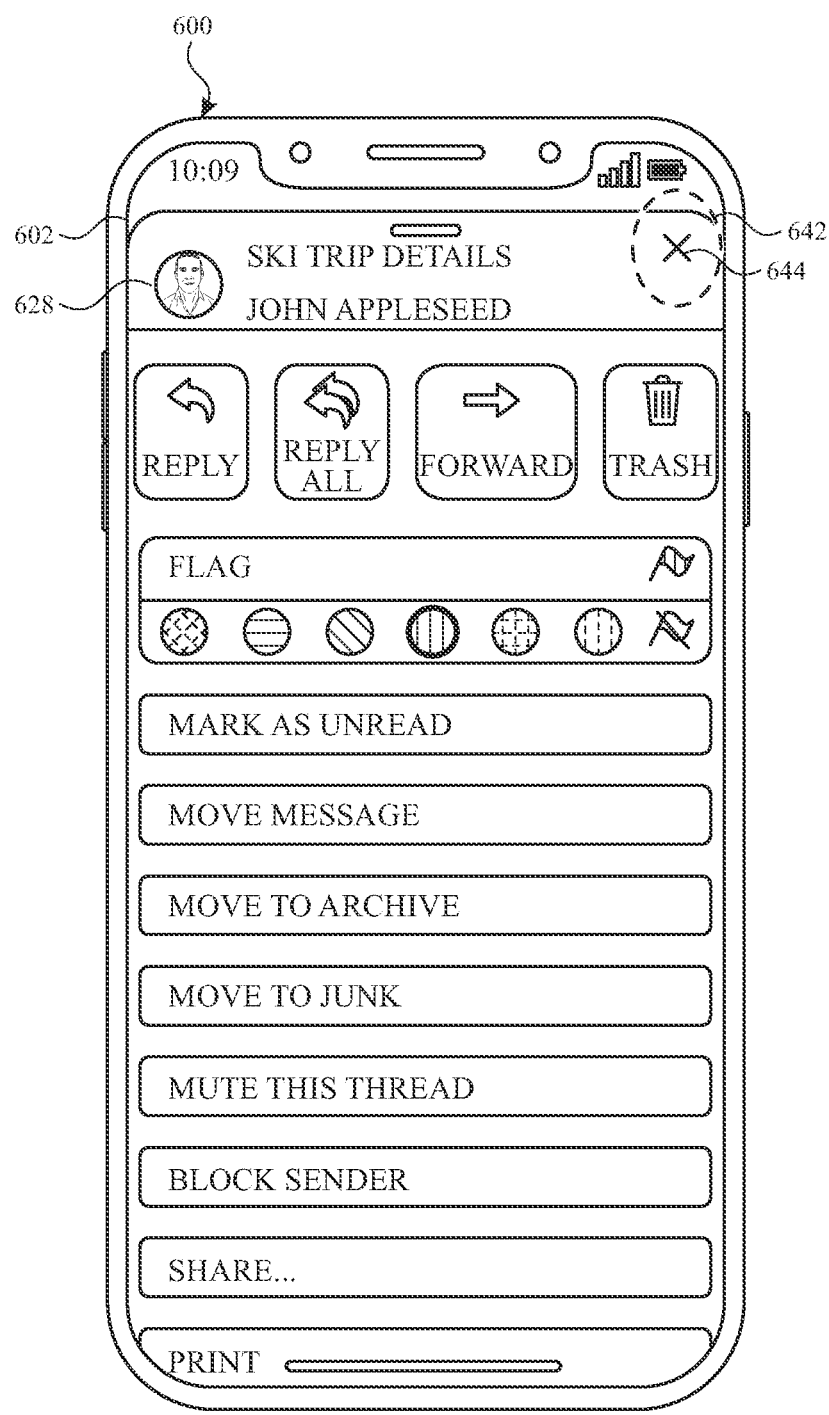

At FIG. 10M, upon detecting tap gesture 640, electronic device 600 associates email message 612c with flag 638d instead of flag 638a, such as by visually emphasizing flag 638d. The user performs a tap gesture to return to conversation user interface 610. As a result, electronic device 600 detects tap gesture 642 at exit button 644.

Figure 10N:
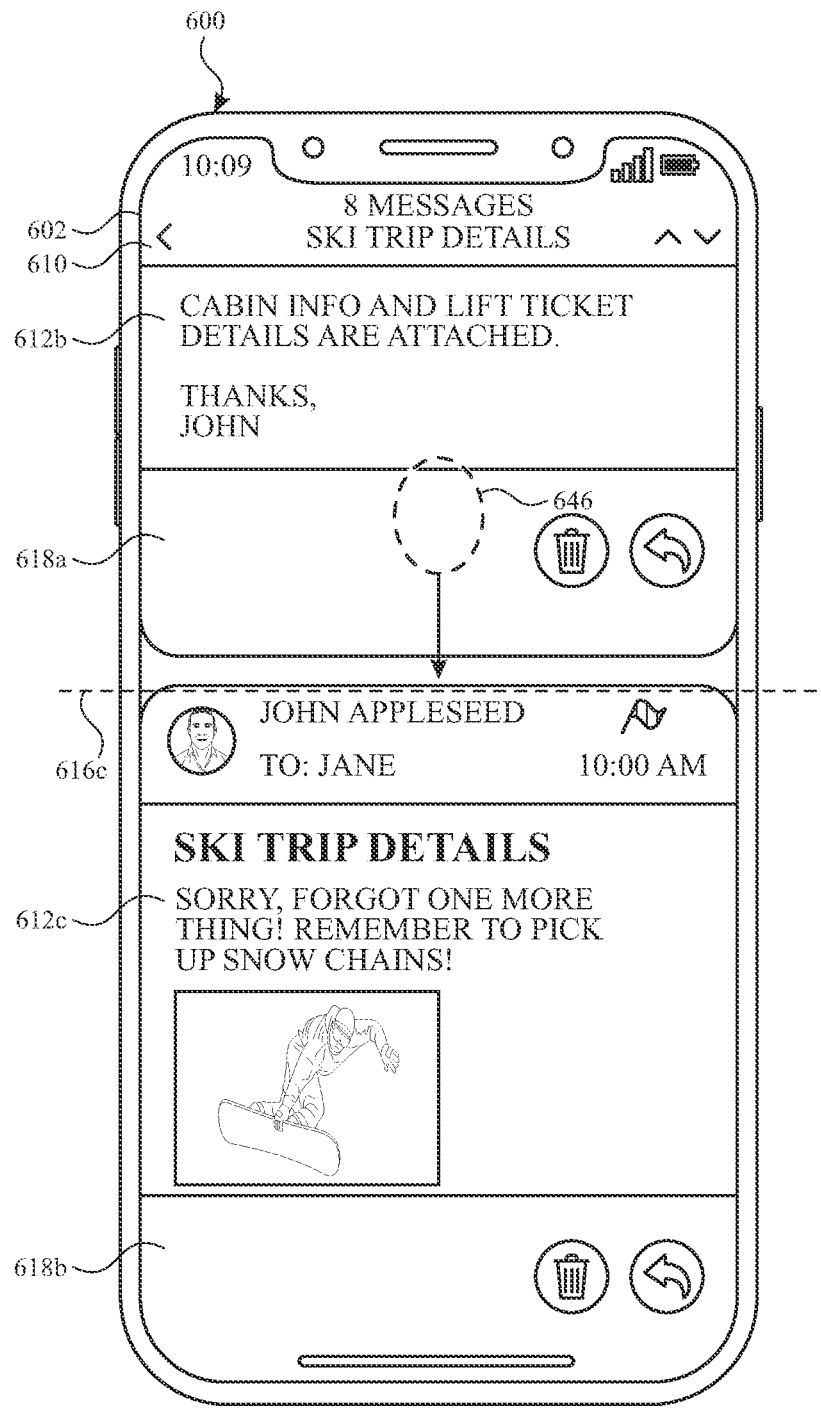
Figure 10O:
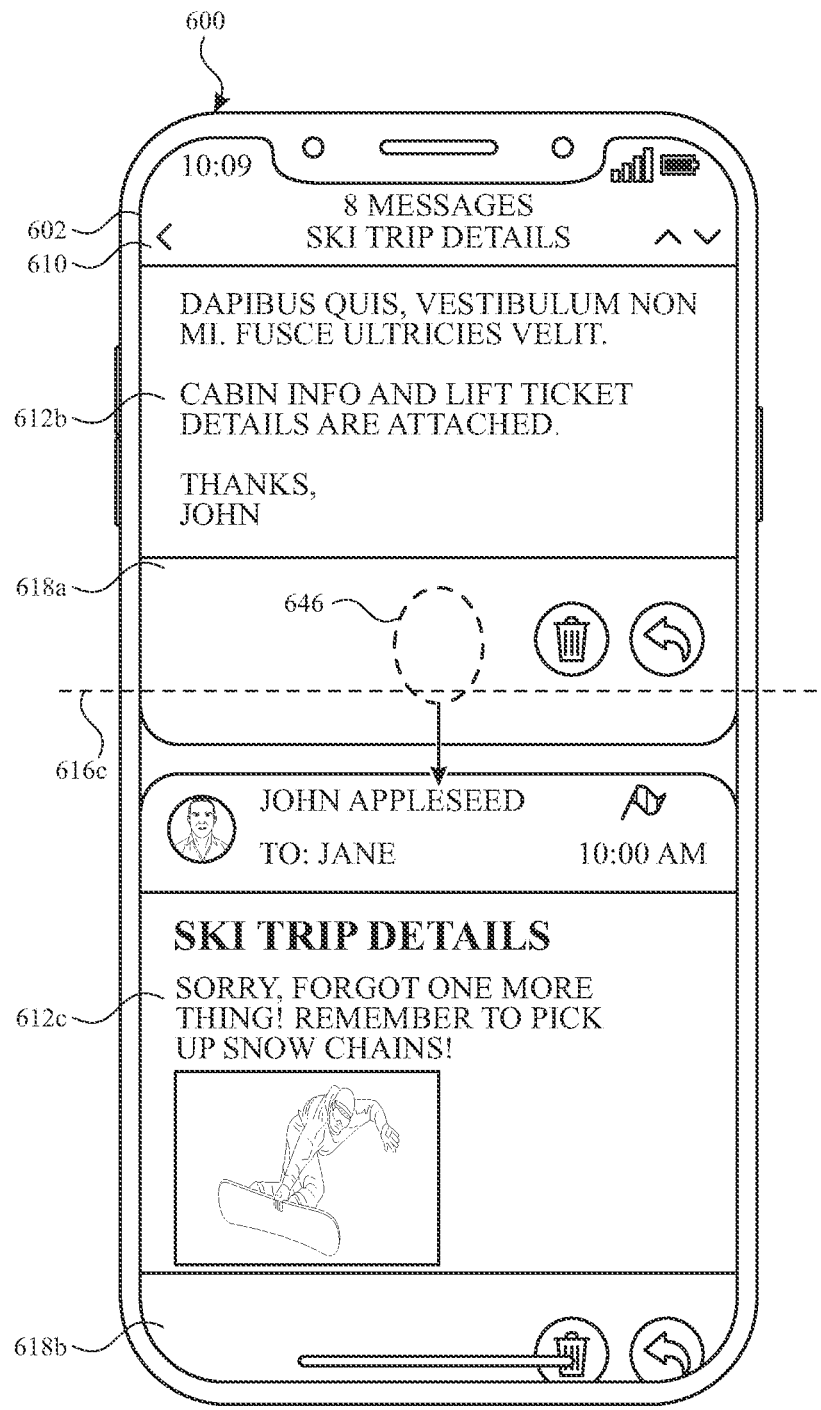

At FIG. 10N, upon detecting tap gesture 642, electronic device 600 displays conversation user interface 610 with email messages 612b-612c. In particular, electronic device 600 returns to the displayed state of conversation user interface 610 in FIG. 10G. FIGS. 10N-10Q illustrate that scroll gesture 646 (e.g., a scroll gesture with movement in the opposite direction of scroll gesture 614) results in the same displayed user interfaces in FIGS. 10B-10G, but in reverse order. For example, FIG. 10N depicts the same displayed state of conversation user interface 610 as that of FIG. 10G. For illustrative purposes, FIG. 10N depicts threshold line 616c, which marks a threshold for determining whether to cease display of at least a portion of footer 618b (e.g., by scrolling footer 618b off the bottom edge of display 602). In some embodiments, upon detection of scroll gesture 646, electronic device 600 determines whether the top of the scrolled email message (e.g., 612c) has reached passed threshold line 616c. At FIG. 10O, upon a determination that the top of the scrolled email message (e.g., 612c) has reached passed threshold line 616c, electronic device 600 ceases to display at least a portion of footer 618b.

Figure 10P:
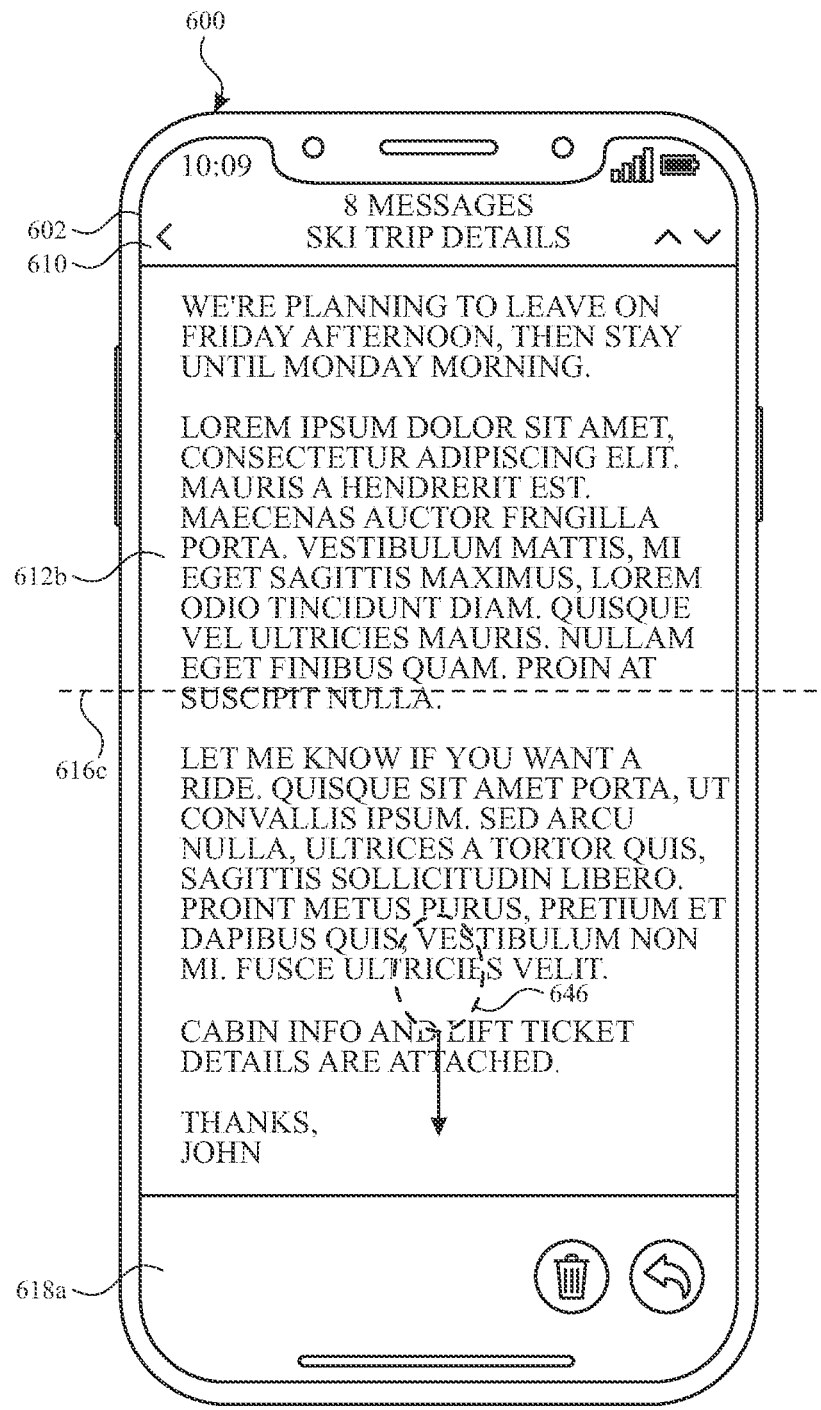
Figure 10Q:

In contrast, upon a determination that the top of the scrolled email message (e.g., 612b) has not reached passed threshold line 616c, electronic device 600 continues displaying footer 618a (e.g., including the at least portion of footer 618a), as depicted in FIGS. 10P-10Q.

FIG. 11 is a flow diagram illustrating a method for accessing document functions using an electronic device in accordance with some embodiments. Method 1100 is performed at a device (e.g., 100, 300, 500, 600) with a display device. Some operations in method 1100 are, optionally, combined, the orders of some operations are, optionally, changed, and some operations are, optionally, omitted.

As described below, method 1100 provides an intuitive way for accessing document functions. The method reduces the cognitive burden on a user for accessing document functions, thereby creating a more efficient human-machine interface. For battery-operated computing devices, enabling a user to access document functions faster and more efficiently conserves power and increases the time between battery charges.

The electronic device concurrently displays (1102), on the display device, a first portion of a first content (e.g., a message, an email) and a first footer (e.g., 618a) at a first location on the display device. In some embodiments, the first footer corresponds to the first content. In some embodiments, the first footer includes affordances for performing functions on the first content, such as deleting the first content and initiating a process for responding to a sender of the first content.

In some embodiments, the first content is a first message (e.g., 612b, an email message). In some embodiments, the first footer of the first message includes a first reply affordance (e.g., 620a).

In some embodiments, the first content is a first message (e.g., an email message). In some embodiments, the first footer of the first message includes a first delete affordance. In some embodiments, activation of the first delete affordance deletes the first message. In some embodiments, activation of the first delete affordance displays a confirmation menu for confirming whether to delete the first message.

In some embodiments, while displaying the first footer, the electronic device detects a first user input. In some embodiments, in response to detecting the first user input, in accordance with a determination that the first user input corresponds to activation of the first reply affordance, the electronic device displays an options menu that includes a first set of one or more options (and does not include a second set of one or more options) for performing operations on the first message (e.g., an option for initiating a process for transmitting a second message based on the first message (e.g., replying to the first message, forwarding the first message, displaying a draft reply email that includes the sender of the first message in the to-field of the draft message, displaying a menu of options for replying, replying-all, and forwarding the first message)).

In some embodiments, the first set of one or more options include one or more of a first option, which when activated (e.g., selected), initiates a process to delete the first message, a second option, which when activated (e.g., selected), initiates a process to reply to the first message, a third option, which when activated (e.g., selected), changes the read status of the first message, a fourth option, which when activated (e.g., selected), initiates a process for moving the first message, and a fifth option, which when activated (e.g., selected), mutes notifications for a message conversation of which the first message is a part of.

In some embodiments, the first set of one or more options includes a sixth option, which when activated, displays a plurality of color options for flagging the first message. In some embodiments, the electronic device detects activation of (e.g., tap on) the sixth option. In some embodiments, in response to detecting activation of the sixth option, the electronic device displays the plurality of color options for flagging the first message. In some embodiments, the electronic device detects a third user input on a respective color option of the plurality of color options. In some embodiments, in response to detecting the third user input, the electronic device sets a flag of the respective color for the first message.

In some embodiments, while displaying the first footer, the electronic device detects a first user input. In some embodiments, in response to detecting the first user input, in accordance with a determination that the first user input corresponds to activation of the first delete affordance, the electronic device initiates a process for deleting the first message (e.g., displaying a confirmation user interface for deleting the first message, deleting the first message).

In some embodiments, while displaying the options menu, the electronic device detects a second user input. In some embodiments, in accordance with a determination that the second user input corresponds to a request to expand the options menu, the electronic device expands the options menu to currently display, on the display device, a second set of one or more options with the first set of one or more options. In some embodiments, the second set of one or more options are for performing operations (e.g., move to junk, block sender, move to archive, print) on the first message.

The electronic device detects (1104) a scroll input (e.g., 614, a (vertical) swipe gesture, rotation of a rotatable input mechanism). In some embodiments, the scroll input is directed to (e.g., a gesture performed on) the first content.

In response (1106) to detecting the scroll input, in accordance with (1108) a determination that (e.g., based on scrolling the first content based on the magnitude of the scroll input) a set of footer-maintaining criteria is satisfied for the first content, wherein the set of footer-maintaining criteria include a first criterion that is satisfied when a bottom of the first content is not scrolled to above a first threshold location on the display device, the electronic device scrolls (1110), on the display device, the first content (e.g., 612*b*) based on a (non-zero) magnitude of the scroll input and maintains (1112), at the first location on the display device, the first footer (e.g., 618*a* at FIG. 10B-10D).

Scrolling or not scrolling the footer based on the set of footer-maintaining criteria allows the footer to be available without unnecessarily consuming display space and without requiring further user input. Preserving display space and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of footer-maintaining criteria includes a second criterion that is satisfied when a threshold (non-zero) amount (e.g., 100 pixels worth, 3 lines worth, one-third, one-half, two-thirds) of the first content is displayed (e.g., in conjunction with the top off the content being displayed (when, for example, the content is being scrolled up onto the display from the bottom of the display), in conjunction with the bottom off the content not being displayed. In some embodiments, when the device detects input that begins to scroll the first content down on the display, the electronic device determines whether a threshold amount of the first content is remaining displayed. In accordance with less than the threshold amount being displayed, the electronic device ceases to display the footer (e.g., scrolls the footer off the bottom of the display in conjunction with scrolling the first content).

In some embodiments, when the electronic device detects input that begins to scroll the first content onto the display from the bottom of the display, a threshold amount of the content is scrolled onto the display first before the first footer is scrolled onto the display. Once the first footer is fully scrolled onto the display and displayed at the first location, the first footer is maintained at the first location until an end (bottom) of the first content is reached. Once the end of the first content is reached, scrolling the first content up causes the first footer to scroll up (e.g., to the second location) in conjunction with the first content.

In some embodiments, the set of footer-maintaining criteria includes a third criterion that is not satisfied when a top of the first content is displayed below a second threshold location on the display device. Thus, in some embodiments, when the top of the displayed first content is too far down on the display, the device does not display the first footer (at the first location or at any location) on the display device. In some embodiments, the set of footer-maintaining criteria includes a criterion that is satisfied when a top of the first content is not displayed below a second threshold location on the display device.

In response (1106) to detecting the scroll input, in accordance with (1116) a determination that (e.g., based on scrolling the first content based on the magnitude of the scroll input) the set of footer-maintaining criteria is not satisfied for the first content, the electronic device scrolls (1118), on the display device, the first content based on the (non-zero) magnitude of the scroll input and ceases (1120) to display, at the first location on the display device, the first footer (e.g., 618*a* at FIG. 10E-10F, continuing to display the footer but scrolling the footer away from the first location to a second location different from the first location, scrolling the footer up, scrolling the footer down and off of the display device).

In some embodiments, in accordance with the determination that (e.g., based on scrolling the first content based on the magnitude of the scroll input) the set of footer-maintaining criteria is satisfied for the first content and that the scroll input corresponds to a first direction (e.g., swipe up), scrolling the first content based on the magnitude of the scroll input includes scrolling the first content in the first direction to display a second portion of the first content concurrently with the first portion of the first content. In some embodiments, the second portion of the first content is different from the first portion of the first content (e.g., the end of the message is not already displayed, so scrolling up causes additional portions of the message to be displayed).

In some embodiments, in accordance with the determination that (e.g., based on scrolling the first content based on the magnitude of the scroll input) the set of footer-maintaining criteria is satisfied for the first content and that the scroll input corresponds to a second direction (e.g., swipe down, different from the first direction), scrolling the first content based on the magnitude of the scroll input includes scrolling the first content in the second direction to cease to display at least a part of the first portion of the first content (e.g., the end of the message is not already displayed, and scrolling down causes portions of the message to go off the display).

In some embodiments, in accordance with the determination that (e.g., based on scrolling the first content based on the magnitude of the scroll input) the set of footer-maintaining criteria is not satisfied for the first content and that the scroll input corresponds to a first direction (e.g., swipe up): scrolling the first content based on the magnitude of the scroll input includes, scrolling the first content in the first direction without displaying a second portion of the first content (e.g., different from the first portion of the first document, the end of the message is already displayed, so scrolling up does not cause additional portions to be displayed). In some embodiments, in accordance with the determination that (e.g., based on scrolling the first content based on the magnitude of the scroll input) the set of footer-maintaining criteria is not satisfied for the first content and that the scroll input corresponds to a first direction (e.g., swipe up), ceasing to display, at the first location on the display device, the first footer includes continuing to display, on the display device, the first footer by scrolling the first footer in the first direction to a second location on that display device that is different from the first location (e.g. scrolling the first footer up without scrolling the first footer off the top of the display).

In some embodiments, in accordance with the determination that (e.g., based on scrolling the first content based on the magnitude of the scroll input) the set of footer-maintaining criteria is not satisfied for the first content and that the scroll input corresponds to a second direction (e.g., swipe down, different from the first direction), scrolling the first content based on the magnitude of the scroll input includes scrolling the first content while continuing to display the first portion of the first content (e.g., the bottom of the message not at the bottom of the display, scrolling down does not cause the bottom of the message to go off the display). In some embodiments, in accordance with the determination that (e.g., based on scrolling the first content based on the magnitude of the scroll input) the set of footer-maintaining criteria is not satisfied for the first content and that the scroll input corresponds to a second direction (e.g., swipe down, different from the first direction), ceasing to display, at the first location on the display device, the first footer includes ceasing to display, on the display device, the first footer by scrolling the first footer in the second direction (e.g. scrolling the first footer off of the bottom of the display).

In some embodiments, in response to detecting the scroll input, the electronic device scrolls, onto the display device, a first portion of a second content (e.g., without displaying a footer corresponding to the second content, and without displaying a second portion of the second content). In some embodiments, in response to detecting the scroll input, in accordance with a determination that (e.g., based on scrolling the second content based on the magnitude of the scroll input) the set of footer-displaying criteria (e.g., the footer-maintaining criteria) is satisfied for the second content, wherein the set of footer-displaying criteria includes the first criterion that is satisfied when a bottom of the second content is not scrolled to above a first threshold location on the display device, the electronic device scrolls, on the display device, the second content based on the (non-zero) magnitude of the scroll input (e.g., to concurrently display, with the first portion of the second content, a second portion of the second content). In some embodiments, in response to detecting the scroll input, in accordance with a determination that (e.g., based on scrolling the second content based on the magnitude of the scroll input) the set of footer-displaying criteria (e.g., the footer-maintaining criteria) is satisfied for the second content, wherein the set of footer-displaying criteria includes the first criterion that is satisfied when a bottom of the second content is not scrolled to above a first threshold location on the display device, the electronic device displays, at the first location on the display device, a second footer corresponding to the second content. In some embodiments, in response to detecting the scroll input, in accordance with a determination that (e.g., based on scrolling the second content based on the magnitude of the scroll input) the set of footer-displaying criteria is not satisfied for the second content, the electronic device scrolls, on the display device, the second content based on the (non-zero) magnitude of the scroll input. In some embodiments, in response to detecting the scroll input, in accordance with a determination that (e.g., based on scrolling the second content based on the magnitude of the scroll input) the set of footer-displaying criteria is not satisfied for the second content, the electronic device forgoes displaying, at the first location on the display device, the second footer (e.g., display the second footer at a location different from the first location, not displaying the second footer). In some embodiments, the first content is a first message and the second content is a second message, and the first message and the second message are different messages (e.g., email messages) that are part of the same message conversation.

Displaying a second footer for a second content based on whether the set of footer-displaying criteria (e.g., the footer-maintaining criteria) is satisfied for the second content allows the functionality of the footer to be available when the user is likely to need it without unnecessarily using display space and without requiring further user input. Preserving display space and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIG. 11) are also applicable in an analogous manner to the methods described above. For example, methods 700 and 900 optionally includes one or more of the characteristics of the various methods described above with reference to method 1100. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide word and contact information suggestions to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, or any other identifying or personal information.

The present disclosure recognizes that the use of such personal information data, in the present technology, can be used to the benefit of users. For example, the personal information data can be used to provide relevant word and contact information suggestions. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the word and contact information suggestions, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, terms can be suggested by inferring preferences based on non-personal information data or a bare minimum amount of personal information, such as the content being requested by the device associated with a user or publicly available information.

What is claimed is:

1. An electronic device, comprising:
   a display device;
   a touch-sensitive surface;
   one or more processors; and
   memory storing one or more programs configured to be executed by the one or more processors, the one or more programs including instructions for:
      displaying a text field;
      receiving input of one or more characters;
      in response to receiving the input of one or more characters:
         displaying the one or more characters in the text field;
         identifying, based on the one or more characters, one or more entities, wherein the one or more entities correspond to respective entries of an address book of the electronic device, wherein a first entity of the one or more entities corresponds to a first entry of the address book, the first entry including a name for the first entity and a plurality of contact identifiers for contacting the first entity using a first contact modality, and wherein the plurality of contact identifiers of the first entry include a first contact identifier for contacting the first entity using the first contact modality and a second contact identifier different from the first contact identifier for contacting the first entity using the first contact modality; and displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity;

while displaying the results corresponding to at least some of the one or more entities, including the first result for the first entity, receiving, via the touch-sensitive surface, a first user input;

in accordance with a determination that the first user input corresponds to a first portion of the first result, replacing display of the one or more characters in the text field with a representation of the first contact identifier; and in accordance with a determination that the first user input corresponds to a second portion, different from the first portion, of the first result, displaying, on the display device, the plurality of contact identifiers for contacting the first entity using the first contact modality, including the first contact identifier and the second contact identifier.

2. The electronic device of claim 1, wherein the one or more programs further include instructions for:

prior to displaying the first result for the first entity:
selecting, based on a set of selection criteria, the first contact identifier from among the plurality of contact identifiers to include in the first result, wherein the set of selection criteria includes a first selection criterion that is based on a frequency of use of a respective contact identifier.

3. The electronic device of claim 1, wherein the one or more programs further include instructions for:

prior to displaying the first result for the first entity:
selecting, based on a set of selection criteria, the first contact identifier from among the plurality of contact identifiers to include in the first result, wherein the set of selection criteria includes a second selection criterion that is based on content of the respective contact identifier.

4. The electronic device of claim 1, wherein the one or more programs further include instructions for:

after replacing display of the one or more characters in the text field with a representation of the first contact identifier, detecting a second user input at a location corresponding to the representation of the first contact identifier; and in response to detecting the second user input, displaying a set of contact reselection options, including:

a first option corresponding to the first contact identifier, and a second option corresponding to the second contact identifier.

5. The electronic device of claim 4, wherein in the set of contact reselection options:
the first option is emphasized, and
the second option is not emphasized.

6. The electronic device of claim 4, wherein the one or more programs further include instructions for:

while displaying the set of contact reselection options, detecting a third user input at a location corresponding to the second option corresponding to the second contact identifier; and in response to detecting the third user input, replacing display, on the display device, of the representation of the first contact identifier in the text field with a representation of the second contact identifier.

7. The electronic device of claim 1, wherein the one or more programs further include instructions for:

in response to receiving the first user input, ceasing to display, via the display device, the results corresponding to the at least some of the one or more entities.

8. A non-transitory computer-readable storage medium storing one or more programs configured to be executed by one or more processors of an electronic device with a display device and a touch-sensitive surface, the one or more programs including instructions for:

displaying a text field;
receiving input of one or more characters;
in response to receiving the input of one or more characters:
displaying the one or more characters in the text field;
identifying, based on the one or more characters, one or more entities,
wherein the one or more entities correspond to respective entries of an address book of the electronic device,
wherein a first entity of the one or more entities corresponds to a first entry of the address book, the first entry including a name for the first entity and a plurality of contact identifiers for contacting the first entity using a first contact modality, and
wherein the plurality of contact identifiers of the first entry include a first contact identifier for contacting the first entity using the first contact modality and a second contact identifier different from the first contact identifier for contacting the first entity using the first contact modality; and
displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity;

while displaying the results corresponding to at least some of the one or more entities, including the first result for the first entity, receiving, via the touch-sensitive surface, a first user input;

in accordance with a determination that the first user input corresponds to a first portion of the first result, replacing display of the one or more characters in the text field with a representation of the first contact identifier; and in accordance with a determination that the first user input corresponds to a second portion, different from the first portion, of the first result, displaying, on the display device, the plurality of contact identifiers for contacting the first entity using the first contact modality, including the first contact identifier and the second contact identifier.

9. The non-transitory computer-readable storage medium of claim 8, wherein the one or more programs further include instructions for:
prior to displaying the first result for the first entity:
selecting, based on a set of selection criteria, the first contact identifier from among the plurality of contact identifiers to include in the first result, wherein the set of selection criteria includes a first selection criterion that is based on a frequency of use of a respective contact identifier.

10. The non-transitory computer-readable storage medium of claim 8, wherein the one or more programs further include instructions for:
prior to displaying the first result for the first entity:
selecting, based on a set of selection criteria, the first contact identifier from among the plurality of contact identifiers to include in the first result, wherein the set of selection criteria includes a second selection criterion that is based on content of the respective contact identifier.

11. The non-transitory computer-readable storage medium of claim 8, wherein the one or more programs further include instructions for:
after replacing display of the one or more characters in the text field with a representation of the first contact identifier, detecting a second user input at a location corresponding to the representation of the first contact identifier; and
in response to detecting the second user input, displaying a set of contact reselection options, including:
a first option corresponding to the first contact identifier, and
a second option corresponding to the second contact identifier.

12. The non-transitory computer-readable storage medium of claim 11, wherein in the set of contact reselection options:
the first option is emphasized, and
the second option is not emphasized.

13. The non-transitory computer-readable storage medium of claim 11, wherein the one or more programs further include instructions for:
while displaying the set of contact reselection options, detecting a third user input at a location corresponding to the second option corresponding to the second contact identifier; and
in response to detecting the third user input, replacing display, on the display device, of the representation of the first contact identifier in the text field with a representation of the second contact identifier.

14. The non-transitory computer-readable storage medium of claim 8, wherein the one or more programs further include instructions for:
in response to receiving the first user input, ceasing to display, via the display device, the results corresponding to the at least some of the one or more entities.

15. A method, comprising:
at an electronic device with a display device and a touch-sensitive surface:
displaying a text field;
receiving input of one or more characters;
in response to receiving the input of one or more characters:
displaying the one or more characters in the text field;
identifying, based on the one or more characters, one or more entities,
wherein the one or more entities correspond to respective entries of an address book of the electronic device,
wherein a first entity of the one or more entities corresponds to a first entry of the address book, the first entry including a name for the first entity and a plurality of contact identifiers for contacting the first entity using a first contact modality, and
wherein the plurality of contact identifiers of the first entry include a first contact identifier for contacting the first entity using the first contact modality and a second contact identifier different from the first contact identifier for contacting the first entity using the first contact modality; and
displaying, via the display device, results corresponding to at least some of the one or more entities, including a first result for the first entity, wherein display of the first result includes display of the name of the first entity and display of the first contact identifier for contacting the first entity without including display of the second contact identifier for contacting the first entity;
while displaying the results corresponding to at least some of the one or more entities, including the first result for the first entity, receiving, via the touch-sensitive surface, a first user input;
in accordance with a determination that the first user input corresponds to a first portion of the first result, replacing display of the one or more characters in the text field with a representation of the first contact identifier; and
in accordance with a determination that the first user input corresponds to a second portion, different from the first portion, of the first result, displaying, on the display device, the plurality of contact identifiers for contacting the first entity using the first contact modality, including the first contact identifier and the second contact identifier.

16. The method of claim 15, further comprising:
prior to displaying the first result for the first entity:
selecting, based on a set of selection criteria, the first contact identifier from among the plurality of contact identifiers to include in the first result, wherein the set of selection criteria includes a first selection criterion that is based on a frequency of use of a respective contact identifier.

17. The method of claim 15, further comprising:
prior to displaying the first result for the first entity:
selecting, based on a set of selection criteria, the first contact identifier from among the plurality of contact identifiers to include in the first result, wherein the set of selection criteria includes a second selection criterion that is based on content of the respective contact identifier.

18. The method of claim 15, further comprising:
after replacing display of the one or more characters in the text field with a representation of the first contact identifier, detecting a second user input at a location corresponding to the representation of the first contact identifier; and in response to detecting the second user input, displaying a set of contact reselection options, including:
- a first option corresponding to the first contact identifier, and
- a second option corresponding to the second contact identifier.

19. The method of claim 18, wherein in the set of contact reselection options:
the first option is emphasized, and
the second option is not emphasized.

20. The method of claim 18, further comprising:
while displaying the set of contact reselection options, detecting a third user input at a location corresponding to the second option corresponding to the second contact identifier; and
in response to detecting the third user input, replacing display, on the display device, of the representation of the first contact identifier in the text field with a representation of the second contact identifier.

21. The method of claim 15, further comprising:
in response to receiving the first user input, ceasing to display, via the display device, the results corresponding to the at least some of the one or more entities.

\* \* \* \* \*